US010989429B2

(12) United States Patent
Okamoto et al.

(10) Patent No.: US 10,989,429 B2
(45) Date of Patent: Apr. 27, 2021

(54) AIR CONDITIONING SYSTEM

(71) Applicant: Daikin Industries, LTD., Osaka (JP)

(72) Inventors: Yasunori Okamoto, Osaka (JP); Naotoshi Fujita, Osaka (JP); Kouji Tatsumi, Osaka (JP); Masaaki Kawagishi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/492,973

(22) PCT Filed: Mar. 30, 2018

(86) PCT No.: PCT/JP2018/013992
§ 371 (c)(1),
(2) Date: Sep. 11, 2019

(87) PCT Pub. No.: WO2018/182022
PCT Pub. Date: Oct. 4, 2018

(65) Prior Publication Data
US 2020/0080742 A1   Mar. 12, 2020

(30) Foreign Application Priority Data
Mar. 31, 2017   (JP) .............................. JP2017-071264

(51) Int. Cl.
*F24F 11/46* (2018.01)
*F24F 11/64* (2018.01)
(Continued)

(52) U.S. Cl.
CPC .............. *F24F 11/46* (2018.01); *F24F 1/32* (2013.01); *F24F 11/54* (2018.01); *F24F 11/56* (2018.01);
(Continued)

(58) Field of Classification Search
CPC .. F24F 11/46; F24F 11/54; F24F 11/56; F24F 11/64; F24F 11/74; F24F 11/83;
(Continued)

(56) References Cited

U.S. PATENT DOCUMENTS

2013/0167571 A1    7/2013  Nakagawa
2015/0362200 A1*  12/2015  Hamada ................ F25B 49/022
                                                    62/175
2016/0290667 A1*  10/2016  Tamaru .................... F24F 11/83

FOREIGN PATENT DOCUMENTS

EP      2 902 720 A1    8/2015
JP      8-200738 A      8/1996
(Continued)

OTHER PUBLICATIONS

European Search Report of corresponding EP Application No. 18 77 7619.0 dated Mar. 5, 2020.
(Continued)

*Primary Examiner* — Yuhui R Pan
(74) *Attorney, Agent, or Firm* — Global IP Counselors, LLP

(57) ABSTRACT

Provided is an air conditioning system that achieves energy conservation and comfortableness. In the air conditioning system (100), an outdoor-air conditioner (10) sucks outdoor-air (OA) and supplies the outdoor-air as supply air (SA) from an air handling unit (30). An indoor-air conditioner (50) cools or heats indoor-air (IA) that is an air inside a target space (SP) by using an indoor unit (70) and supplies the air to the target space (SP). A general control unit (90) controls performs cooperative load control in which an operating capacity of the outdoor-air conditioner (10) and an operating capacity of the indoor-air conditioner (50) are controlled in cooperation in accordance with a status of the outdoor-air (OA), a status of the indoor-air (IA), an operation status of the outdoor-air conditioner (10), and/or an
(Continued)

operation status of the indoor-air conditioner (50). The general control unit (90) controls, in the cooperative load control, at least one of a parameter of the outdoor-air conditioner (10) and a parameter of the indoor-air conditioner (50) such that a temperature or humidity of the indoor-air (IA) approaches a set value and also a total amount of power consumption of the outdoor-air conditioner (10) and power consumption of the indoor-air conditioner (50) is reduced.

5 Claims, 30 Drawing Sheets

(51) Int. Cl.
  *F24F 11/83* (2018.01)
  *F24F 11/56* (2018.01)
  *F24F 11/54* (2018.01)
  *F24F 1/32* (2011.01)
  *G05B 17/02* (2006.01)
  *F24F 110/20* (2018.01)
  *F24F 140/60* (2018.01)
  *F24F 140/50* (2018.01)
  *F24F 110/22* (2018.01)
  *F24F 110/10* (2018.01)
  *F24F 110/12* (2018.01)
  *G05B 15/02* (2006.01)

(52) U.S. Cl.
  CPC .............. *F24F 11/64* (2018.01); *F24F 11/83* (2018.01); *G05B 15/02* (2013.01); *G05B 17/02* (2013.01); *F24F 2110/10* (2018.01); *F24F 2110/12* (2018.01); *F24F 2110/20* (2018.01); *F24F 2110/22* (2018.01); *F24F 2140/50* (2018.01); *F24F 2140/60* (2018.01)

(58) Field of Classification Search
  CPC .......... F24F 11/86; F24F 1/32; F24F 2110/10; F24F 2110/12; F24F 2110/20; F24F 2110/22; F24F 2110/32; F24F 2140/20; F24F 2140/50; F24F 2140/60; G05B 17/02
  See application file for complete search history.

(56) References Cited

FOREIGN PATENT DOCUMENTS

| | | |
|---|---|---|
| JP | 2012-77948 A | 4/2012 |
| JP | 2014-126208 A | 7/2014 |
| JP | 2014-137207 A | 7/2014 |
| JP | 2016-57038 A | 4/2016 |
| WO | 2014/136199 A1 | 9/2014 |
| WO | 2015/173895 A1 | 11/2015 |

OTHER PUBLICATIONS

International Search Report of corresponding PCT Application No. PCT/JP2018/013992 dated Jun. 5, 2018.
International Preliminary Report of corresponding PCT Application No. PCT/JP2018/013992 dated Oct. 10, 2019.

\* cited by examiner

AIR CONDITIONING SYSTEM

TECHNICAL FIELD

The present invention relates to an air conditioning system.

BACKGROUND ART

An air conditioning system which includes an outdoor-air conditioner and an indoor-air conditioner is known conventionally. The outdoor-air conditioner heats or cools outdoor-air and supplies the air to a target space so as to ventilate the target space or perform air conditioning of the target space. The indoor-air conditioner heats or cools air (indoor-air) in the target space and sends the air to the target space so as to perform air conditioning of the target space. For example, the air conditioning system disclosed in Patent Literature 1 (Japanese Unexamined Patent Application Publication No. 2016-57038) includes an outdoor-air conditioner and an indoor-air conditioner, the outdoor-air conditioner causing the outdoor-air to be subjected to heat exchange with a heat transfer medium (water) so as to send the air at a predetermined supply-air temperature to each target space, the indoor-air conditioner including a plurality of indoor units that cause the indoor-air to be subjected to heat exchange with a refrigerant so as to heat or cool the air and send the air to the target space. In Patent Literature 1, an operating mode of the outdoor-air conditioner includes a comfortable mode and an energy-saving mode. In the comfortable mode, the comfortableness of the target space has a great importance. In the energy-saving mode, energy conservation has a great importance. On the basis of the selected operating mode, an operation state (supply-air temperature) of the outdoor-air conditioner is switched in accordance with conditions such as the number of indoor units that are in operation and room temperature.

SUMMARY OF THE INVENTION

Technical Problem

In Patent Literature 1, either energy conservation or comfortableness has a great importance, and the operation state of the outdoor-air conditioner is switched. In addition, in Patent Literature 1, the operation state of the indoor-air conditioner is not controlled on the basis of the operation state of the outdoor-air conditioner. That is, in Patent Literature 1, the outdoor-air conditioner and the indoor-air conditioner are not controlled in cooperation in order to achieve both energy conservation and comfortableness. Accordingly, in Patent Literature 1, cases are assumed in which it is difficult to achieve both energy conservation and comfortableness at the same time.

Therefore, an object of the present invention is to provide an air conditioning system that achieves energy conservation and comfortableness.

Solution to Problem

An air conditioning system according to a first aspect of the present invention includes an outdoor-air conditioner, an indoor-air conditioner, and a control unit. The outdoor-air conditioner includes an outdoor-air conditioning unit and a heat transfer medium adjusting unit. The outdoor-air conditioner sucks outdoor-air and supplies the outdoor-air as supply air from the outdoor-air conditioning unit to perform air conditioning of a target space. The heat transfer medium adjusting unit adjusts a state of a heat transfer medium flowing in the outdoor-air conditioning unit. The indoor-air conditioner includes a plurality of indoor units and a refrigerant adjusting unit. The indoor-air conditioner cools or heats indoor-air by using the indoor units and supplying the air to the target space to perform air conditioning of the target space. The indoor-air is air inside the target space. The refrigerant adjusting unit adjusts a state of a refrigerant flowing in the indoor units. The control unit controls operations of the outdoor-air conditioner and the indoor-air conditioner. The outdoor-air conditioning unit includes a first fan and an outdoor-air conditioner heat exchanger. The first fan operates to suck the outdoor-air and to send the supply air to the target space. The outdoor-air conditioner heat exchanger causes heat exchange between the outdoor-air sucked by the first fan and the heat transfer medium. Each of the indoor units includes a second fan and an indoor-air conditioner heat exchanger. The second fan operates to suck the indoor-air and to send the air to the target space. The indoor-air conditioner heat exchanger causes heat exchange between the indoor-air sucked by the second fan and the refrigerant. The control unit performs cooperative load control in accordance with a status of the outdoor-air, a status of the indoor-air, an operation status of the outdoor-air conditioner, and/or an operation status of the indoor-air conditioner. The control unit controls, in the cooperative load control, an operating capacity of the outdoor-air conditioner and an operating capacity of the indoor-air conditioner in cooperation. The control unit controls, in the cooperative load control, at least one of a parameter of the outdoor-air conditioner and a parameter of the indoor-air conditioner such that a temperature or humidity of the indoor-air approaches a set value and also a total amount of a power consumption of the outdoor-air conditioner and a power consumption of the indoor-air conditioner is reduced.

In the air conditioning system according to the first aspect of the present invention, the control unit performs the cooperative load control in accordance with a status and controls the operating capacity of the outdoor-air conditioner and the operating capacity of the indoor-air conditioner in cooperation by controlling at least one of the parameter of the outdoor-air conditioner and the parameter of the indoor-air conditioner such that the temperature or humidity of the indoor-air approaches the set value and also the total amount of the power consumption of the outdoor-air conditioner and the power consumption of the indoor-air conditioner is reduced. Thus, in accordance with a status, at least one of the parameter of the outdoor-air conditioner and the parameter of the indoor-air conditioner is controlled such that the temperature or humidity of the indoor-air approaches the set value and also the total amount of the power consumption of the outdoor-air conditioner and the power consumption of the indoor-air conditioner is reduced, and the operating capacity of the outdoor-air conditioner and the operating capacity of the indoor-air conditioner are controlled in cooperation. As a result, each of the outdoor-air conditioner and the indoor-air conditioner can operate with a suitable operating capacity based on energy conservation while the temperature or humidity in the target space is maintained to be appropriate. In particular, in a case where actuators of the outdoor-air conditioner and the indoor-air conditioner are inverter-controlled to control the operating capacities, the operation efficiency is higher during partial load operation than during rated operation. For this feature, control of the outdoor-air conditioner and the indoor-air conditioner in cooperation in accordance with a status makes it possible to perform the partial load operation that leads to a high operation efficiency of each of the outdoor-air conditioner and the indoor-air conditioner. Accordingly, energy conservation can be increased while comfortableness is achieved.

Note that the term "operating capacity" herein mainly indicates a cooling (dehumidifying) capability/heating capability. The operating capacity of the outdoor-air conditioner is determined based directly on the state (e.g., flow rate, temperature, pressure, or enthalpy) of the heat transfer medium flowing in the outdoor-air conditioner heat exchanger and/or the air volume of the first fan, for example, and indirectly on a predetermined target value as an indicator (e.g., a target value of the temperature of the supply air in the outdoor-air conditioner). The operating capacity of the indoor-air conditioner is determined based directly on the state (e.g., flow rate, temperature, pressure, or enthalpy) of the refrigerant flowing in the indoor-air conditioner heat exchanger and/or the air volume of the second fan, for example, and indirectly on a predetermined target value as an indicator (e.g., a target value of the evaporation temperature of the refrigerant in the indoor-air conditioner heat exchanger).

In addition, the term "status of the outdoor-air" herein includes the temperature or humidity of the outdoor-air. In addition, the term "status of the indoor-air" herein includes the temperature or humidity of the indoor-air.

In addition, the term "operation status of the outdoor-air conditioner" includes, for example, a start/stop status of the outdoor-air conditioning unit, the operation type (e.g., cooling operation or heating operation) of the outdoor-air conditioning unit, the air volume of the first fan, the state (e.g., flow rate, temperature, or pressure) of the heat transfer medium, and/or the target value of the temperature of the supply air. In addition, the term "operation status of the indoor-air conditioner" includes, for example, a start/stop status of each of the indoor units, the operation type (e.g., cooling operation or heating operation) of each of the indoor units, the air volume of the second fan, the state (e.g., flow rate, temperature, or pressure) of the refrigerant, and/or the target value of the evaporation temperature of the refrigerant in the indoor-air conditioner heat exchanger.

In addition, the term "heat transfer medium" is water, the refrigerant, or another fluid. In addition, the term "state of the heat transfer medium" includes the flow rate, temperature, pressure, and/or enthalpy of the heat transfer medium. In addition, the term "heat transfer medium adjusting unit" includes a flow rate/pressure adjusting device such as a pump or an electric valve and/or a heat source device that compresses the heat transfer medium to heat/evaporate or cool/condense the heat transfer medium.

In addition, the term "outdoor-air conditioner" is a device that sucks the outdoor-air and performs latent-heat processing and/or sensible-heat processing to supply the air as the supply air to the target space.

In addition, the term "outdoor-air conditioning unit" includes a unit that conditions the outdoor-air to be sent, such as a so-called air handling unit or a fan coil unit. The term "outdoor-air conditioning unit" includes a unit that sends only the outdoor-air as the supply air or a unit that mixes the outdoor-air and another air (e.g., air that is sucked from the target space) and sends the mixed air as the supply air.

In addition, the term "state of the refrigerant" mainly includes the flow rate, pressure, temperature, and/or enthalpy of the refrigerant. In addition, the term "refrigerant adjusting unit" includes a flow rate/pressure adjusting device such as an electric expansion valve and/or a heat source device that compresses the refrigerant to heat or cool the refrigerant (e.g., an outdoor unit including a compressor, a condenser, or an evaporator for the refrigerant).

In addition, the term "operation efficiency" is represented by using, for example, a coefficient of performance (COP) and is specifically a value obtained by dividing the capability of a device by consumed energy. The capability of a device is, for example, a heat load processing capability of the outdoor-air conditioner or the indoor-air conditioner and is expressed in a unit of watt or the like. The consumed energy is, for example, power consumption and is expressed in a unit of watt or the like.

An air conditioning system according to a second aspect of the present invention is the air conditioning system according to the first aspect in which the parameter of the indoor-air conditioner in the cooperative load control is the evaporation temperature of the refrigerant in the indoor-air conditioner heat exchanger.

An air conditioning system according to a third aspect of the present invention is the air conditioning system according to the first aspect or the second aspect in which the parameter of the outdoor-air conditioner in the cooperative load control is the temperature of the supply air, the air volume of the first fan, the temperature of the heat transfer medium flowing into the outdoor-air conditioner heat exchanger, or the evaporation temperature or enthalpy of the heat transfer medium in the outdoor-air conditioner heat exchanger.

An air conditioning system according to a fourth aspect of the present invention is the air conditioning system according to any of the first to third aspects in which the control unit performs the cooperative load control such that the evaporation temperature of the refrigerant in the indoor-air conditioner heat exchanger and the temperature of the supply air are in negative correlation. Accordingly, each of the outdoor-air conditioner and the indoor-air conditioner can operate with a suitable operating capacity based on energy conservation while the temperature or humidity in the target space is maintained to be appropriate.

An air conditioning system according to a fifth aspect of the present invention is the air conditioning system according to any of the first to fourth aspects in which the control unit controls, in the cooperative load control, the operating capacity of the indoor-air conditioner by setting a target value of the evaporation temperature of the refrigerant in the indoor-air conditioner heat exchanger. This enables easy control of the operating capacity of the indoor-air conditioner. Thus, the multiplicity of use is increased.

An air conditioning system according to a sixth aspect of the present invention is the air conditioning system according to the fifth aspect in which the control unit increases, in the cooperative load control, the target value of the evaporation temperature of the refrigerant if the evaporation temperature of the refrigerant is higher than or equal to a predetermined reference value. Accordingly, if the latent-heat processing amount in the indoor-air conditioner heat exchanger is assumed to be small, the target value of the evaporation temperature is increased, and the operating capacity of the indoor unit including the indoor-air conditioner heat exchanger is reduced. In relation to this, the energy consumption of the indoor-air conditioner is suppressed.

Note that for the term "reference value" herein, for example, a numerical value corresponding to the specification and/or installed environment of the indoor-air conditioner is set in advance according to status.

An air conditioning system according to a seventh aspect of the present invention is the air conditioning system according to any of the first to sixth aspects in which the control unit controls, in the cooperative load control, the operating capacity of the outdoor-air conditioner by setting a target value of the temperature of the supply air. This enables easy control of the operating capacity of the outdoor-air conditioner. Thus, the multiplicity of use is increased.

An air conditioning system according to an eighth aspect of the present invention is the air conditioning system according to the seventh aspect in which the control unit sets, in the cooperative load control, the target value of the temperature of the supply air such that the evaporation temperature of the refrigerant in the indoor-air conditioner heat exchanger approaches the target value of the evaporation temperature. Accordingly, the target value of the temperature of the supply air is set and the operating capacity of the outdoor-air conditioner is controlled in relation to the evaporation temperature in the indoor-air conditioner heat exchanger. As a result, while the temperature or humidity in the target space is maintained to be appropriate, each of the outdoor-air conditioner and the indoor-air conditioner can accurately operate with a suitable operating capacity based on energy conservation.

An air conditioning system according to a ninth aspect of the present invention is the air conditioning system according to the seventh aspect or the eighth aspect in which the control unit changes, in the cooperative load control, the target value of the temperature of the supply air, in a case where the outdoor-air conditioning unit performs heating operation for heating the outdoor-air and the indoor units perform cooling operation for cooling the indoor-air, if the number of indoor units that are in operation increases or decreases. Accordingly, the target value of the temperature of the supply air is set and the operating capacity of the outdoor-air conditioner is controlled in relation to an increase or a decrease in the number of indoor units in operation. As a result, while the temperature or humidity in the target space is maintained to be appropriate, each of the outdoor-air conditioner and the indoor-air conditioner can accurately operate with a suitable operating capacity based on energy conservation.

An air conditioning system according to a tenth aspect of the present invention is the air conditioning system according to any of the first to ninth aspects in which the heat transfer medium of the outdoor-air conditioner is water or another fluid, and in the outdoor-air conditioner heat exchanger, heat exchange related to a sensible heat of the heat transfer medium is performed. That is, in the outdoor-air conditioner heat exchanger, heat exchange using the sensible heat capacity (temperature difference at the port for the heat transfer medium) is performed. That is, the outdoor-air conditioner herein is of a so-called central system. Accordingly, in particular, in a case where the plurality of outdoor-air conditioning units are present, chiller units (heat transfer medium adjusting units) are made common. Each of the chiller units is connected to the outdoor-air conditioning units. In relation to this, for example, in a case where the system is configured by combining a plurality of highly efficient chiller units of the same type, in terms of operation efficiency, an optimal number of chiller units and outdoor-air conditioning units can operate with respect to the total load even if the load changes in the outdoor-air conditioning units. Accordingly, in particular, in a large-scale building, each of the outdoor-air conditioner and the indoor-air conditioner can operate with a suitable operating capacity based on energy conservation.

An air conditioning system according to an eleventh aspect of the present invention is the air conditioning system according to any of the first to ninth aspects in which the heat transfer medium of the outdoor-air conditioner heat exchanger is the refrigerant, and in the outdoor-air conditioner heat exchanger, heat exchange related to a latent heat of the heat transfer medium is performed. That is, heat exchange using the latent heat capacity, which is a change of the latent heat of the heat transfer medium, is performed in the outdoor-air conditioner heat exchanger. That is, the outdoor-air conditioner herein is of a so-called direct-expansion type. The direct-expansion outdoor-air conditioner has a high efficiency than the central-system outdoor-air conditioner even if the scale is small. Accordingly, in particular, in a case where the outdoor-air conditioning units are provided in each story in a dispersed manner, each of the outdoor-air conditioner and the indoor-air conditioner can operate with a suitable operating capacity based on energy conservation. Note that as for the outdoor-air conditioner heat exchanger, a plurality of outdoor-air conditioner heat exchangers may be provided in a single target space (or in the ceiling, under the floor, or in a wall that forms the target space). In addition, an outdoor-air conditioner heat exchanger may also be provided in a target space (or in the ceiling, under the floor, or in a wall that forms the target space) different from that of another outdoor-air conditioner heat exchanger.

An air conditioning system according to a twelfth aspect of the present invention is the air conditioning system according to any of the first to eleventh aspects in which the outdoor-air conditioning unit is integrated with the heat transfer medium adjusting unit and installed on a roof or outdoors. That is, the outdoor-air conditioner herein is of a so-called roof-top type. Accordingly, in a case where the outdoor-air is conditioned and sent through a duct, each of the outdoor-air conditioner and the indoor-air conditioner can operate with a suitable operating capacity based on energy conservation.

An air conditioning system according to a thirteenth aspect of the present invention is the air conditioning system according to any of the first to twelfth aspects in which the control unit performs the cooperative load control such that a value calculated according to the following Formula 1 becomes positive:

(current power consumption of the indoor-air conditioner−predicted power consumption of the indoor-air conditioner after execution of the cooperative load control)+(current power consumption of the outdoor-air conditioner−predicted power consumption of the outdoor-air conditioner after execution of the cooperative load control)     (Formula 1).

This reliably increases energy conservation in the cooperative load control.

The term "current power consumption of the indoor-air conditioner" herein is the current measured value of the power consumption of the indoor-air conditioner, or a model value or a table value calculated from the status of the outdoor-air, the status of the indoor-air, the operation status of the indoor-air conditioner, and the like.

The term "current power consumption of the outdoor-air conditioner" herein is the current measured value of the power consumption of the outdoor-air conditioner, or a model value or a table value calculated from the status of the outdoor-air, the operation status of the outdoor-air conditioner, and the like.

The term "predicted power consumption of the indoor-air conditioner after execution of the cooperative load control" herein is a model value or a table value calculated from the status of the outdoor-air, the status of the indoor-air, the operation status of the indoor-air conditioner, and the like, or a value obtained by correcting the current measured value of the power consumption of the indoor-air conditioner by using a model value or a table value calculated from the status of the outdoor-air, the status of the indoor-air, and the operation status of the indoor-air conditioner.

The term "predicted power consumption of the outdoor-air conditioner after execution of the cooperative load control" herein is a model value or a table value calculated from the status of the outdoor-air, the operation status of the outdoor-air conditioner, and the like or a value obtained by correcting the current power consumption of the outdoor-air conditioner by using a model value or a table value calculated from the status of the outdoor-air, the status of the indoor-air, the operation status of the indoor-air conditioner, and the like.

An air conditioning system according to a fourteenth aspect of the present invention is the air conditioning system according to any of the first to thirteenth aspects in which the control unit performs the cooperative load control such that a value calculated according to the following Formula 2 becomes positive:

(current power consumption of the indoor-air conditioner−predicted power consumption of the indoor-air conditioner after execution of the cooperative load control)−(current processed heat amount in the indoor-air conditioner−predicted processed heat amount in the indoor-air conditioner after execution of the cooperative load control)/predicted COP of the outdoor-air conditioner after execution of the cooperative load control (Formula 2).

The term "current processed heat amount in the indoor-air conditioner" is the current measured value of the processed heat amount of the indoor-air conditioner, or a model value or a table value calculated from the status of the outdoor-air, the status of the indoor-air, the operation status of the indoor-air conditioner, and the like.

The term "predicted processed heat amount in the indoor-air conditioner after execution of the cooperative load control" is a model value or a table value calculated from the status of the outdoor-air, the status of the indoor-air, the operation status of the indoor-air conditioner, and the like, or a value obtained by correcting the current measured value of the processed heat amount of the indoor-air conditioner by using a model value or a table value calculated from the status of the outdoor-air, the status of the indoor-air, the operation status of the indoor-air conditioner, and the like.

The term "predicted COP of the outdoor-air conditioner after execution of the cooperative load control" is the current measured value of the processed heat amount of the outdoor-air conditioner, a model value or a table value calculated from the status of the outdoor-air, the status of the indoor-air, the operation status of the outdoor-air conditioner, and the like, or a value obtained by correcting the current measured value of the processed heat amount of the outdoor-air conditioner by using a model value or a table value calculated from the status of the outdoor-air, the status of the indoor-air, the operation status of the outdoor-air conditioner, and the like.

DESCRIPTION OF EMBODIMENTS

Now, an air conditioning system 100 according to an embodiment of the present disclosure will be described below. Note that the following embodiment is a specific example and shall not limit the technical scope. The embodiment may be modified as appropriate without departing from the spirit of the present disclosure.

(1) Outline of Air Conditioning System 100

Figure 1:
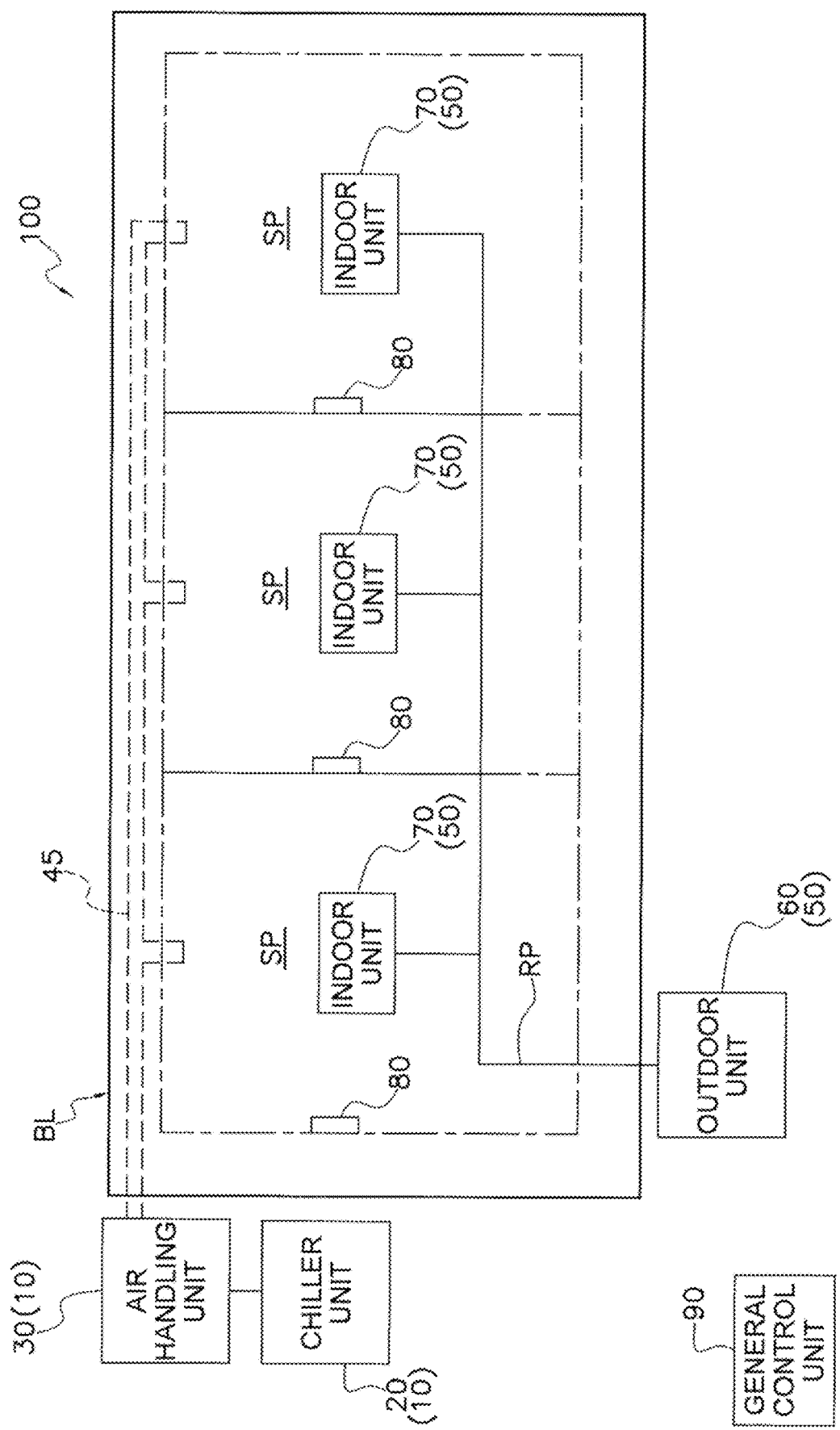
FIG. 1 is a block diagram schematically illustrating the configuration of an air conditioning system.

FIG. 1 is a schematic diagram illustrating the configuration of the air conditioning system 100. The air conditioning system 100 is a system that performs air conditioning in a target space SP in a construction such as a house, a building, a factory, or public facility. In this embodiment, the air conditioning system 100 is applied to a building BL including a plurality of (three in this embodiment) target spaces SP (SP1, SP2, and SP3).

The air conditioning system 100 includes an outdoor-air conditioner 10, an indoor-air conditioner 50, a remote controller 80, and a general control unit 90. The outdoor-air conditioner 10 is an example of an "outdoor-air conditioner", the indoor-air conditioner 50 is an example of an "indoor-air conditioner", the remote controller 80 is an example of an "input unit", and the general control unit 90 is an example of a "control unit".

The air conditioning system 100 sucks and conditions outdoor-air OA by using the outdoor-air conditioner 10 and supplies the air to the target space SP, thereby performing air conditioning such as cooling, heating, ventilation, dehumidification, humidification and/or the like in the target space SP. The outdoor-air OA is the air outside the target space SP, and is an outdoor air in this embodiment (see FIG. 2).

The air conditioning system 100 also sucks and conditions indoor-air IA by using the indoor-air conditioner 50 and supplies the air to the target space SP, thereby performing air conditioning such as cooling, heating, dehumidification, and/or the like in the target space SP. The indoor-air IA is the air inside the target space SP (see FIG. 3).

In the air conditioning system 100, operation states of the outdoor-air conditioner 10 and the indoor-air conditioner 50 can be switched by appropriately inputting a command to the remote controller 80. In the air conditioning system 100, in accordance with the command that is input to the remote controller 80 (command regarding start/stop, operation type, set temperature, set air volume, or the like) and a load status (the temperature and humidity of the outdoor-airoutdoor-air OA, the temperature and humidity of the indoor-air IA, or the like), the general control unit 90 controls the operation states of the outdoor-air conditioner 10 and the indoor-air conditioner 50.

(2) Details of Air Conditioning System 100

(2-1) Outside Air Conditioner 10 (Outside Air Conditioner)

Figure 2:
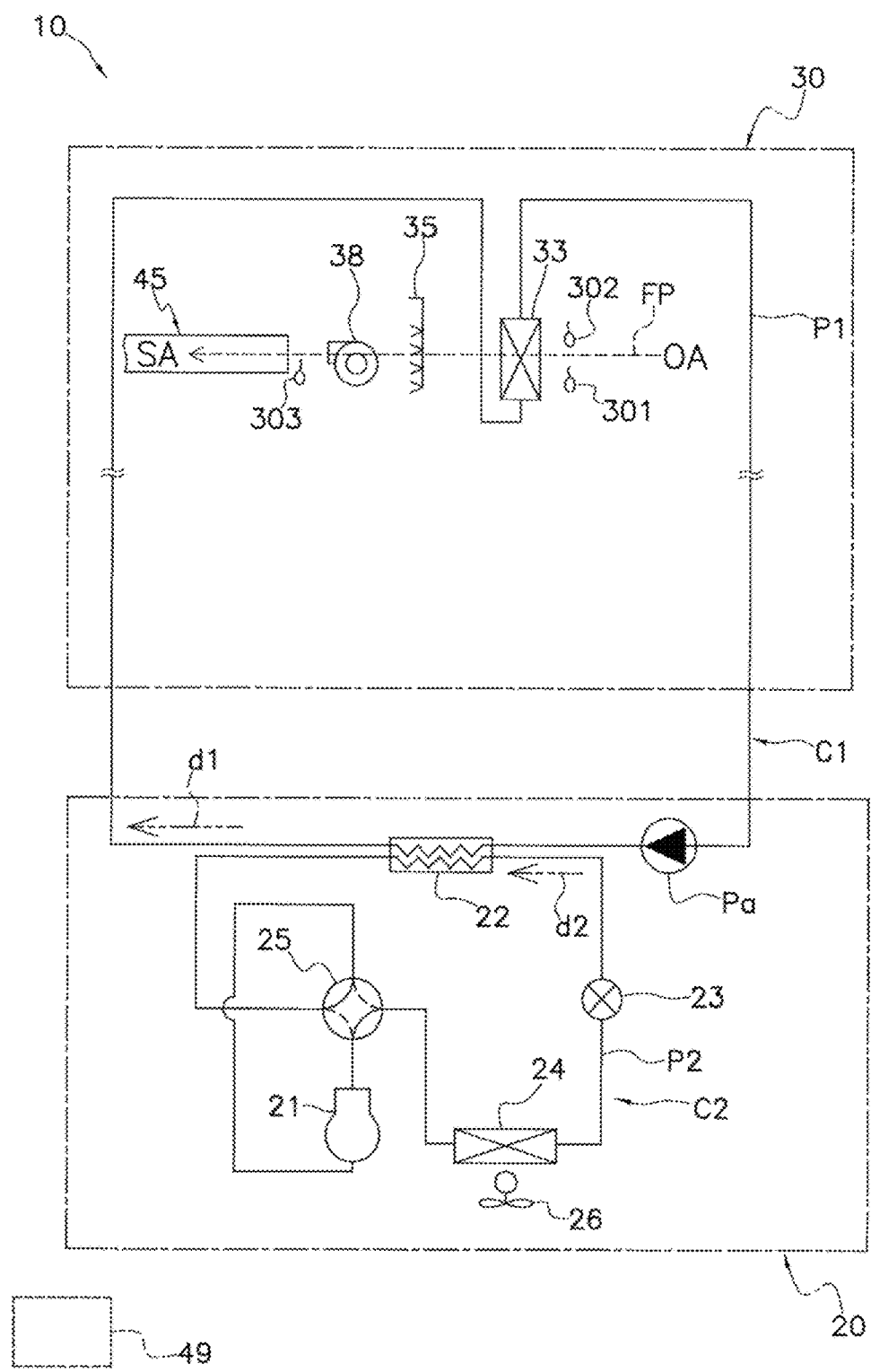
FIG. 2 is a schematic diagram illustrating the configuration of an outdoor-air conditioner.

FIG. 2 is a schematic diagram illustrates the configuration of the outdoor-air conditioner 10. The outdoor-air conditioner 10 is of a so-called central system and mainly includes a chiller unit 20, an air handling unit 30, an air supply duct 45, and an outdoor-air conditioner control unit 49. During the operation, the outdoor-air conditioner 10 sucks the outdoor-air OA in the air handling unit 30, cools or heats, or dehumidifies or humidifies the air, and supplies the air as supply air SA to the target space SP through the air supply duct 45.

In the outdoor-air conditioner 10, a heat transfer medium circuit C1 and an outdoor-air conditioner refrigerant circuit C2 are configurations that are independent of each other.

A heat transfer medium (water in this embodiment) circulates in the heat transfer medium circuit C1, and the heat transfer medium is used for heat exchange with the outdoor-air OA. The heat transfer medium circuit C1 is formed across the chiller unit 20 and the air handling unit 30. The heat transfer medium circuit C1 is formed by mainly connecting an outdoor-air heat exchanger 33 and a heat transfer medium heat exchanger 22 and a heat transfer medium pump Pa via a first pipe P1. The outdoor-air heat exchanger 33 is provided in the air handling unit 30. The heat transfer medium heat exchanger 22 and the heat transfer medium pump Pa is provided in the chiller unit 20. During the operation, the heat transfer medium pump Pa is controlled to be in operation in the heat transfer medium circuit C1, so that the heat transfer medium flows in a predetermined direction (direction indicated by a two-dot chain line arrow d1 in FIG. 2). The flow rate of the heat transfer medium in the heat transfer medium circuit C1 is mainly adjusted by the number of revolutions of the heat transfer medium pump Pa.

A refrigerant, which is a cooling source or a heating source of the heat transfer medium in the heat transfer medium circuit C1, circulates in the outdoor-air conditioner refrigerant circuit C2. The outdoor-air conditioner refrigerant circuit C2 is formed in the chiller unit 20. The outdoor-air conditioner refrigerant circuit C2 is formed by mainly connecting a refrigerant compressor 21, the heat transfer medium heat exchanger 22, a refrigerant expansion valve 23, a refrigerant heat exchanger 24, and a flow-passage switching valve 25, all provided in the chiller unit 20, via a second pipe P2. During the operation, the refrigerant compressor 21 is controlled to be in operation in the outdoor-air conditioner refrigerant circuit C2, and also the opening degree of the refrigerant expansion valve 23 is controlled, so that the refrigerant flows in a predetermined direction (direction indicated by a two-dot chain line arrow d2 in FIG. 2 during normal cycle operation, direction reverse to d2 during reverse cycle operation), and thereby a vapor-compression refrigerating cycle is in operation.

(2-1-1) Chiller Unit 20 (Heating-Medium Adjusting Unit)

The chiller unit 20 performs a refrigerating cycle in the outdoor-air conditioner refrigerant circuit C2, and thereby the heat transfer medium in the heat transfer medium circuit C1 is cooled or heated. The chiller unit 20 mainly includes the refrigerant compressor 21, the heat transfer medium heat exchanger 22, the refrigerant expansion valve 23, the refrigerant heat exchanger 24, the flow-passage switching valve 25, a chiller fan 26, and the heat transfer medium pump Pa.

The refrigerant compressor 21 compresses a low-pressure refrigerant to a high-pressure refrigerant in the refrigerating cycle. In this embodiment, a hermetic compressor having a compressor motor therein is employed as the refrigerant compressor 21. The refrigerant compressor 21 contains, for example, a positive displacement compression element (omitted from illustration) such as a scroll compression element, and the compression element is rotationally driven by the compressor motor. The operating frequency of the compressor motor is controlled by an inverter, and thereby, the capacity of the refrigerant compressor 21 is controlled. That is, the capacity of the refrigerant compressor 21 is variable.

The heat transfer medium heat exchanger 22 causes heat exchange between the heat transfer medium in the heat transfer medium circuit C1 and the low-pressure refrigerant in the outdoor-air conditioner refrigerant circuit C2 to cool the heat transfer medium. In the heat transfer medium heat exchanger 22, a heat transfer medium passage and a refrigerant passage are formed. The heat transfer medium passage communicates to the heat transfer medium circuit C1, and the refrigerant passage communicates to the outdoor-air conditioner refrigerant circuit C2, so that the heat transfer medium heat exchanger 22 can cause heat exchange between the heat transfer medium within the heat transfer medium passage and the refrigerant in the refrigerant passage. The heat transfer medium heat exchanger 22 serves as an evaporator of the low-pressure refrigerant during the normal cycle operation (cooling operation or dehumidifying operation) and as a condenser or radiator of the high-pressure refrigerant during the reverse cycle operation (heating operation).

The refrigerant expansion valve 23 serves as means for decompressing the refrigerant or means for adjusting the flow rate. In this embodiment, the refrigerant expansion valve 23 is an electric expansion valve the opening degree of which can be controlled.

The refrigerant heat exchanger 24 causes heat exchange between the refrigerant in the outdoor-air conditioner refrigerant circuit C2 and a passing air. The refrigerant heat exchanger 24 includes a heat transfer tube and a heat transfer fin. The heat transfer tube communicates to the outdoor-air conditioner refrigerant circuit C2. In the refrigerant heat exchanger 24, heat exchange is performed between an air that passes the periphery of the heat transfer tube and the heat transfer fin (air flow generated by the chiller fan 26) and the refrigerant that passes through the heat transfer tube. The refrigerant heat exchanger 24 serves as a condenser or radiator of the high-pressure refrigerant during the normal cycle operation and as an evaporator of the low-pressure refrigerant during the reverse cycle operation.

The flow-passage switching valve 25 switches the flow in the outdoor-air conditioner refrigerant circuit C2. The flow-passage switching valve 25 has four connection ports, which are connected to an intake pipe and a discharge pipe of the refrigerant compressor 21, the gas side of a refrigerant passage of the heat transfer medium heat exchanger 22, and the gas side of the refrigerant heat exchanger 24. Specifically, the flow-passage switching valve 25 can switch between a first state and a second state. In the first state, the gas side of the refrigerant passage of the heat transfer medium heat exchanger 22 is allowed to communicate to the intake pipe of the refrigerant compressor 21, and also the discharge pipe of the refrigerant compressor 21 is allowed to communicate to the gas side of the refrigerant heat exchanger 24 (see the solid line in the flow-passage switching valve 25 in FIG. 2). In the second state, the discharge pipe of the refrigerant compressor 21 is allowed to communicate to the gas side of the refrigerant passage of the heat transfer medium heat exchanger 22, and also the gas side of the refrigerant heat exchanger 24 is allowed to communicate to the intake pipe of the refrigerant compressor 21 (see the broken line in the flow-passage switching valve 25 in FIG. 2). The flow-passage switching valve 25 is controlled to be in the first state during the normal cycle operation (cooling operation or dehumidifying operation) and to be in the second state during the reverse cycle operation (heating operation or the like).

The chiller fan 26 generates an air flow that flows into the chiller unit 20, passes through the refrigerant heat exchanger 24, and flows out of the chiller unit 20. The air flow generated by the chiller fan 26 is a cooling source of the refrigerant in the refrigerant heat exchanger 24 during the normal cycle operation and is a heating source of the refrigerant in the refrigerant heat exchanger 24 during the reverse cycle operation. The chiller fan 26 includes a fan motor, and the fan motor is inverter-controlled, thereby adjusting the number of revolutions. That is, the air volume of the chiller fan 26 is variable.

The heat transfer medium pump Pa (heat transfer medium adjusting unit) is provided in the heat transfer medium circuit C1. During the operation, the heat transfer medium pump Pa sucks and discharges the heat transfer medium. The heat transfer medium pump Pa includes a motor, which is a drive source, and the motor is inverter-controlled, thereby adjusting the number of revolutions. That is, the discharge flow rate of the heat transfer medium pump Pa is variable.

(2-1-2) Air Handling Unit 30 (Outside Air Conditioning Unit)

The air handling unit 30 cools, dehumidifies, heats, and/or humidifies the outdoor-air OA. The air handling unit 30 mainly includes the outdoor-air heat exchanger 33, a humidifier 35, and an air supply fan 38.

The outdoor-air heat exchanger 33 (outdoor-air conditioner heat exchanger) serves as a cooler of the outdoor-air OA. The outdoor-air heat exchanger 33 is provided in the heat transfer medium circuit C1. The outdoor-air heat exchanger 33 includes a heat transfer tube and a heat transfer fin, and the heat transfer tube communicates to the heat transfer medium circuit C1. In the outdoor-air heat exchanger 33, heat exchange is performed between the outdoor-air OA that passes the periphery of the heat transfer tube and the heat transfer fin and the heat transfer medium that passes through the heat transfer tube.

The humidifier 35 is a device for humidifying the outdoor-air OA that has passed through the outdoor-air heat exchanger 33. The method and model of the humidifier 35 are not limited to particular ones. In this embodiment, a normal, natural evaporation type humidifier is employed.

The air supply fan 38 (first fan) sucks the outdoor-air OA into the air handling unit 30 and sends the air to the air supply duct 45. The model of the air supply fan 38 is not limited to a particular one. In this embodiment, a sirocco fan is employed as the air supply fan 38. Here, in the air handling unit 30, an outdoor-air passage FP through which the outdoor-air OA flows is formed (see the broken arrow "FP" in FIG. 2). When the air supply fan 38 is in operation, the outdoor-air OA flows through the outdoor-air passage FP. The air supply fan 38 includes a fan motor, and the fan motor is inverter-controlled, thereby adjusting the number of revolutions. That is, the air volume of the air supply fan 38 is variable.

In the air handling unit 30, the outdoor-air heat exchanger 33, the humidifier 35, and the air supply fan 38 are provided in this order from the upstream side of the outdoor-air passage FP to the downstream side. The downstream end of the outdoor-air passage FP is connected to the air supply duct 45.

Various sensors are provided in the air handling unit 30. Examples of the various sensors provided in the air handling unit 30 include an outdoor-air temperature sensor 301 that detects the temperature of the outdoor-air OA to be sucked into the air handling unit 30 and an outdoor-air humidity sensor 302 that detects the humidity thereof. In addition, examples further include a supply-air temperature sensor 303 that detects the temperature of the supply air SA (supply-air temperature) to be sent to the air supply duct 45 (e.g., the target space SP).

(2-1-3) Air Supply Duct 45

Figure 3:
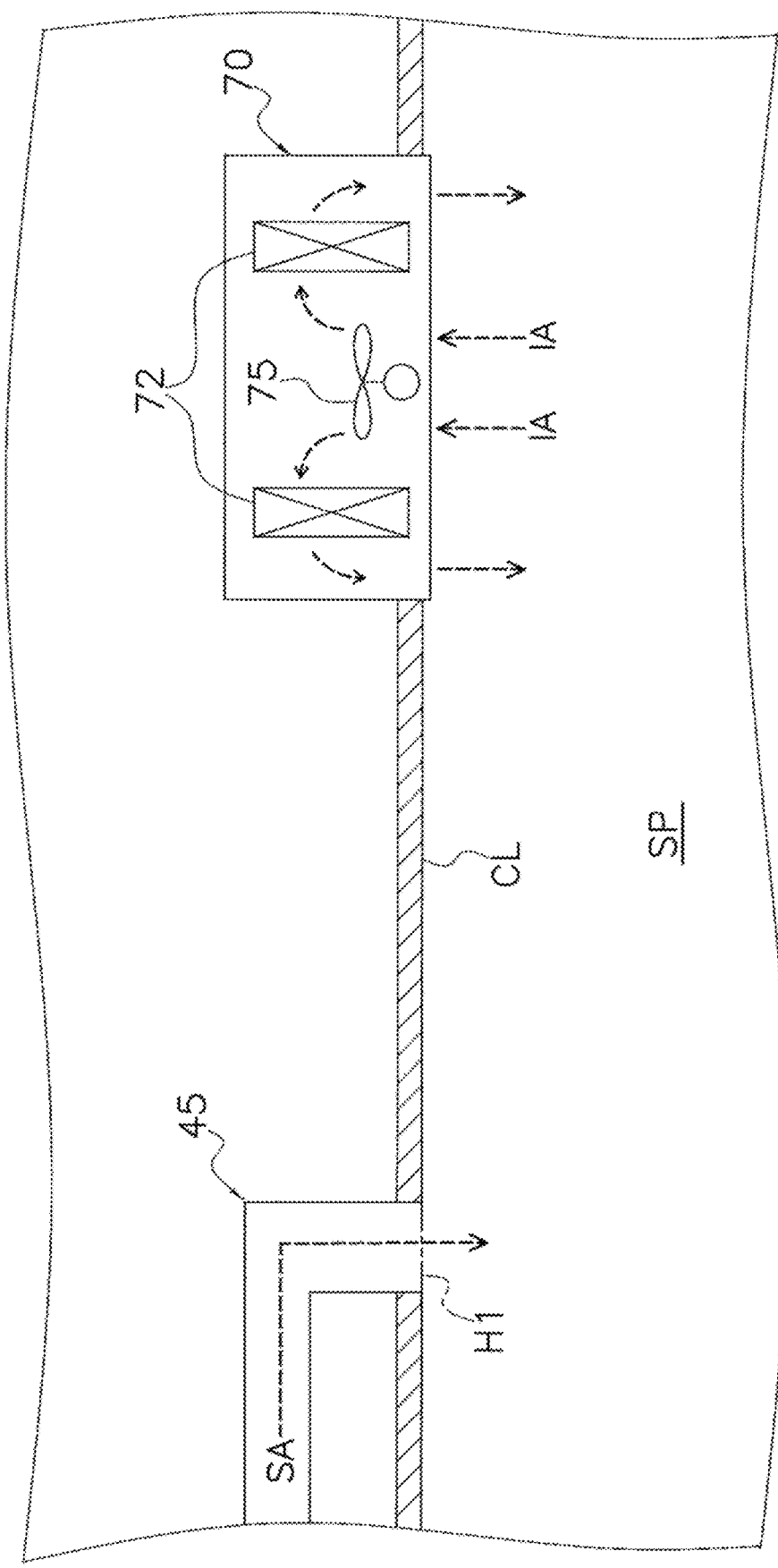
FIG. 3 is a schematic diagram illustrating the installation model of an air supply duct and an indoor unit in a target space.

The air supply duct 45 is a member that forms the passage of the outdoor-air OA. An end of the air supply duct 45 is connected to the air handling unit 30 so that the outdoor-air OA flows therein by driving the air supply fan 38. The other end of the air supply duct 45 is split into a plurality of branches, and each of the branches communicates to a target space SP. As illustrated in FIG. 3, the other end (each branch) of the air supply duct 45 is connected to an intake hole H1 formed on a ceiling CL of the target space SP. Note that FIG. 3 is a schematic diagram illustrating the manner of providing the air supply duct 45 and an indoor unit 70 in the target space SP.

(2-1-4) Outside-Air-Conditioner Control Unit 49

The outdoor-air conditioner control unit 49 is a functional unit that controls operations of the units included in the outdoor-air conditioner 10. The outdoor-air conditioner control unit 49 is formed of a CPU, a memory, various electric components, and the like. The outdoor-air conditioner control unit 49 is connected to devices included in the outdoor-air conditioner 10 via wiring. In addition, the outdoor-air conditioner control unit 49 is electrically connected to the remote controller 80 and the general control unit 90 via a communication line.

In this embodiment, the outdoor-air conditioner control unit 49 is formed by electrically connecting microcomputers provided in the chiller unit 20 and the air handling unit 30 to the electric components.

The outdoor-air conditioner control unit 49 (or the general control unit 90) sets a target value of the temperature of the supply air (target supply-air temperature Tsa) in accordance with the set temperature and the load status, and appropriately adjusts operations of the units (e.g., the capacity of the refrigerant compressor 21, the opening degree of the refrigerant expansion valve 23, the number of revolutions of the heat transfer medium pump Pa, start/stop of the humidifier 35, and the number of revolutions of the air supply fan 38) on the basis of the target supply-air temperature Tsa. Thus, the operating capacity of the outdoor-air conditioner 10 is appropriately changed.

In a case where cooling is performed by supplying the outdoor-air OA without performing latent-heat processing or sensible-heat processing thereon (i.e., a case where outdoor-air cooling operation is performed), the outdoor-air conditioner control unit 49 suspends/stops operations of the units in the chiller unit 20.

(2-1-5) Flow of Heating Medium, Refrigerant, Cooling Water, and Air During Operation of Outside Air Conditioner 10

During the operation of the outdoor-air conditioner 10, normally, the heat transfer medium pump Pa is driven, and the heat transfer medium circulates in the heat transfer medium circuit C1. In addition, the refrigerant compressor 21 is driven, and the refrigerant circulates in the outdoor-air conditioner refrigerant circuit C2.

In the heat transfer medium circuit C1, during the operation, the heat transfer medium is subjected to heat exchange, by the heat transfer medium heat exchanger 22, with the refrigerant flowing in the outdoor-air conditioner refrigerant circuit C2 to be cooled or heated. In the heat transfer medium heat exchanger 22, the heat transfer medium is cooled during the normal cycle operation and is heated during the reverse cycle operation. The heat transfer medium that is cooled or heated by the heat transfer medium heat exchanger 22 flows into the outdoor-air heat exchanger 33 and is subjected to heat exchange with the outdoor-air OA that has been sucked into the air handling unit 30 to be heated or cooled. In the outdoor-air heat exchanger 33, the heat transfer medium is heated during the normal cycle operation and is cooled during the reverse cycle operation. The heat transfer medium that has passed though the outdoor-air heat exchanger 33 flows into the heat transfer medium heat exchanger 22 again.

In the outdoor-air conditioner refrigerant circuit C2, during the operation, the refrigerant is compressed in the refrigerant compressor 21 and discharged as the high-pressure refrigerant. During the normal cycle operation, in the refrigerant heat exchanger 24, the high-pressure refrigerant discharged from the refrigerant compressor 21 is subjected to heat exchange with the air flow, generated by the chiller fan 26, to be condensed or to radiate heat. In addition, during the reverse cycle operation, in the heat transfer medium heat exchanger 22, the high-pressure refrigerant discharged from the refrigerant compressor 21 is subjected to heat exchange with the heat transfer medium in the heat transfer medium circuit C1 to be condensed or to radiate heat. The refrigerant that is condensed or that has radiated heat in one of the refrigerant heat exchanger 24 and the heat transfer medium heat exchanger 22 is decompressed in the refrigerant expansion valve 23 to be the low-pressure refrigerant. Then, the refrigerant flows into the other heat exchanger and is subjected to heat exchange with the heat transfer medium or the air flow to be evaporated or to be heated. Then, the refrigerant is sucked into the refrigerant compressor 21 again.

In the outdoor-air heat exchanger 33, the outdoor-air OA is subjected to heat exchange with the heat transfer medium.

In the outdoor-air heat exchanger 33, the outdoor-air OA is cooled (or dehumidified) during cooling operation and is heated during the heating operation. The outdoor-air OA that has passed through the outdoor-air heat exchanger 33 is sent to the air supply duct 45 (the target space SP). In a case where the humidifier 35 is in operation, the air that is heated by being subjected to heat exchange with the heat transfer medium in the outdoor-air heat exchanger 33 is humidified by the humidifier 35 and then is sent to the air supply duct 45.

(2-2) Air Conditioner 50 (Air Conditioner)

Figure 4:
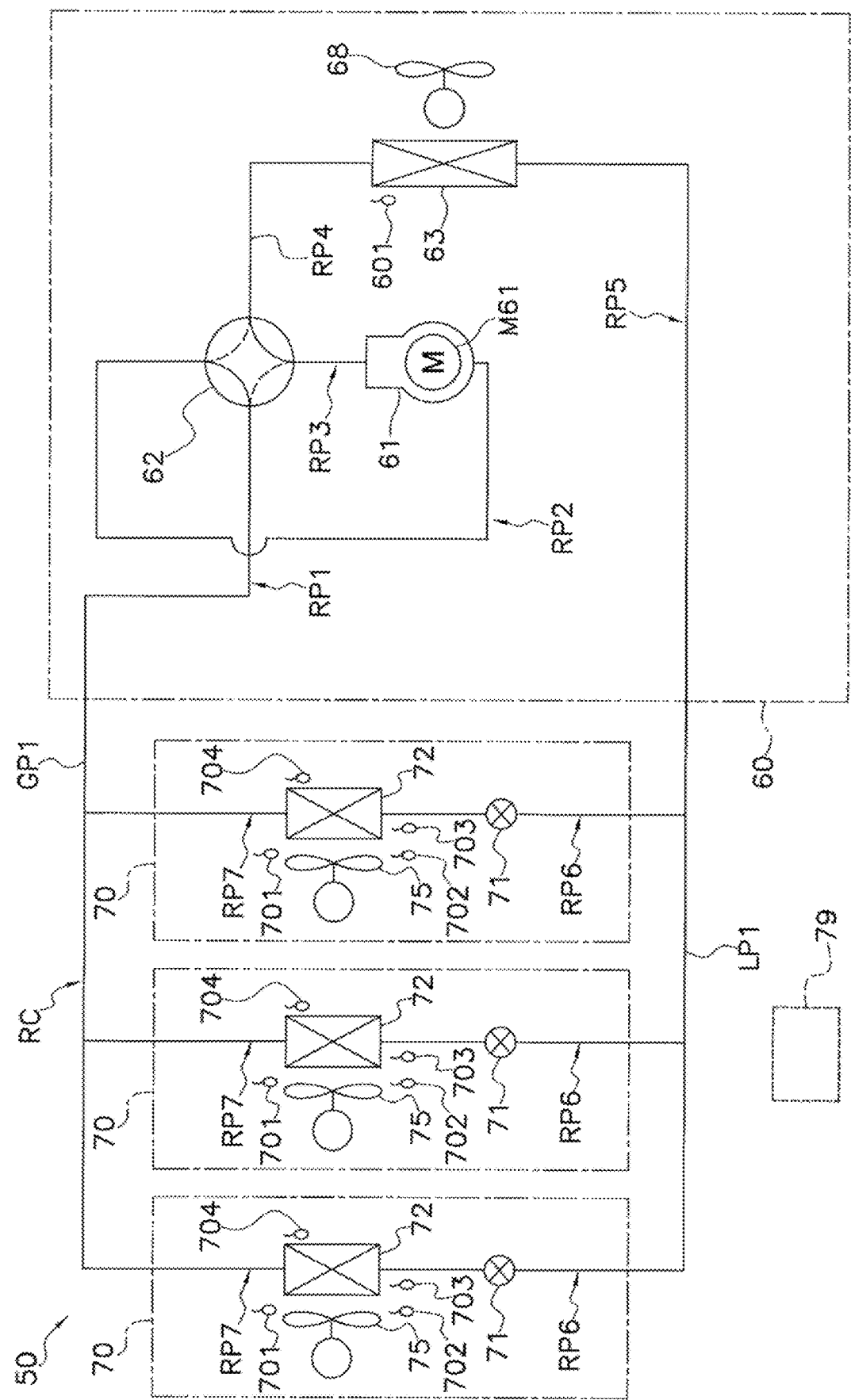
FIG. 4 is schematic diagram illustrating the configuration of an indoor-air conditioner.

FIG. 4 is a schematic diagram illustrating the configuration of the indoor-air conditioner 50. The indoor-air conditioner 50 includes a refrigerant circuit RC, and performs a vapor-compression refrigerating cycle by circulating the refrigerant in the refrigerant circuit RC to perform air conditioning such as cooling, dehumidification, heating, or the like of the target space SP. The indoor-air conditioner 50 has a plurality of operating modes and operates in accordance with the operating mode. Specifically, the indoor-air conditioner 50 performs cooling operation in which cooling is performed, dehumidifying operation in which dehumidification is performed, heating operation in which heating is performed, and the like.

The indoor-air conditioner 50 mainly includes a single outdoor unit 60 as a heat source unit, a plurality of (three in this embodiment) indoor units 70 as units to be used, and an indoor-air conditioner control unit 79. In the indoor-air conditioner 50, the outdoor unit 60 and each of the indoor units 70 are connected via a liquid-side refrigerant connection pipe LP1 and a gas-side refrigerant connection pipe GP1, thereby forming the refrigerant circuit RC. Note that the refrigerant to be sealed in the refrigerant circuit RC is not limited to a particular one. For example, a HFC refrigerant such as R32 or R410A is charged.

(2-2-1) Outdoor Unit 60 (Refrigerant Adjusting Unit)

The outdoor unit 60 is provided outside the target space SP. In this embodiment, the outdoor unit 60 is provided outdoors.

The outdoor unit 60 is connected to the indoor units 70 via the liquid-side refrigerant connection pipe LP1 and the gas-side refrigerant connection pipe GP1 and forms a part of the refrigerant circuit RC. The outdoor unit 60 mainly includes a compressor 61, a four-way switching valve 62, an outdoor heat exchanger 63, and an outdoor fan 68.

The outdoor unit 60 further includes a plurality of refrigerant pipes RP (first refrigerant pipe RP1 to fifth refrigerant pipe RP5). The first refrigerant pipe RP1 connects the gas-side refrigerant connection pipe GP1 and the four-way switching valve 62. The second refrigerant pipe RP2 connects the four-way switching valve 62 and the intake side of the compressor 61. The third refrigerant pipe RP3 connects the discharge side of the compressor 61 and the four-way switching valve 62. The fourth refrigerant pipe RP4 connects the four-way switching valve 62 and the gas-side port of the outdoor heat exchanger 63. The fifth refrigerant pipe RP5 connects the liquid-side port of the outdoor heat exchanger 63 and the liquid-side refrigerant connection pipe LP1.

The compressor 61 is an apparatus which compresses a low-pressure refrigerant to a high-pressure refrigerant in the refrigerating cycle. In this embodiment, a hermetic compressor having a compressor motor M61 therein is employed as the compressor 61. The compressor 61 contains a positive displacement compression element (omitted from illustration) such as a rotary compression element or a scroll compression element, and the compression element is rotationally driven by the compressor motor M61. The operating frequency of the compressor motor M61 is controlled by an inverter, and thereby, the capacity of the compressor 61 is controlled. That is, the capacity of the compressor 61 is variable.

The four-way switching valve 62 is passage switching means for switching the flow of refrigerant in the refrigerant circuit RC. The state of the four-way switching valve 62 is controlled in accordance with a status. During the normal cycle operation (cooling operation or dehumidifying operation), the four-way switching valve 62 is controlled to be in a first state (see the solid line in the four-way switching valve 62 in FIG. 4) in which the first refrigerant pipe RP1 and the second refrigerant pipe RP2 are connected and the third refrigerant pipe RP3 and the fourth refrigerant pipe RP4 are connected. In addition, in the reverse cycle operation (heating operation), the four-way switching valve 62 is controlled to be in a second state (see the broken in the four-way switching valve 62 in FIG. 4) in which the first refrigerant pipe RP1 and the third refrigerant pipe RP3 are connected and the second refrigerant pipe RP2 and the fourth refrigerant pipe RP4 are connected.

The outdoor heat exchanger 63 causes heat exchange between a passing air flow (an outdoor air flow generated by the outdoor fan 68) and the refrigerant. The outdoor heat exchanger 63 serves as a condenser or radiator of the refrigerant during the normal cycle operation and as an evaporator of the refrigerant during the reverse cycle operation.

The outdoor fan 68 generates an outdoor air flow. The outdoor air flow is the flow of the outdoor-air OA that flows into the outdoor unit 60, passes through the outdoor heat exchanger 63, and flows out of the outdoor unit 60. The outdoor air flow is a cooling source of the refrigerant in the outdoor heat exchanger 63 during the normal cycle operation and is a heating source of the refrigerant in the outdoor heat exchanger 63 during the reverse cycle operation. The outdoor fan 68 includes a fan motor, and the fan motor is inverter-controlled, thereby adjusting the number of revolutions. That is, the air volume of the outdoor fan 68 is variable.

Various sensors are provided in the outdoor unit 60. Examples of the various sensors provided in the outdoor unit 60 include an intake pressure sensor that detects the pressure of the refrigerant to be sucked into the compressor 61, a discharge pressure sensor that detects the pressure of the refrigerant to be discharged from the compressor 61, and the like (illustration is omitted).

(2-2-2) Indoor Units 70

The indoor units 70 are provided in the target spaces SP. In this embodiment, each of the indoor units 70 corresponds to a corresponding one of the target spaces SP and is provided in the corresponding target space SP. In this embodiment, each of the indoor units 70 is a ceiling-embedded air-conditioning indoor unit provided in the ceiling CL of the target space SP. Each of the indoor units 70 is provided so as to expose an intake opening and a blow-out opening from the ceiling CL in the target space SP (see FIG. 3).

The indoor units 70 are connected to the outdoor unit 60 via the liquid-side refrigerant connection pipe LP1 and the gas-side refrigerant connection pipe GP1 and form a part of the refrigerant circuit RC. In this embodiment, the three indoor units 70 are connected to the single outdoor unit 60. The indoor units 70 are provided in parallel to each other.

Each of the indoor units 70 includes an expansion valve 71 and an indoor heat exchanger 72. In addition, each of the indoor units 70 further includes a sixth refrigerant pipe RP6 that connects a liquid-side port of the indoor heat exchanger 72 and the liquid-side refrigerant connection pipe LP1, and a seventh refrigerant pipe RP7 that connects the gas-side port of the indoor heat exchanger 72 and the gas-side refrigerant connection pipe GP1.

The expansion valve 71 serves as means for decompressing the refrigerant or means for adjusting the flow rate. In this embodiment, the expansion valve 71 is an electric expansion valve the opening degree of which can be controlled, and is provided in the sixth refrigerant pipe RP6 (more specifically, between the indoor heat exchanger 72 and the liquid-side refrigerant connection pipe LP1).

The indoor heat exchanger 72 (indoor-air conditioner heat exchanger) causes heat exchange between a passing air flow (an indoor air flow generated by an indoor fan 75) and the refrigerant. The indoor heat exchanger 72 serves as an evaporator of the refrigerant during the normal cycle operation. The outdoor heat exchanger 63 serves as a condenser or radiator of the refrigerant during the reverse cycle operation.

The indoor fan 75 (second fan) generates an indoor air flow. The indoor air flow is the flow of the indoor-air IA that flows into the indoor unit 70, passes through the indoor heat exchanger 72, and flows out of the indoor unit 70. The indoor air flow is a heating source of the refrigerant in the indoor heat exchanger 72 during the normal cycle operation and is a cooling source of the refrigerant in the indoor heat exchanger 72 during the reverse cycle operation. The indoor fan 75 includes a fan motor, and the fan motor is inverter-controlled, thereby adjusting the number of revolutions. That is, the air volume of the indoor fan 75 is variable.

Various sensors are provided in the indoor unit 70. Examples of the various sensors provided in the indoor unit 70 include an indoor temperature sensor 701 that detects the temperature of the indoor air flow (the indoor-air IA) to be sucked into the indoor unit 70, an indoor humidity sensor 702 that detects the humidity thereof, and a carbon dioxide concentration sensor 703 that detects the carbon dioxide concentration thereof. Examples further include a refrigerant temperature sensor 704 that detects the temperature of the refrigerant in the indoor heat exchanger 72. The refrigerant temperature sensor 704 is provided in the indoor heat exchanger 72 and detects the evaporation temperature of the refrigerant during the normal cycle operation.

(2-2-3) Air-Conditioner Control Unit 79

The indoor-air conditioner control unit 79 is a functional unit that controls operations of the units included in the indoor-air conditioner 50. The indoor-air conditioner control unit 79 is formed of a CPU, a memory, various electric components, and the like. The indoor-air conditioner control unit 79 is connected to devices included in the indoor-air conditioner 50 via wiring. In addition, the indoor-air conditioner control unit 79 is electrically connected to the various sensors provided in the indoor unit 70. Furthermore, the indoor-air conditioner control unit 79 is connected to the remote controller 80 that is provided in the common target space SP so that communication can be performed therebetween. In addition, the indoor-air conditioner control unit 79 is electrically connected to the remote controller 80 and the general control unit 90 via a communication line.

In this embodiment, the indoor-air conditioner control unit 79 is formed by electrically connecting microcomputers provided in the outdoor unit 60 and the indoor units 70 to the electric components.

The indoor-air conditioner control unit 79 (or the general control unit 90) sets a target value of the evaporation temperature (target evaporation temperature Te) in accordance with the set temperature and the load status in each of the indoor units 70, and appropriately adjusts the capacity of the compressor 61, the air volume of the outdoor fan 68, and the like on the basis of the target evaporation temperature Te. Thus, the operating capacity of the indoor-air conditioner 50 is appropriately changed.

(2-2-4) Flow of Refrigerant in Refrigerant Circuit RC

The flow of the refrigerant in the refrigerant circuit RC during the normal cycle operation and the reverse cycle operation will be individually described.

<During Normal Cycle Operation>

In the indoor-air conditioner 50, during the normal cycle operation (cooling operation or dehumidifying operation), the four-way switching valve 62 is controlled to be in the first state, and the refrigerant charged in the refrigerant circuit RC mainly circulates in the order of the compressor 61, the outdoor heat exchanger 63, the expansion valve 71 of the indoor unit 70 that is in operation, and the indoor heat exchanger 72 of the indoor unit 70 that is in operation (the refrigerant circulates in a normal cycle).

Upon start of the normal cycle operation, the capacity is controlled in accordance with a cooling load (specifically, target evaporation temperature Te) that is required for each of the indoor units 70. In the refrigerant circuit RC, the refrigerant is sucked into the compressor 61, compressed, and is then discharged. Note that the number of revolutions of the compressor 61 is appropriately adjusted. The gas refrigerant discharged from the compressor 61 passes through the third refrigerant pipe RP3, the four-way switching valve 62, and the fourth refrigerant pipe RP4 and flows into the gas-side port of the outdoor heat exchanger 63.

The gas refrigerant that flows into the gas-side port of the outdoor heat exchanger 63 is subjected to heat exchange with the outdoor-air OA supplied by the outdoor fan 68, radiates heat and is condensed to be a supercooled liquid refrigerant and flows out of the liquid-side port of the outdoor heat exchanger 63. The liquid refrigerant that flows out of the liquid-side port of the outdoor heat exchanger 63 passes through the fifth refrigerant pipe RP5 and the liquid-side refrigerant connection pipe LP1 and flows into the indoor unit 70 that is in operation.

The refrigerant that flows into the indoor unit 70 passes through the sixth refrigerant pipe RP6 and flows into the expansion valve 71 to be decompressed, and then flows into the liquid-side port of the indoor heat exchanger 72. Note that the opening degree of the expansion valve 71 is appropriately adjusted. The refrigerant that flows into the liquid-side port of the indoor heat exchanger 72 is subjected to heat exchange with the indoor-air IA supplied by the indoor fan 75 and is evaporated to be a superheated gas refrigerant and flows out of the gas-side port of the indoor heat exchanger 72.

The gas refrigerant that flows out of the gas-side port of the indoor heat exchanger 72 passes through the seventh refrigerant pipe RP7, the gas-side refrigerant connection pipe GP1, the first refrigerant pipe RP1, the four-way switching valve 62, and the second refrigerant pipe RP2, and is sucked into the compressor 61 again.

<During Inverse Cycle Operation>

In the indoor-air conditioner 50, during the reverse cycle operation (heating operation), the four-way switching valve 62 is controlled to be in the second state, and the refrigerant charged in the refrigerant circuit RC mainly circulates in the order of the compressor 61, the indoor heat exchanger 72 of the indoor unit 70 that is in operation, the expansion valve 71 of the indoor unit 70 that is in operation, and the outdoor heat exchanger 63 (the refrigerant circulates in an reverse cycle).

Upon start of the reverse cycle operation, the capacity is controlled in accordance with a heating load that is required for each of the indoor units 70. In the refrigerant circuit RC, the refrigerant is sucked into the compressor 61, compressed, and is then discharged. Note that the number of revolutions of the compressor 61 is appropriately adjusted. The gas refrigerant discharged from the compressor 61 passes through the third refrigerant pipe RP3, the four-way switching valve 62, and the first refrigerant pipe RP1, flows into the indoor unit 70 that is in operation, passes through the seventh refrigerant pipe RP7, and flows into the gas-side port of the indoor heat exchanger 72.

The gas refrigerant that flows into the gas-side port of the indoor heat exchanger 72 is subjected to heat exchange with the indoor-air IA supplied by the indoor fan 75, radiates heat and is condensed to be a supercooled liquid refrigerant and flows out of the liquid-side port of the outdoor heat exchanger 63. The liquid refrigerant that flows out of the liquid-side port of the indoor heat exchanger 72 passes through the fifth refrigerant pipe RP5 and flows into the expansion valve 71 to be decompressed, and then flows out of the indoor unit 70. Note that the opening degree of the expansion valve 71 is appropriately adjusted.

The refrigerant that flows out of the indoor unit 70 passes through the liquid-side refrigerant connection pipe LP1 and flows into the outdoor unit 60. The refrigerant that flows into the outdoor unit 60 passes through the fifth refrigerant pipe RP5 and flows into of the liquid-side port of the outdoor heat exchanger 63. The refrigerant that flows into the outdoor heat exchanger 63 is subjected to heat exchange with the outdoor-air OA supplied by the outdoor fan 68 and is evaporated to be a superheated gas refrigerant and flows out of the gas-side port of the outdoor heat exchanger 63. The refrigerant that flows out of the outdoor heat exchanger 63 passes through the fourth refrigerant pipe RP4, the four-way switching valve 62, and the second refrigerant pipe RP2 and is sucked into the compressor 61 again.

(2-3) Remote Controller 80

The remote controller 80 is an input apparatus with which a user inputs various commands for individually switching the operation state (e.g., start/stop, operation type, set temperature, set humidity, or set air volume) of the outdoor-air conditioner 10 and the operation state of the indoor-air conditioner 50. In addition, the remote controller 80 also serves as a display apparatus for displaying predetermined information (e.g., the operation state of the outdoor-air conditioner 10, the operation state of the indoor-air conditioner 50, the temperature and humidity of the indoor-air IA, or the temperature and humidity of the outdoor-air OA).

(2-4) General Control Unit 90 (Control Unit)

Figure 5:
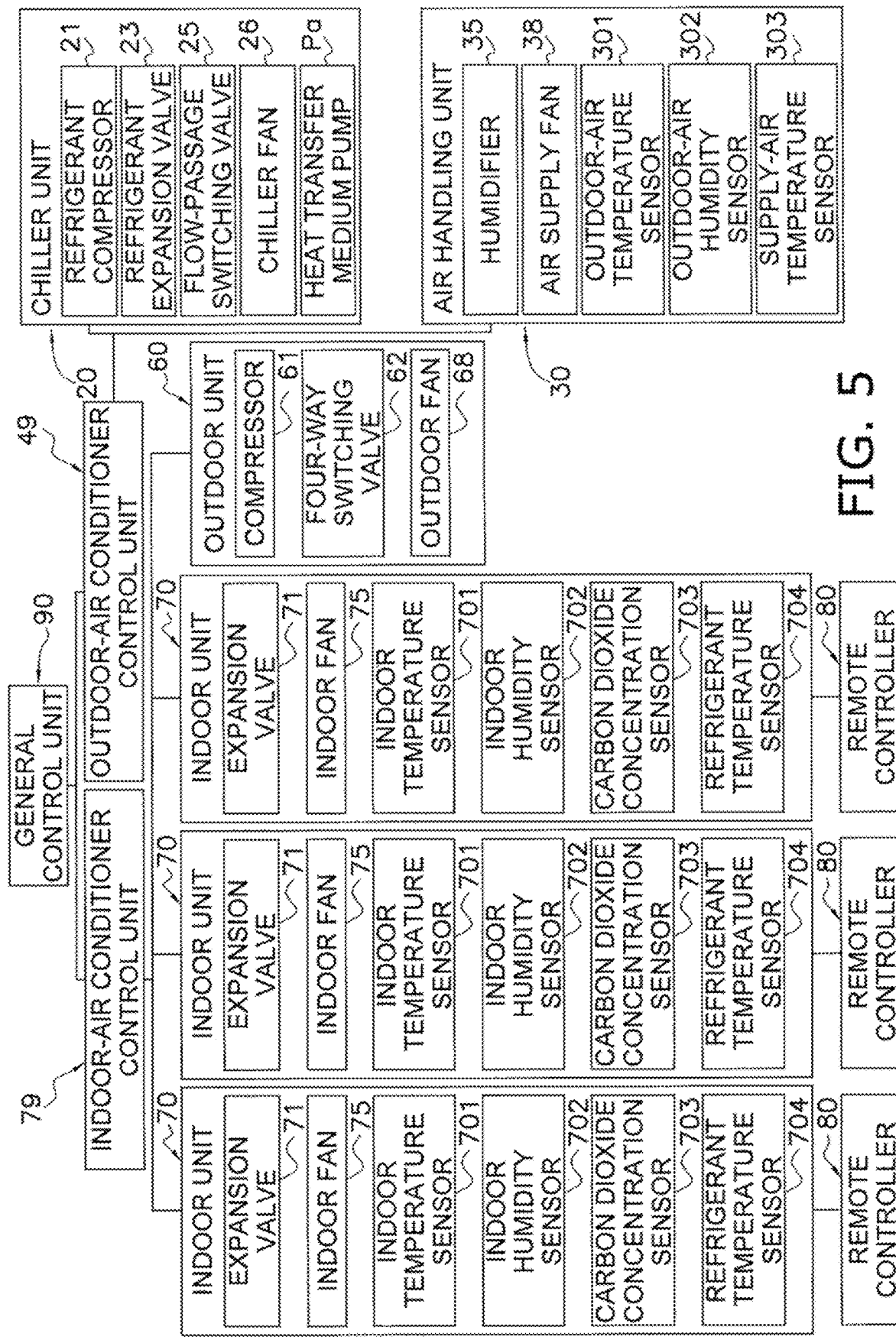
FIG. 5 is a block diagram schematically illustrating a general control unit and components connected to the general control unit.

FIG. 5 is a block diagram schematically illustrating the general control unit 90 and the components connected to the general control unit 90. The general control unit 90 is a functional unit that generally controls the operations of the air conditioning system 100 and is specifically a computer formed of a memory, a CPU, and the like. The general control unit 90 is electrically connected to the outdoor-air conditioner control unit 49 and the indoor-air conditioner control unit 79 and transmits and receives signals therebetween. The general control unit 90 transmits predetermined signals (e.g., control signals for setting the target supply-air temperature Tsa and the target evaporation temperature Te) to the outdoor-air conditioner control unit 49 and the indoor-air conditioner control unit 79 so as to control the operations of devices in the outdoor-air conditioner 10 and the indoor-air conditioner 50. In addition, the general control unit 90 receives the predetermined signals transmitted from the outdoor-air conditioner control unit 49 and the indoor-air conditioner control unit 79 so as to acquire detection values of various sensors in the outdoor-air conditioner 10 and the indoor-air conditioner 50 and information for identifying the operation states of the outdoor-air conditioner 10 and the indoor-air conditioner 50.

Figure 6:
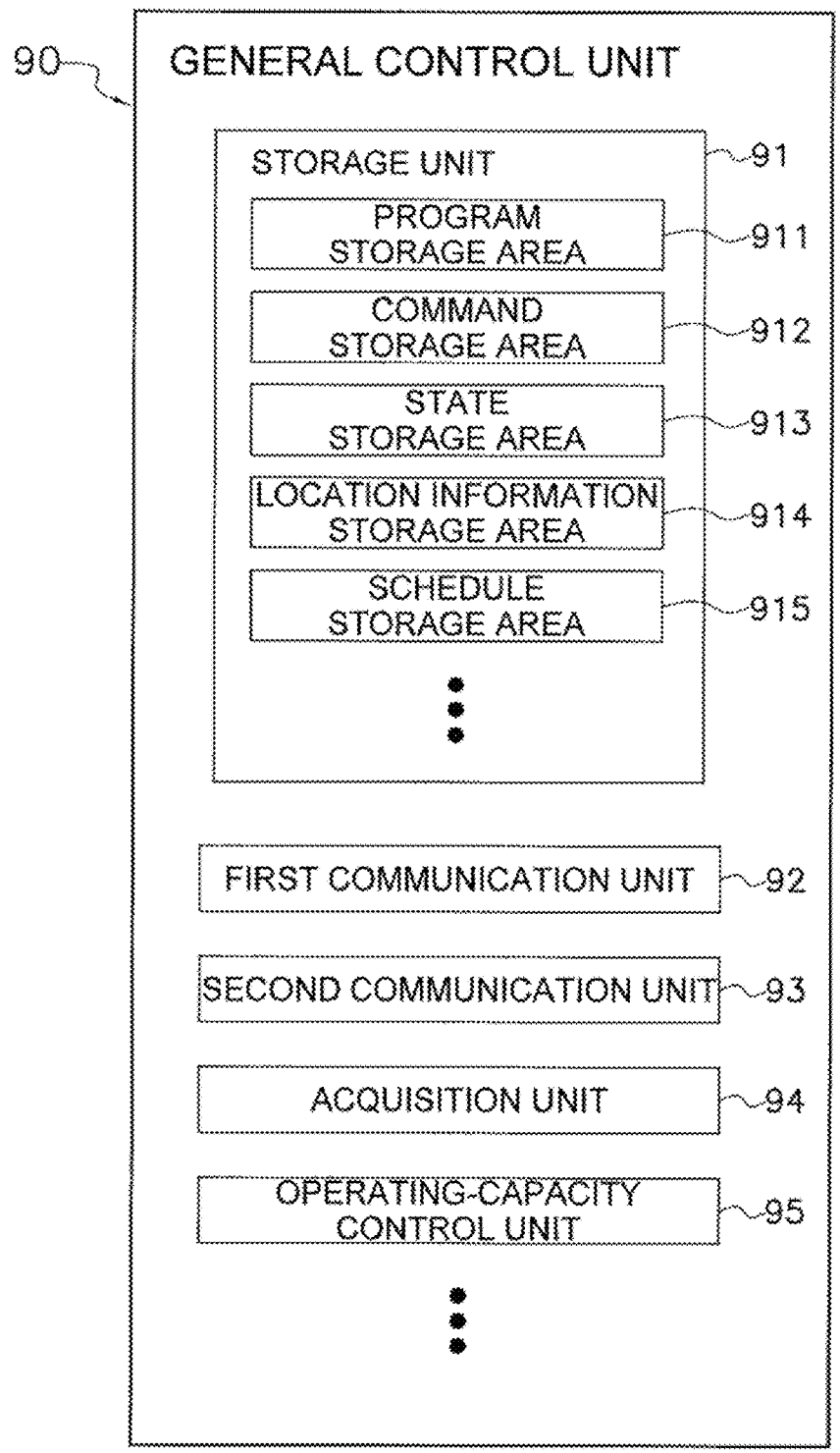
FIG. 6 is a block diagram schematically illustrating functional units included in the general control unit.

FIG. 6 is a block diagram schematically illustrating functional units included in the general control unit 90. As illustrated in FIG. 6, the general control unit 90 includes functional units such as a storage unit 91, a first communication unit 92, a second communication unit 93, an acquisition unit 94, and an operating-capacity control unit 95. Note that the functional units are realized by the memory, the CPU, and/or various electric components functioning alone or in cooperation.

(2-4-1) Storage Unit 91

The storage unit 91 is formed of any of memories such as a RAM, a ROM, and a flash memory and includes a plurality of storage regions. For example, the storage unit 91 includes a program storage area 911, a command storage area 912, a state storage area 913, a location information storage area 914, a schedule storage area 915, and the like.

The program storage area 911 stores a control program to be executed in each component of the general control unit 90. The control program is appropriately updated by a manager.

The command storage area 912 stores a command (e.g., a command regarding the operation type, the set temperature, or the set air volume) that is input by the user.

The state storage area 913 stores detection values of the sensors (301 to 303, 701 to 704, and the like) and information for identifying the operation state of the outdoor-air conditioner 10 (e.g., the target supply-air temperature Tsa) and the operation state of the indoor-air conditioner 50 (e.g., the target evaporation temperature Te, the thermo-off status, or the thermo-on status).

The location information storage area 914 stores information regarding the location (the building BL in this embodiment) to which the air conditioning system 100 is applied (information for identifying an area, an installed story, or the like).

The schedule storage area 915 stores an operation schedule of the outdoor-air conditioner 10 and the indoor-air conditioner 50.

(2-4-2) First Communication Unit 92

The first communication unit 92 performs communication with the outdoor-air conditioner 10 (the outdoor-air conditioner control unit 49). The first communication unit 92 includes a communication module, an adaptor, and the like for transmitting and receiving signals.

(2-4-3) Second Communication Unit 93

The second communication unit 93 performs communication with the indoor-air conditioner 50 (the indoor-air conditioner control unit 79). The second communication unit 93 includes a communication module, an adaptor, and the like for transmitting and receiving signals.

(2-4-4) Acquisition Unit 94

The acquisition unit 94 requests and obtains predetermined information (e.g., detection values of various sensors or information for identifying operation states) to the outdoor-air conditioner 10 and the indoor-air conditioner 50 at predetermined timing in accordance with a control program.

(2-4-5) Operating-Capacity Control Unit 95

The operating-capacity control unit 95 calculates a heating load to be processed in the air conditioning system 100 in accordance with a control program on the basis of various kinds of information stored in the storage unit 91. In accordance with a status, the operating-capacity control unit 95 determines the operating capacities of the outdoor-air conditioner 10 and the indoor-air conditioner 50 (in particular, the target supply-air temperature Tsa and the target evaporation temperature Te) and transmits the determined operating capacities to the outdoor-air conditioner 10 and the indoor-air conditioner 50.

In order to achieve both comfortableness and energy conservation, the operating-capacity control unit 95 performs cooperative load control in accordance with a status. Specifically, the operating-capacity control unit 95 performs the cooperative load control in accordance with the status of the outdoor-air OA (e.g., temperature or humidity), the status of the indoor-air IA (e.g., temperature or humidity), the operation status of the outdoor-air conditioner 10 (e.g., the start/stop status, the operation type, the air volume of the air supply fan 38, or the state of the heat transfer medium (e.g., flow rate, temperature, or pressure), or the target supply-air temperature Tsa), and/or the operation status of the indoor-air conditioner 50 (e.g., the start/stop status of each of the indoor units 70, the operation type, the air volume of the indoor fan, or the state of the refrigerant (e.g., flow rate, temperature, or pressure), or the target evaporation temperature Te).

In the cooperative load control, the operating-capacity control unit 95 controls the operating capacity of the outdoor-air conditioner 10 and the operating capacity of the indoor-air conditioner 50 in cooperation. Specifically, in the cooperative load control, the operating-capacity control unit 95 controls at least one of a parameter of the outdoor-air conditioner 10 (the target supply-air temperature Tsa) and a parameter of the indoor-air conditioner 50 (the target evaporation temperature Te) such that the temperature or humidity of the indoor-air IA in the target space SP approaches the set value and also the total amount of the power consumption of the outdoor-air conditioner 10 and the power consumption of the indoor-air conditioner 50 is reduced.

Note that the operating-capacity control unit 95 calculates the power consumption of the outdoor-air conditioner 10 according to a predefined formula for calculating the power consumption of the outdoor-air conditioner 10 in accordance with the status of the outdoor-air OA, the operation status of the outdoor-air conditioner 10, and the like. In addition, the operating-capacity control unit 95 calculates the power consumption of the indoor-air conditioner 50 according to a predefined formula for calculating the power consumption of the indoor-air conditioner 50 in accordance with the status of the indoor-air IA, the operation status of the indoor-air conditioner 50, and the like.

Details of the cooperative load control will be described later.

(3) Process Flow of General Control Unit 90

The general control unit 90 controls the operations of the outdoor-air conditioner 10 and the indoor-air conditioner 50 as follows, for example.

(3-1) During Cooling Operation

Figure 7:
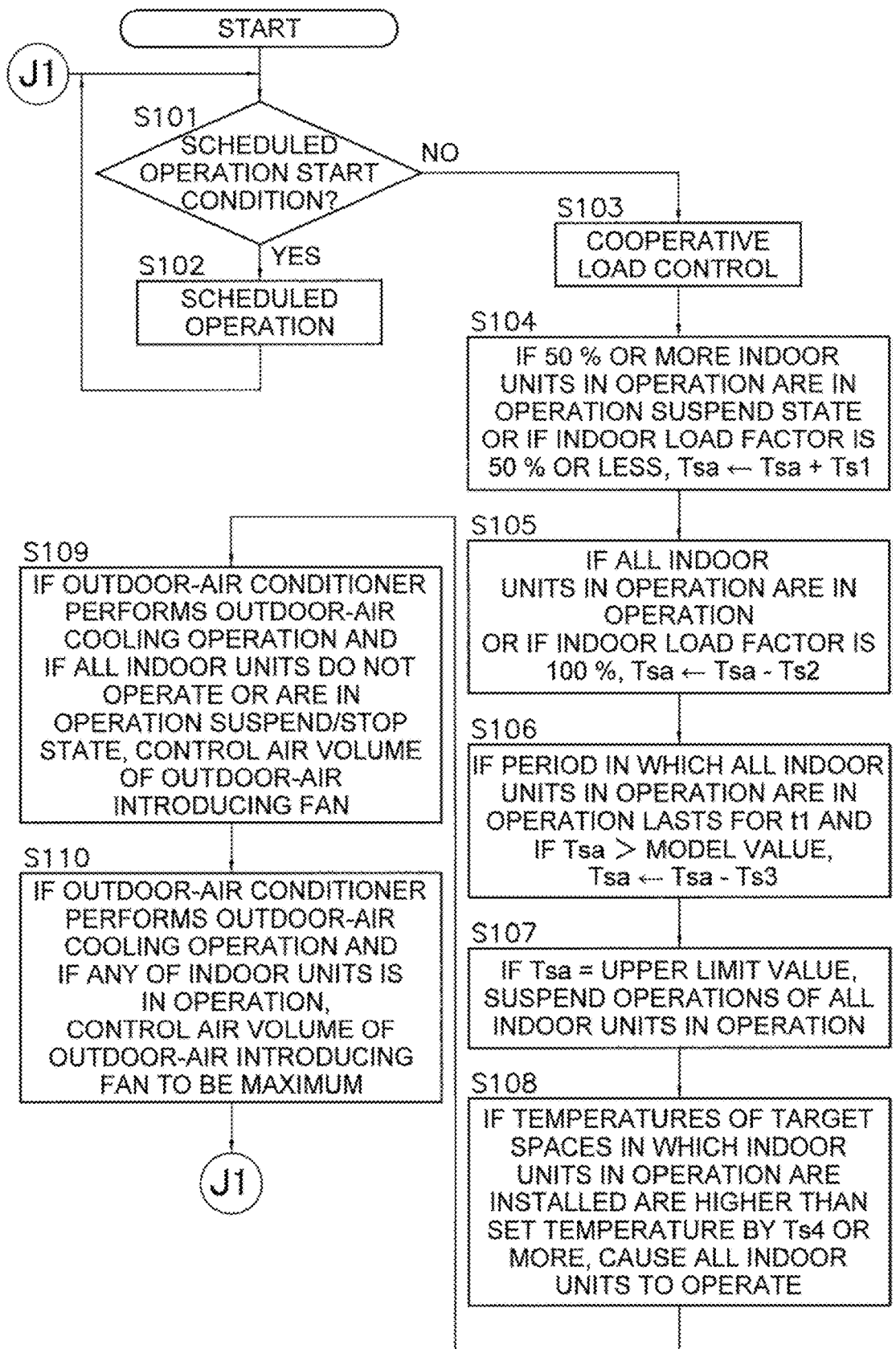
FIG. 7 is a flowchart illustrating an example of a process flow of the general control unit during cooling operation.

FIG. 7 is a flowchart illustrating an example of a process flow of the general control unit 90 during cooling operation. Note that the process flow illustrated in FIG. 7 is an example and may be modified as appropriate. For example, the order of steps may be changed as long as no contradiction occurs, a step may be performed concurrently with another step, or a new step may be added.

In step S101, if a scheduled operation executing condition is satisfied (YES), the general control unit 90 proceeds to step S102; if the scheduled operation condition is not satisfied (NO), the general control unit 90 proceeds to step S103. The scheduled operation executing condition herein is set in advance in the control program on the basis of an installed environment or a design specification, and is set on the basis of time, for example.

In step S102, on the basis of the operation schedule, the general control unit 90 starts or continues the scheduled operation of the indoor-air conditioner 50. Subsequently, the process proceeds to step S103. The scheduled operation herein is an operation for which a predetermined operation item (e.g., operation type, set temperature, humidity, air volume, or operation time) is set in advance in accordance with the operation schedule in the control program.

In step S103, the general control unit 90 starts or continues the cooperative load control. The cooperative load control is performed so as to reduce the total power consumption (increase energy conservation) while comfortableness is maintained, by controlling the ratio of the operating capacities of the outdoor-air conditioner 10 and the indoor-air conditioner 50 (i.e., controlling the operating capacities of the outdoor-air conditioner 10 and the indoor-air conditioner 50 in cooperation) in real time in accordance with a status, in order to allocate the heating load to be processed in the air conditioning system 100 to the outdoor-air conditioner 10 and the indoor-air conditioner 50 appropriately. In the cooperative load control, normally, model values that are defined in advance in the control program are set as the target supply-air temperature Tsa of the outdoor-air conditioner 10 and the target evaporation temperature Te of the indoor-air conditioner 50. However, the target supply-air temperature Tsa and the target evaporation temperature Te are changed as appropriate depending on a status. Subsequently, the process proceeds to step S104.

In step S104, if 50% or more indoor units 70 in operation are in an operation suspend state (thermo-off status) or if an indoor load factor is 50% or less, the general control unit 90 increases the target supply-air temperature Tsa of the outdoor-air conditioner 10 by a first reference value Ts1 (e.g., 1° C.). This is based on the idea that the operating capacity of the outdoor-air conditioner 10 is reduced so as to save energy (save power) in a situation in which it is assumed that the processing load in the air conditioning system 100 is reduced. Note that as the first reference value Ts1, an appropriate value is set based on the installed environment or design specification. Subsequently, the process proceeds to step S105.

In step S105, if all the indoor units 70 in operation are in operation (thermo-on status) or if the indoor load factor is 100%, the general control unit 90 reduces the target supply-air temperature Tsa of the outdoor-air conditioner 10 by a second reference value Ts2 (e.g., 1° C.). This is based on the idea that the operating capacity of the outdoor-air conditioner 10 is increased for load dispersion so as to save energy while realizing comfortableness in a situation in which it is assumed that the processing load in the air conditioning system 100 is high. Note that as the second reference value Ts2, an appropriate value is set based on the installed environment or design specification. Subsequently, the process proceeds to step S106.

In step S106, if the period in which all the indoor units 70 in operation are in operation (thermo-on status) lasts for a predetermined time t1 (e.g., one hour) and if the target supply-air temperature Tsa of the outdoor-air conditioner 10 is higher than a model value, the general control unit 90 reduces the target supply-air temperature Tsa by a third reference value Ts3 (e.g., 1° C.). This is based on the idea that the operating capacity of the outdoor-air conditioner 10 is increased for load dispersion so as to save energy while realizing comfortableness in a situation in which it is assumed that the processing load in the air conditioning system 100 is high. Note that as the third reference value Ts3 and the predetermined time t1, appropriate values are set based on the installed environment or design specification. Subsequently, the process proceeds to step S107.

In step S107, if the target supply-air temperature Tsa is equal to an upper limit value, the general control unit 90 stops the operations of all the indoor units 70 (sets the thermo-off status). This is based on the idea that the operations of the indoor units 70 are stopped (the operating capacity of the outdoor-air conditioner 10 is reduced) so as to save energy in a situation in which it is assumed that the processing load in the air conditioning system 100 is reduced. Subsequently, the process proceeds to step S108.

In step S108, if the temperatures of the target spaces SP (the temperature of the indoor-air IA) in which the indoor units 70 in operation are installed are higher than the set temperature by a fourth reference value Ts4 (e.g., 2° C.) or more, the general control unit 90 causes all the indoor units 70 to operate. Subsequently, the process proceeds to step S109.

In step S109, if the outdoor-air conditioner 10 performs outdoor-air cooling operation and if all the indoor units 70 do not operate or are in an operation stop state, the general control unit 90 adjusts the air volume of the air supply fan 38 of the outdoor-air conditioner 10 as appropriate. Subsequently, the process proceeds to step S110.

In step S110, if the outdoor-air conditioner 10 performs outdoor-air cooling operation and if any of the indoor units 70 is in operation (thermo-on status), the general control unit 90 controls the air volume of the outdoor-air conditioner 10 to be maximum that is set as the air volume for the outdoor-air cooling operation. Subsequently, the process returns to step S101.

(3-2) During Heating Operation

Figure 8:
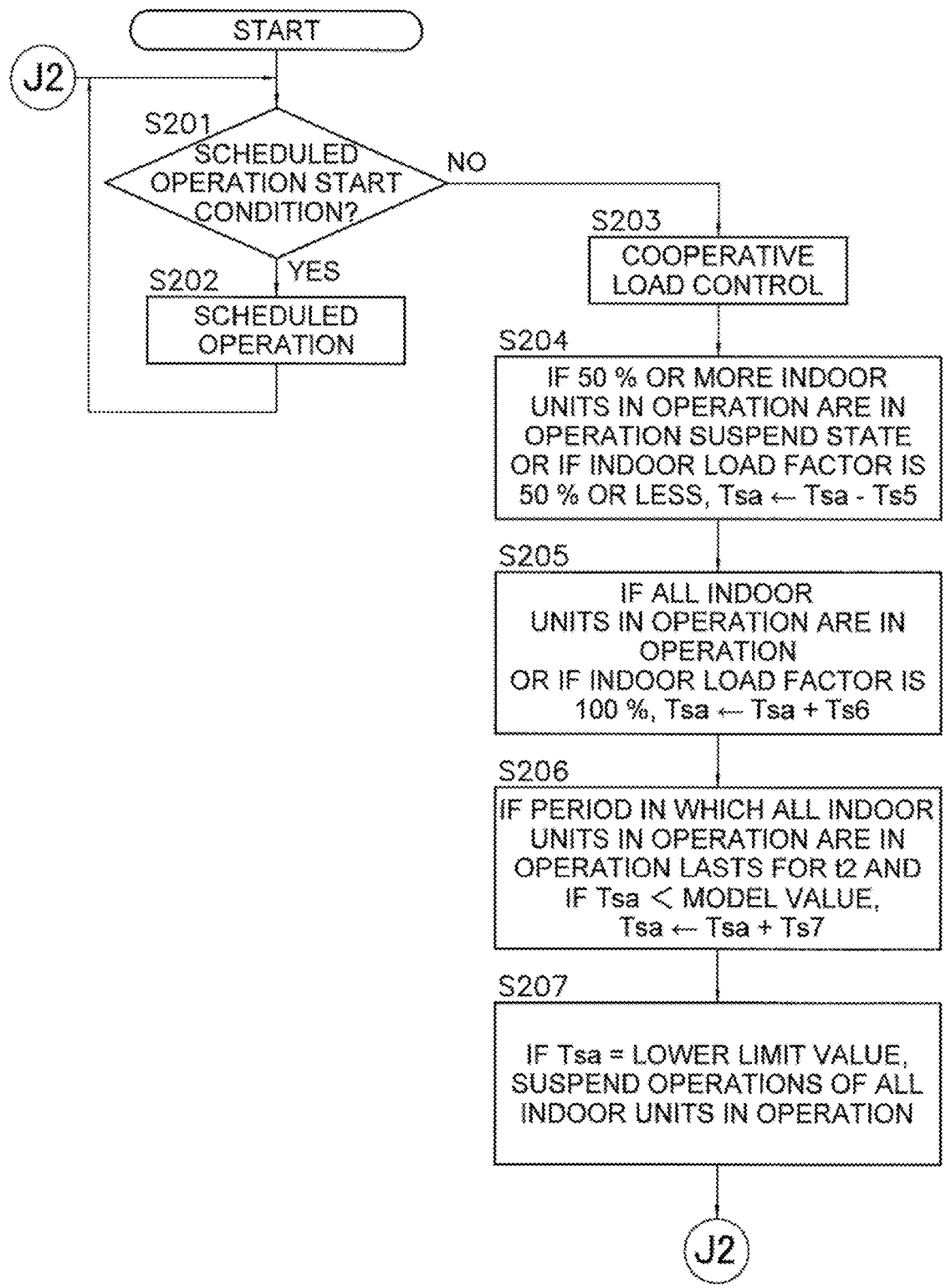
FIG. 8 is a flowchart illustrating an example of a process flow of the general control unit during heating operation.

FIG. 8 is a flowchart illustrating an example of a process flow of the general control unit 90 during heating operation. Note that the process flow illustrated in FIG. 8 is an example and may be modified as appropriate. For example, the order of steps may be changed as long as no contradiction occurs, a step may be performed concurrently with another step, or a new step may be added.

In step S201, if a scheduled operation executing condition is satisfied (YES), the general control unit 90 proceeds to step S202; if the scheduled operation condition is not satisfied (NO), the general control unit 90 proceeds to step S203. The scheduled operation executing condition herein is set in advance in the control program on the basis of an installed environment or a design specification, and is set on the basis of time, for example.

In step S202, on the basis of the operation schedule, the general control unit 90 starts or continues the scheduled operation of the indoor-air conditioner 50. Subsequently, the process proceeds to step S203.

In step S203, the general control unit 90 starts or continues the cooperative load control. In the cooperative load control, normally, model values that are defined in advance in the control program are set as the target supply-air temperature Tsa of the outdoor-air conditioner 10 and the target evaporation temperature Te of the indoor-air conditioner 50. Subsequently, the process proceeds to step S204.

In step S204, if 50% or more indoor units 70 in operation are in an operation stop state (thermo-off status) or if the indoor load factor is 50% or less, the general control unit 90 decreases the target supply-air temperature Tsa of the outdoor-air conditioner 10 by a fifth reference value Ts5 (e.g., 1° C.). This is based on the idea that the operating capacity of the outdoor-air conditioner 10 is reduced so as to save energy in a situation in which it is assumed that the processing load in the air conditioning system 100 is reduced. Note that as the fifth reference value Ts5, an appropriate value is set based on the installed environment or design specification. Subsequently, the process proceeds to step S205.

In step S205, if all the indoor units 70 in operation are in operation (thermo-on status) or if the indoor load factor is 100%, the general control unit 90 increases the target supply-air temperature Tsa of the outdoor-air conditioner 10 by a sixth reference value Ts6 (e.g., 1° C.). This is based on the idea that the operating capacity of the outdoor-air conditioner 10 is increased for load dispersion so as to save energy while realizing comfortableness in a situation in which it is assumed that the processing load in the air conditioning system 100 is high. Note that as the sixth reference value Ts6, an appropriate value is set based on the installed environment or design specification. Subsequently, the process proceeds to step S206.

In step S206, if the period in which all the indoor units 70 in operation are in operation (thermo-on status) lasts for a predetermined time t2 (e.g., one hour) and if the target supply-air temperature Tsa of the outdoor-air conditioner 10 is higher than a model value, the general control unit 90 increases the target supply-air temperature Tsa by a seventh reference value Ts7 (e.g., 1° C.). This is based on the idea that the operating capacity of the outdoor-air conditioner 10 is increased for load dispersion so as to save energy while realizing comfortableness in a situation in which it is assumed that the processing load in the air conditioning system 100 is high. Note that as the seventh reference value Ts7 and the predetermined time t2, appropriate values are set based on the installed environment or design specification. Subsequently, the process proceeds to step S207.

In step S207, if the target supply-air temperature Tsa is equal to a lower limit value, the general control unit 90 stops the operations of all the indoor units 70 (sets the thermo-off status). This is based on the idea that the operations of the indoor units 70 are stopped (the operating capacity of the outdoor-air conditioner 10 is reduced) so as to save energy in a situation in which it is assumed that the processing load in the air conditioning system 100 is reduced. Subsequently, the process returns to step S201.

(4) Regarding Cooperative Load Control 4-1

In the related art, typically, an outdoor-air conditioner has processed an outdoor-air load, and an indoor-air conditioner (indoor unit) has processed an indoor load. In accordance with the outdoor-air load, the operating capacity (capability) of the outdoor-air conditioner has been set. In accordance with the indoor load, the operating capacity (capability) of the indoor-air conditioner has been set.

Note that an outdoor-air sensible-heat load, an outdoor-air latent-heat load, a sensible-heat processing capability of the outdoor-air conditioner, and a latent-heat processing capability of the outdoor-air conditioner are, for example, calculated as follows.

> Outside-air sensible-heat load=air volume×air density×air specific heat×(outdoor-air temperature−indoor temperature)

> Outside-air latent-heat load=air volume×air density×water vapor latent heat×(outdoor-air absolute humidity−indoor absolute humidity)

> Sensible-heat processing capability of outdoor-air conditioner=air volume×air density×air specific heat×(outdoor-air temperature−supply-air temperature)

> Latent-heat processing capability of the outside conditioner=air volume×air density×water vapor latent heat×(outdoor-air absolute humidity−supply-air absolute humidity)

In addition, in the related art, the outdoor-air conditioner has processed the outdoor-air latent-heat load such that the humidity (absolute humidity) of the supply air is less than or equal to the humidity (absolute humidity) of the target space. The indoor unit has adjusted the temperature such that the indoor temperature is equal to the set temperature by mainly adjusting a refrigerant circulation amount in a situation in which the evaporation temperature of the indoor heat exchanger is constant. Accordingly, the relationship between the supply-air temperature and the evaporation temperature has been constant regardless of the magnitude of the outdoor-air load or the indoor load. That is, typically, the indoor-air conditioner and the outdoor-air conditioner have been individually controlled.

Furthermore, the related art has proposed a thought for increasing comfortableness or energy conservation by correcting the supply-air temperature in accordance with the number of indoor units that are in operation. However, in this thought, energy conservation and comfortableness are in a trade-off relationship, and cases are assumed in which it is difficult to achieve both energy conservation and comfortableness.

In this light, in the above embodiment, since the general control unit 90 performs the cooperative load control, the operating capacities of the outdoor-air conditioner 10 and the indoor-air conditioner 50 are controlled in cooperation such that both operate with a high operation efficiency (i.e., the total of the power consumption of the outdoor-air conditioner 10 and the power consumption of the indoor-air conditioner 50 is reduced). In particular, since the outdoor-air conditioner 10 (e.g., the chiller unit 20) and the indoor-air conditioner 50 (e.g., the compressor 61) are inverter-controlled, the outdoor-air conditioner 10 and the indoor-air conditioner 50 have a characteristic that the efficiency with 30 to 70% operating capacity (during partial load) becomes high (the highest efficiency is obtained at about 50%) and the efficiency with 100% operating capacity (during rated operation) or 20% operating capacity is low. For this feature, in the air conditioning system 100, the general control unit 90 performs the cooperative load control, and controls the operating capacities of the outdoor-air conditioner 10 and the indoor-air conditioner 50 in cooperation such that the ratio of the operating capacities of the outdoor-air conditioner 10 and the indoor-air conditioner 50 becomes optimal. That is, in the cooperative load control, at least one of a parameter of the outdoor-air conditioner 10 and a parameter of the indoor-air conditioner 50 is controlled such that the temperature of the indoor-air IA in the target space SP approaches the set temperature and also the total amount of the power consumption of the outdoor-air conditioner 10 and the power consumption of the indoor-air conditioner 50 is reduced. Thus, it is possible to increase both comfortableness and energy conservation.

Note that in the cooperative load control, both the parameter of the outdoor-air conditioner 10 (e.g., the target supply-air temperature Tsa) and the parameter of the indoor-air conditioner 50 (e.g., the target evaporation temperature Te) may be controlled so as to control the operating capacity of the outdoor-air conditioner 10 and the operating capacity of the indoor-air conditioner 50 in cooperation. Alternatively, one of them may be controlled and the other may change naturally so as to control the operating capacity of the outdoor-air conditioner 10 and the operating capacity of the indoor-air conditioner 50 in cooperation.

4-2

Figure 9:
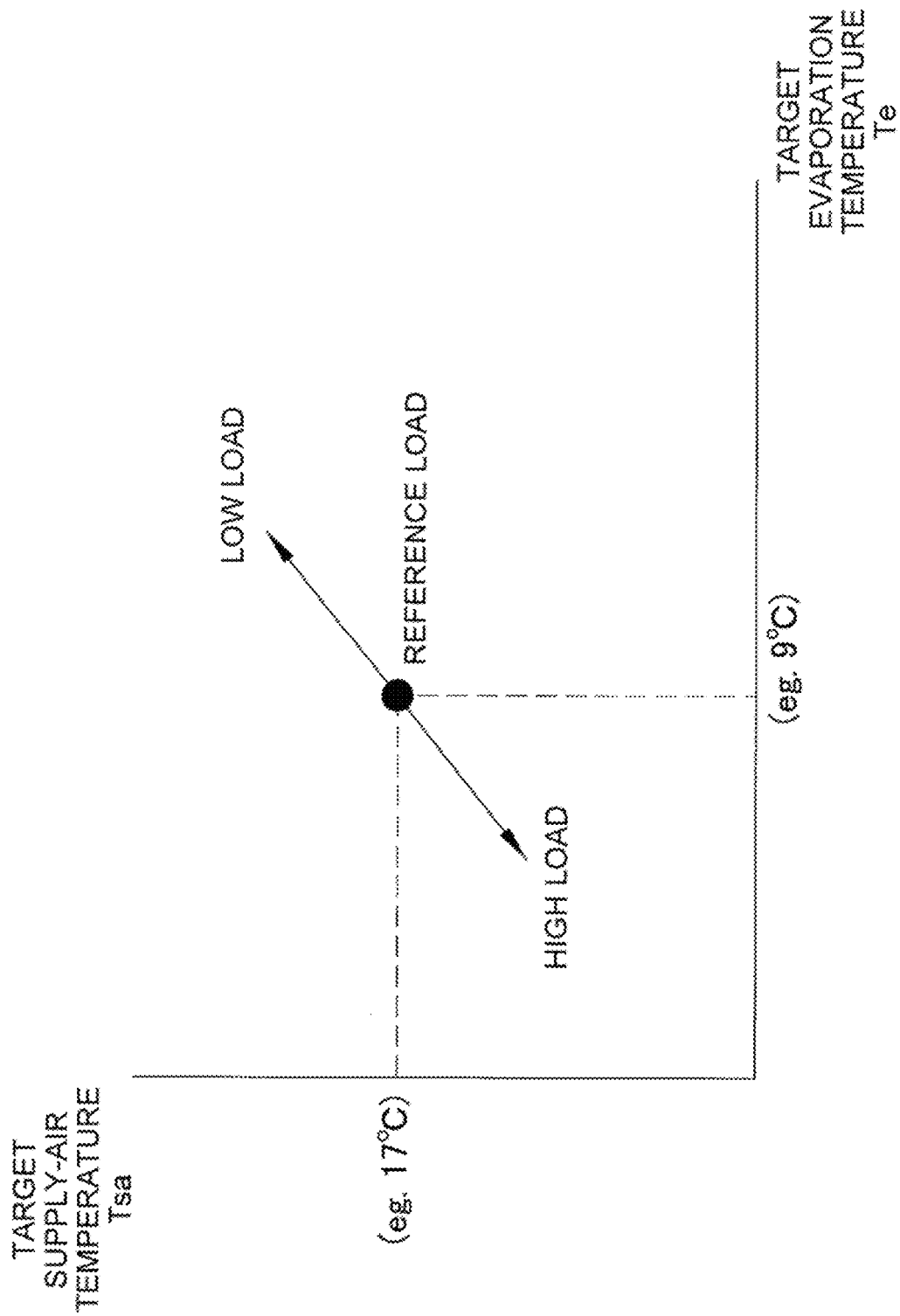
FIG. 9 is a graph schematically illustrating the relationship between a target evaporation temperature, a target supply-air temperature, and a load (during cooling operation).

An example of the cooperative load control is, as illustrated in FIG. 9, based on the idea that the target supply-air temperature Tsa of the outdoor-air conditioner 10 and the target evaporation temperature Te of the indoor-air conditioner 50 are changed in cooperation in accordance with a load. FIG. 9 is a graph schematically illustrating the relationship between the target evaporation temperature Te, the target supply-air temperature Tsa, and the load (during cooling operation). FIG. 9 illustrates how, with a high load to a low load, the target supply-air temperature Tsa and the target evaporation temperature Te are changed at the same time in accordance with an increase or a decrease in the load such that the load factor between the outdoor-air conditioner 10 and the indoor-air conditioner 50 approaches to be even.

More specifically, FIG. 9 illustrates how, during cooling operation, as the load becomes higher than the reference point, the target supply-air temperature Tsa and the target evaporation temperature Te are decreased, and a high operating capacity (capability) is set for the outdoor-air conditioner 10 and the indoor-air conditioner 50; and as the load becomes lower than the reference point, the target supply-air temperature Tsa and the target evaporation temperature Te are increased, and a low operating capacity (capability) is set for the outdoor-air conditioner 10 and the indoor-air conditioner 50. That is, FIG. 9 illustrates a case where, as an example of the cooperative load control, the cooperative load control is performed such that the target supply-air temperature Tsa and the target evaporation temperature Te are in positive correlation.

4-3

Figure 10:
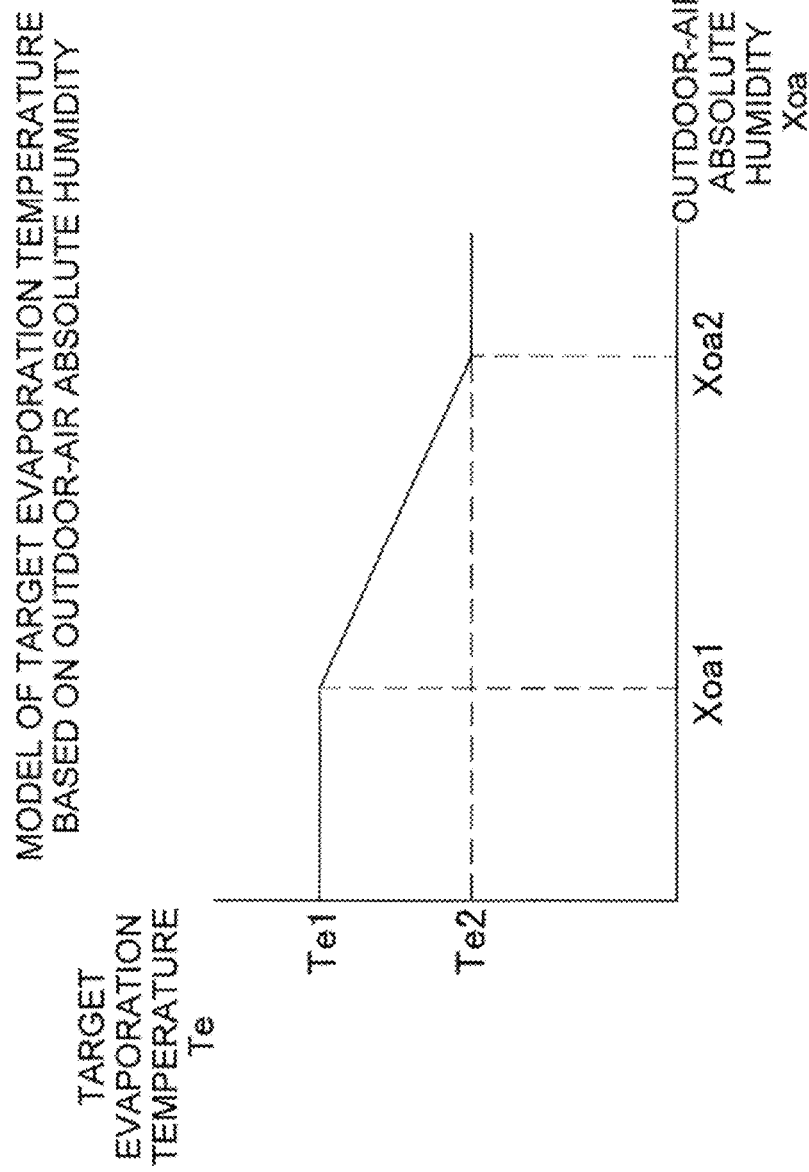
FIG. 10 is a graph schematically illustrating the relationship between an outdoor-air absolute humidity and the target evaporation temperature (during cooling operation).

In the cooperative load control, as illustrated in FIG. 10 for example, the target evaporation temperature Te during cooling operation is determined on the basis of an outdoor-air absolute humidity Xoa in accordance with the property of the indoor heat exchanger 72. FIG. 10 is a graph schematically illustrating the relationship between the outdoor-air absolute humidity and the target evaporation temperature (during cooling operation). FIG. 10 illustrates how, if the outdoor-air absolute humidity Xoa is higher than a predetermined value Xoa1 and lower than a predetermined value Xoa2, as the outdoor-air absolute humidity Xoa increases, the target evaporation temperature Te is decreased from Te1 to Te2. As examples of the target evaporation temperatures Te1 and Te2 illustrated in FIG. 10, for example, in a case where the outdoor-air absolute humidity Xoa1 is 11.1 (g/kg) and Xoa2 is 16.0 (g/kg), if the load in the target space SP is mainly processed by the indoor-air conditioner 50, Te1 is set to 12° C. and Te2 is set to 6° C. Then, the cooperative load control increases the load processing amount of the outdoor-air conditioner 10 so that Te1 is set to 12° C. and Te is set to 9° C., thereby saving energy.

Figure 11:
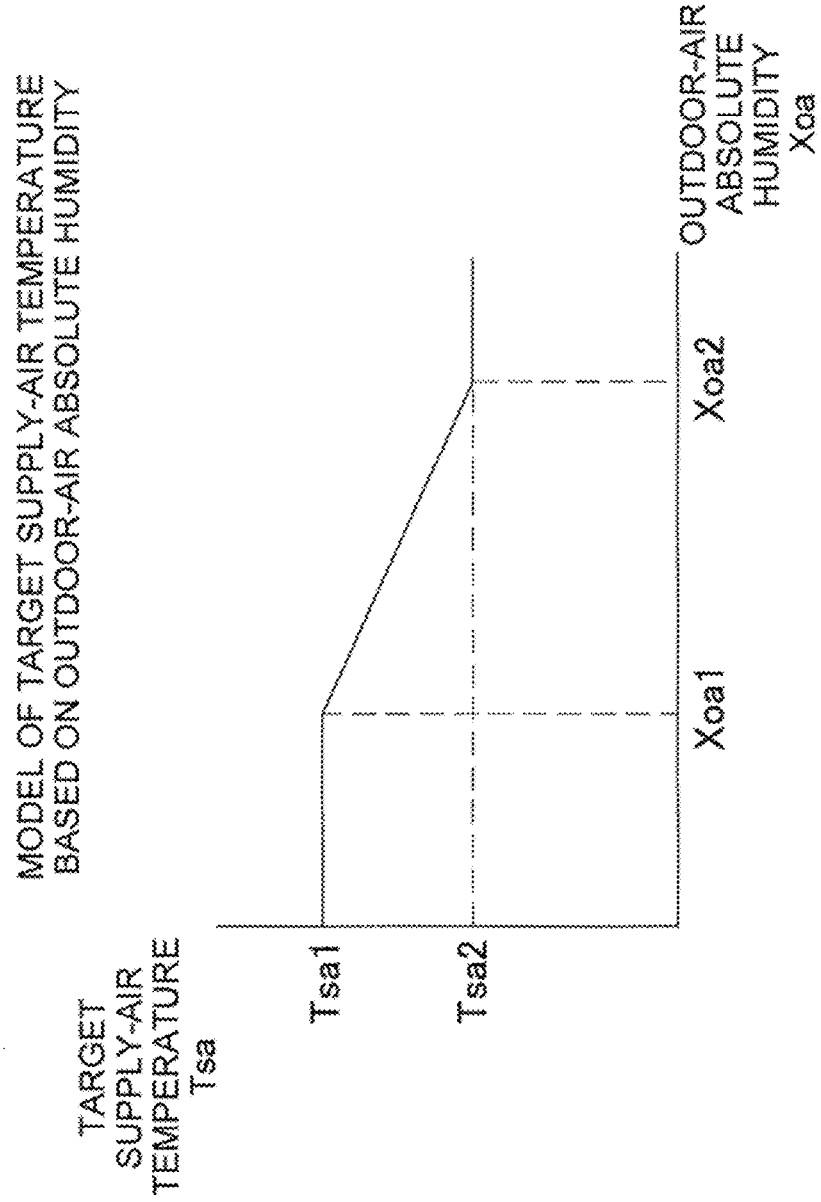
FIG. 11 is a graph schematically illustrating the relationship between the outdoor-air absolute humidity and the target supply-air temperature (during cooling operation).

In the above case, for example, as illustrated in FIG. 11, the target supply-air temperature Tsa is determined so as to correspond to the target evaporation temperature Te. FIG. 11 is a graph schematically illustrating the relationship between the outdoor-air absolute humidity and the target supply-air temperature (during cooling operation). FIG. 11 illustrates how, if the outdoor-air absolute humidity Xoa is higher than the predetermined value Xoa1 and lower than the predetermined value Xoa2, as the outdoor-air absolute humidity Xoa increases, the target supply-air temperature Tsa is decreased from Tsa1 to Tsa2. As examples of the target supply-air temperatures Tsa1 and Tsa2 illustrated in FIG. 11, for example, as described above, in a case where the outdoor-air absolute humidity Xoa1 is 11.1 (g/kg) and Xoa2 is 16.0 (g/kg), if Te1 is set to 12° C. and Te is set to 9° C., Tsa1 is set to 19° C., and Tsa2 is set to 13° C.

4-4

Figure 12:
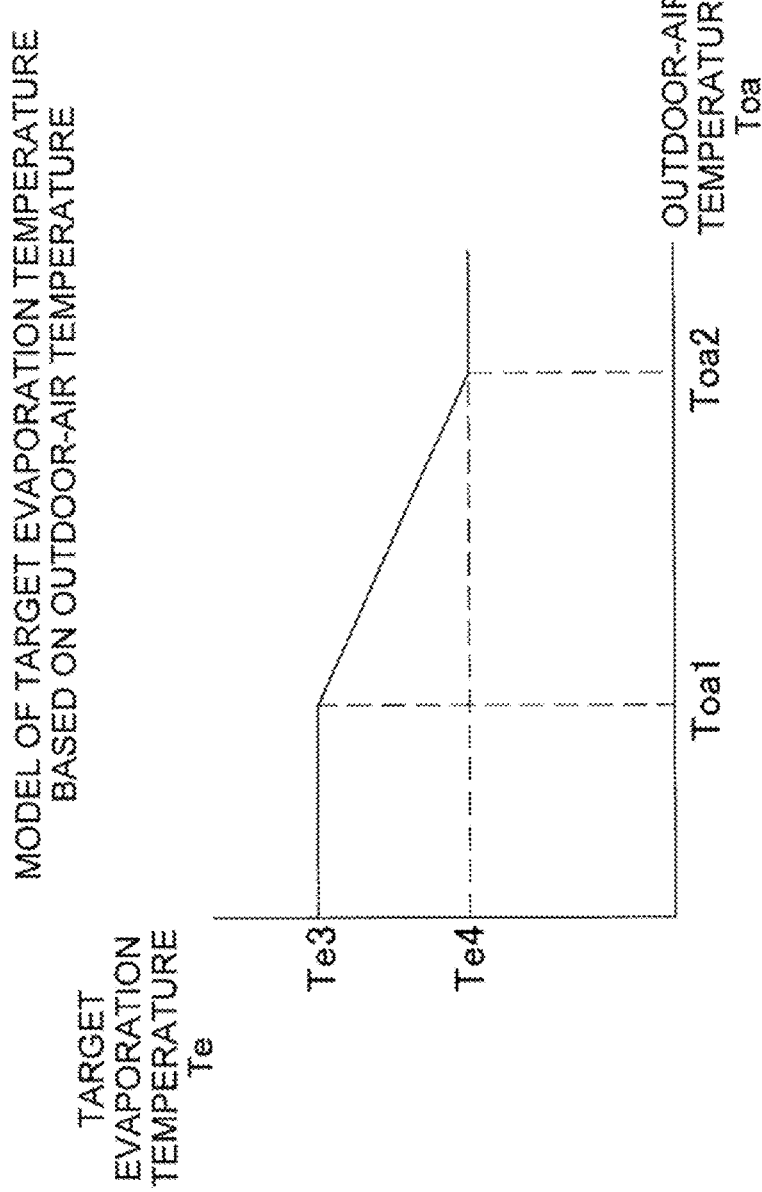
FIG. 12 is a graph schematically illustrating the relationship between an outdoor-air temperature and the target evaporation temperature (during cooling operation).

In addition, in the cooperative load control, as illustrated in FIG. 12 for example, the target evaporation temperature Te during cooling operation is determined on the basis of an outdoor-air temperature in accordance with the property of the indoor heat exchanger 72. FIG. 12 is a graph schematically illustrating the relationship between the outdoor-air temperature and the target evaporation temperature (during cooling operation). FIG. 12 illustrates how, if an outdoor-air temperature Toa is higher than a predetermined value Toa1 and lower than a predetermined value Toa2, as the outdoor-air temperature Toa increases, the target evaporation temperature Te is decreased from Te3 to Te4. As for the target evaporation temperatures Te3 and Te4 illustrated in FIG. 12, for example, in a case where the outdoor-air temperature Toa1 is 27° C. and Toa2 is 33° C., if the load in the target space SP is mainly processed by the indoor-air conditioner 50, Te3 is set to 12° C. and Te4 is set to 6° C. Then, the cooperative load control allocates the load to the outdoor-air conditioner 10 so that Te3 is set to 12° C. and Te4 is set to 9° C., thereby saving energy.

Figure 13:
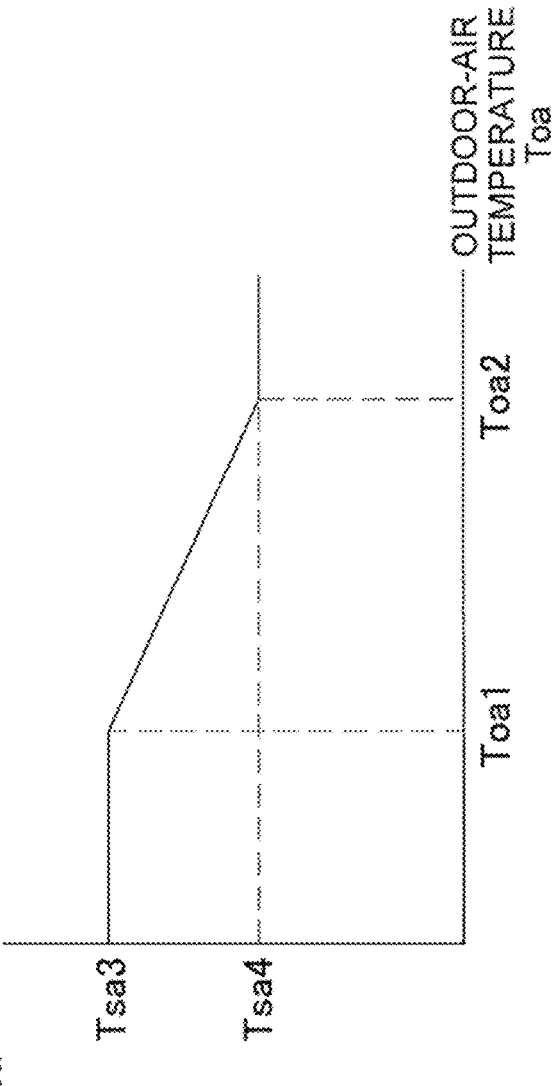
FIG. 13 is a graph schematically illustrating the relationship between the outdoor-air temperature and the target supply-air temperature (during cooling operation).

In the above case, for example, as illustrated in FIG. 13, the target supply-air temperature Tsa is determined so as to correspond to the target evaporation temperature Te. FIG. 13 is a graph schematically illustrating the relationship between the outdoor-air temperature and the target supply-air temperature (during cooling operation). FIG. 13 illustrates how, if the outdoor-air temperature Toa is higher than the predetermined value Toa1 and lower than the predetermined value Toa2, as the outdoor-air temperature Toa increases, the target supply-air temperature Tsa is decreased from Tsa3 to Tsa4. As examples of the target supply-air temperatures Tsa3 and Tsa4 illustrated in FIG. 13, for example, as described above, in a case where the outdoor-air temperature Toa1 is 27° C. and Toa2 is 33° C., if Te3 is set to 12° C. and Te4 is set to 9° C., Tsa3 is set to 19° C., and Tsa4 is set to 13° C.

4-5

In addition, in the cooperative load control, if the evaporation temperature in the indoor heat exchanger 72 during cooling operation is higher than or equal to a predetermined reference value (value with which the latent-heat processing amount in the indoor heat exchanger 72 is assumed to be small), the target evaporation temperature Te is increased. Thus, in a case where the latent-heat processing amount in the indoor heat exchanger 72 is assumed to be small, the target evaporation temperature Te is increased, the operating capacity of the indoor unit 70 including the indoor heat exchanger 72 is decreased. In relation to this, the energy consumption of the indoor-air conditioner 50 is suppressed.

4-6

Figure 14:
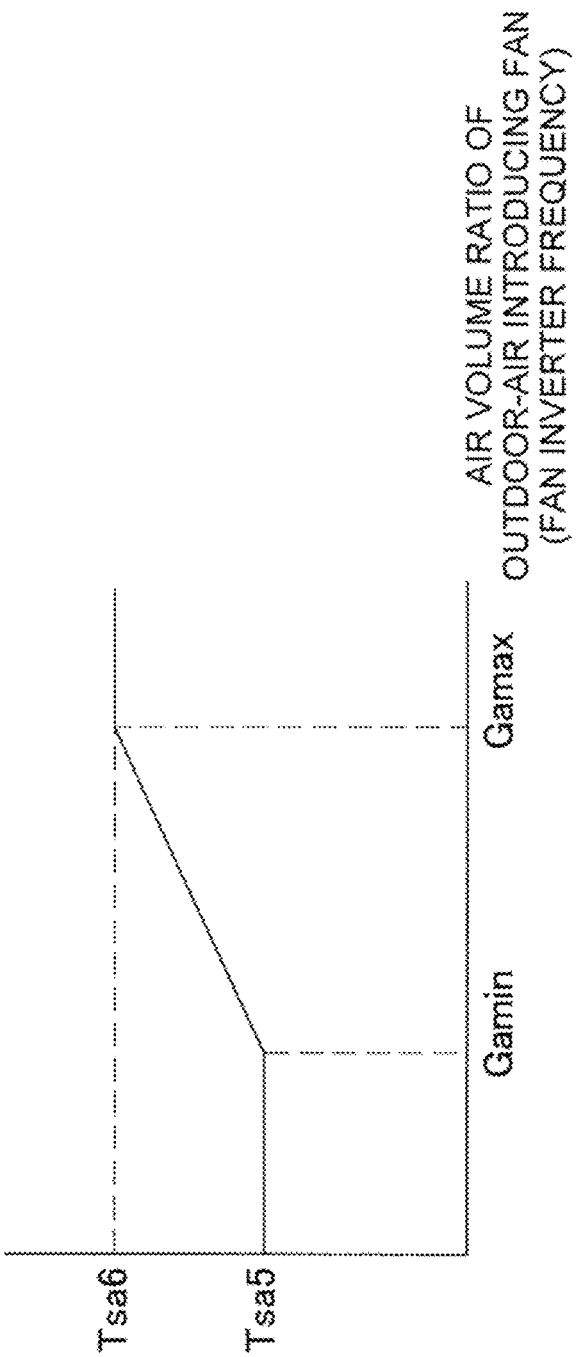
FIG. 14 is a graph schematically illustrating the relationship between an air volume of an air supply fan and the target supply-air temperature (during cooling operation).

In addition, in the cooperative load control, as illustrated in FIG. 14 for example, the target supply-air temperature Tsa during cooling operation is determined on the basis of the air volume of the air supply fan 38. FIG. 14 is a graph schematically illustrating the relationship between the air volume of the air supply fan 38 and the target supply-air temperature (during cooling operation). FIG. 14 illustrates how, if the air volume of the air supply fan 38 is greater than a predetermined value Gamin and smaller than a predetermined value $Ga_{max}$, as the air volume increases, the target supply-air temperature Tsa is increased from Tsa5 to Tsa6. As examples of the target supply-air temperatures Tsa5 and Tsa6 illustrated in FIG. 14, for example, if the predetermined value Gamin is 40% and $Ga_{max}$ is 100%, Tsa5 is set to 14° C., and Tsa6 is set to 20° C.

4-7

Figure 15:
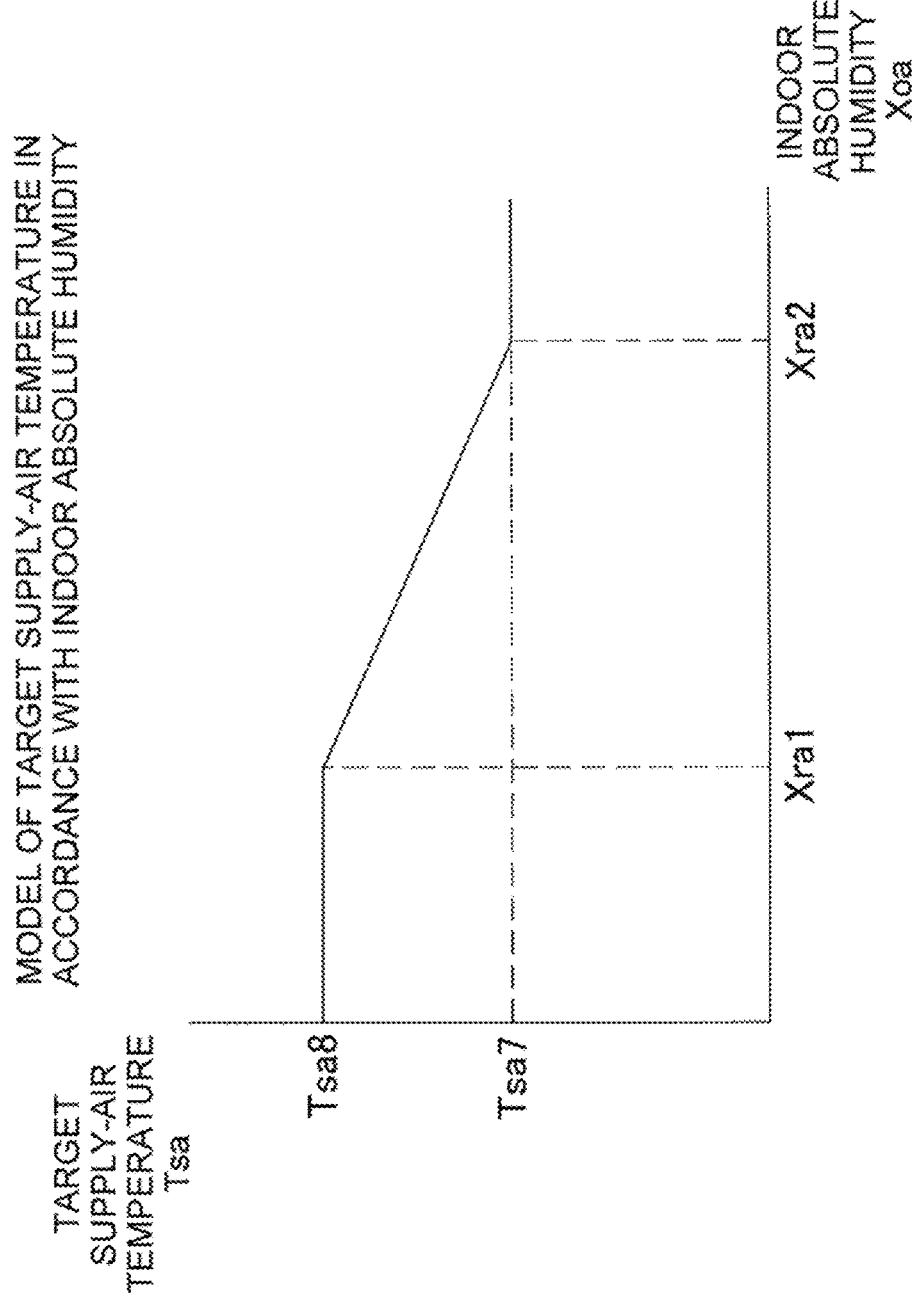
FIG. 15 is a graph schematically illustrating the relationship between an indoor absolute humidity and the target supply-air temperature (during cooling operation).
Figure 16:
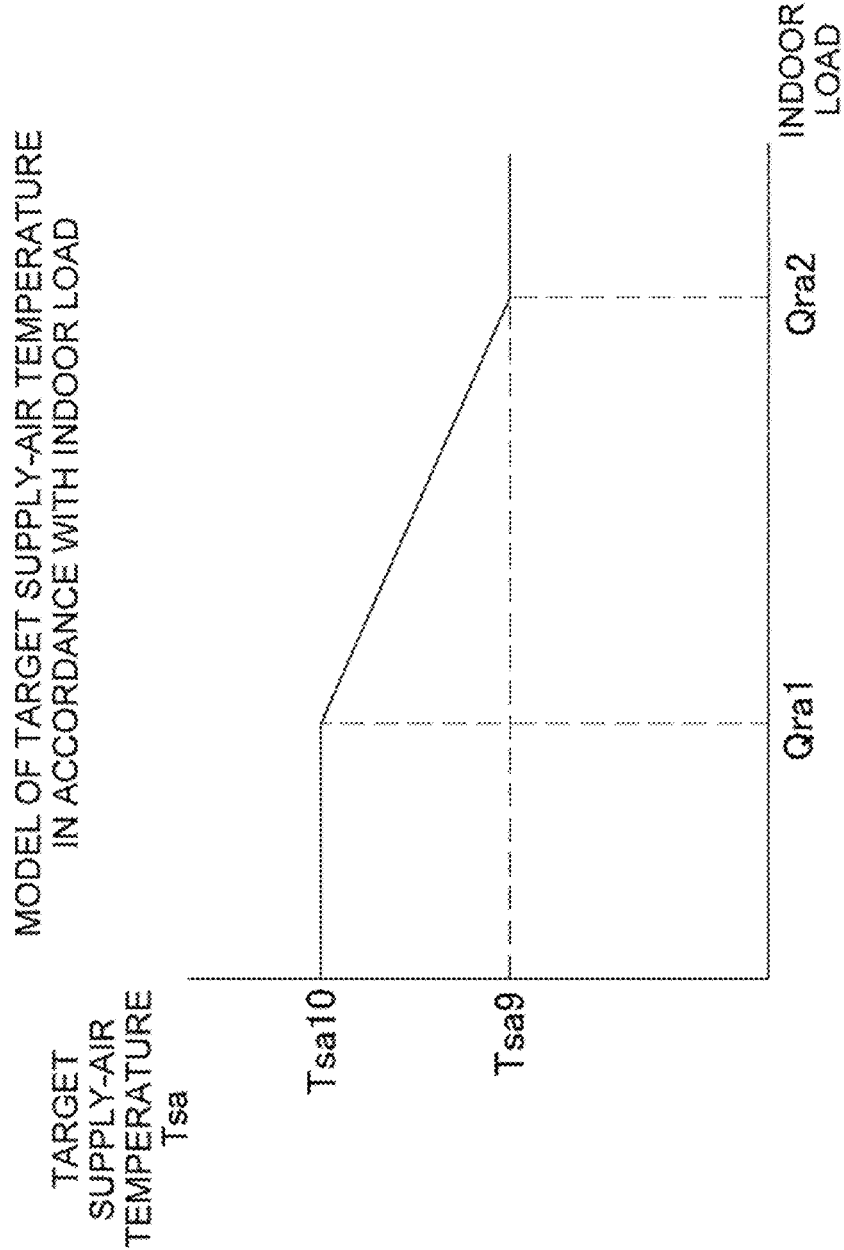
FIG. 16 is a graph schematically illustrating the relationship between an indoor load and the target supply-air temperature (during cooling operation).

In addition, as illustrated in FIG. 15 and FIG. 16, the target supply-air temperature Tsa is set in accordance with the indoor absolute humidity or the indoor load. In this light, since the latent-heat load in the target space SP is increased as the indoor load is increased during cooling operation, the target supply-air temperature Tsa is preferably set to be low in terms of energy saving. Note that as the target supply-air temperature Tsa, the lowest value may be selected (low-select) among values calculated on the basis of the models in FIG. 14, FIG. 15, and FIG. 16 for example.

4-8

The target supply-air temperature Tsa during cooling operation may also be obtained as follows, for example.

For example, in a case where the target supply-air temperature Tsa is set to 20° C., if the humidity of the outdoor-air OA is high, the outdoor-air conditioner 10 cannot process an increase in the latent heat as a result of the outdoor-air OA entering the target space SP. Accordingly, the humidity of the target space SP increases, and the indoor environment is degraded. Thus, in a case where the indoor units 70 process the latent heat, the target evaporation temperature Te becomes too low, and there is a concern about an increase in power consumption. On the other hand, if the humidity of the outdoor-air OA is low, since the latent-heat load is low, the outdoor-air conditioner 10 can process the latent heat, and the indoor environment is not degraded. Thus, the indoor-air conditioner 50 can operate efficiently with a high target evaporation temperature Te.

In addition, for example, in a case where the target supply-air temperature Tsa is set to 16° C., if the humidity of the outdoor-air OA is high, the outdoor-air conditioner 10 can process (supplies the air with a humidity lower than or equal to the indoor humidity) an increase in the latent heat as a result of the outdoor-air OA entering the target space SP. Accordingly, a good indoor environment is maintained. That is, efficient operation is enabled as a result of the indoor units 70 operate without the target evaporation temperature Te being decreased. On the other hand, if the humidity of the outdoor-air OA is low, since the outdoor-air conditioner 10 processes a sensible heat, the load processed amount of the highly efficient indoor-air conditioner 50 is reduced, and there is a concern about an increase in the whole power consumption.

In addition, for example, in a case where the target supply-air temperature Tsa is set to 13° C., if the humidity of the outdoor-air OA is high, the outdoor-air conditioner 10 processes a latent heat and sensible heat too much. Thus, the load processed amount of the highly efficient indoor-air conditioner 50 is reduced, and there is a concern about an increase in the whole power consumption.

From the above, the target supply-air temperature Tsa is set to an optimal value (e.g., 18° C.) that is higher than 16° C. and lower than 20° C.

4-9

Now, another example of the cooperative load control will be described. The latent-heat processing capability of the air conditioning system 100 increases as the set value of the target evaporation temperature Te is lower. In addition, as the set value of the target supply-air temperature Tsa is lower, the absolute humidity of the supply air SA is decreased, and thus, the outdoor-air latent-heat processing capability of the air conditioning system 100 is increased as the set value of the target supply-air temperature Tsa is lower.

Figure 17:
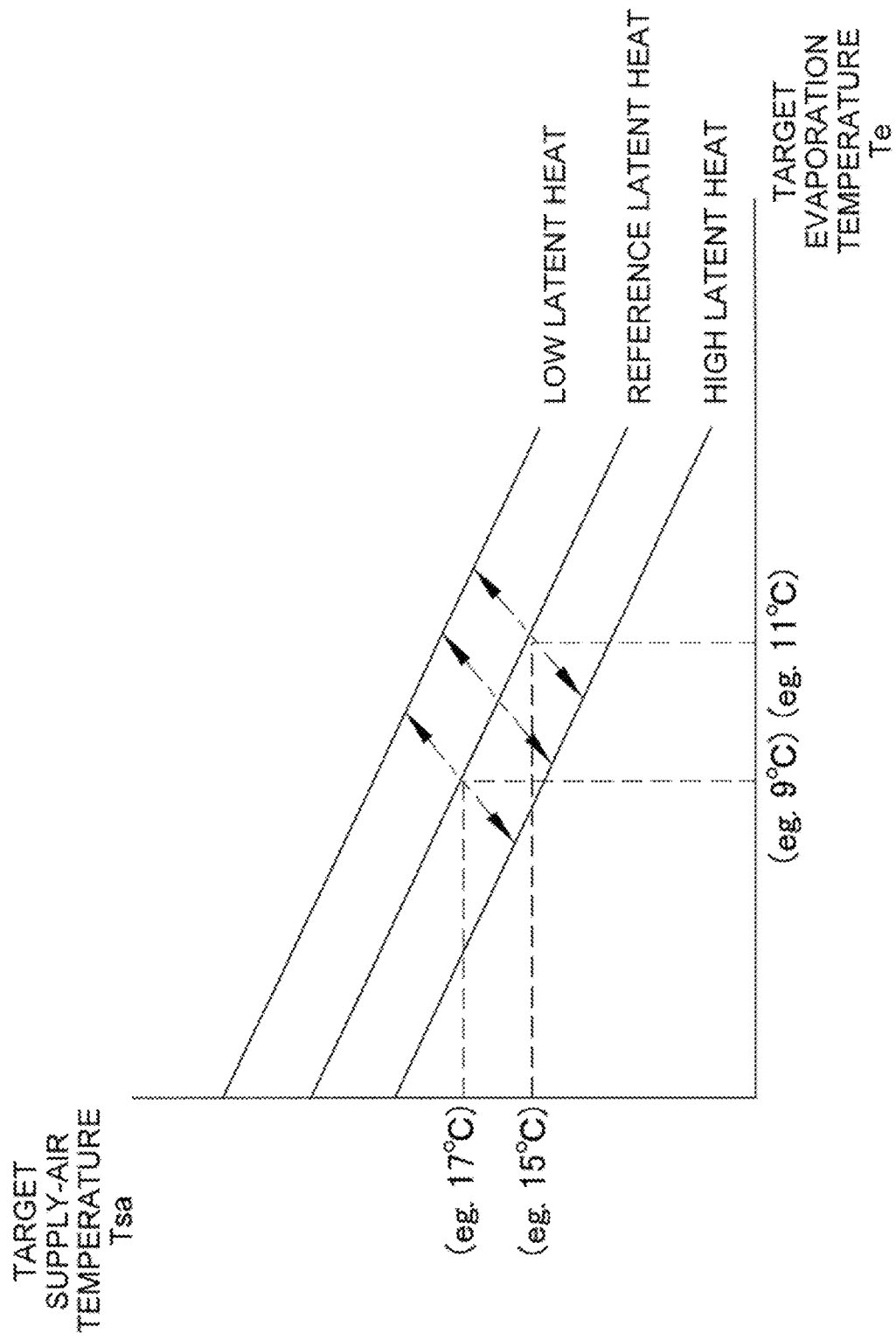
FIG. 17 is a graph schematically illustrating the relationship between the target evaporation temperature, the target supply-air temperature, and a latent-heat load (during cooling operation).

On the other hand, in a case where the outdoor-air latent-heat load and the indoor latent-heat load are substantially equal to each other, if both the target evaporation temperature Te and the target supply-air temperature Tsa are decreased, the capability is increased too much. Thus, as illustrated in FIG. 17, one of the target evaporation temperature Te and the target supply-air temperature Tsa is preferably decreased so that the other can be maintained or increased in terms of energy saving. FIG. 17 is a graph schematically illustrating the relationship between the target evaporation temperature Te, the target supply-air temperature Tsa, and the load (latent-heat load) (during cooling operation). FIG. 17 illustrates how, as the target evaporation temperature Te is increased (from 9° C. to 11° C. as an example), the target supply-air temperature Tsa is decreased (from 17° C. to 15° C. as an example), and in contrast, as the target supply-air temperature Tsa is increased (from 15° C. to 17° C. as an example), the target evaporation temperature Te is decreased (from 11° C. to 9° C. as an example).

That is, FIG. 17 illustrates a case where, when processing the total load of the load of the outdoor-air OA and the load of the indoor-air IA, the cooperative load control is performed such that the target supply-air temperature Tsa and the target evaporation temperature Te are in negative correlation. In the cooperative load control, in order to increase energy conservation while realizing comfortableness, it is necessary to consider an optimal combination of the target evaporation temperature Te and the target supply-air temperature Tsa to process the sum of the outdoor-air latent-heat load and the indoor latent-heat load. Note that the optimal combination of the target evaporation temperature Te and the target supply-air temperature Tsa depends on the design specification (e.g., COP of the outdoor-air conditioner 10 or COP of the indoor-air conditioner 50) or the installed environment.

The above combination is set by, for example, selecting a condition under which the total power consumption is the lowest as a result of comparison among the total power consumption predicted if a predetermined parameter (e.g., the target evaporation temperature Te or the target supply-air temperature Tsa) is increased or decreased from the current value in a predetermined range with regards to the sum (total power consumption) of the power consumption of the outdoor-air conditioner 10 and the power consumption of the indoor-air conditioner 50. The above setting is made by using a table illustrated in FIG. 18 (cooperative load control table tb1), for example.

Figure 18:
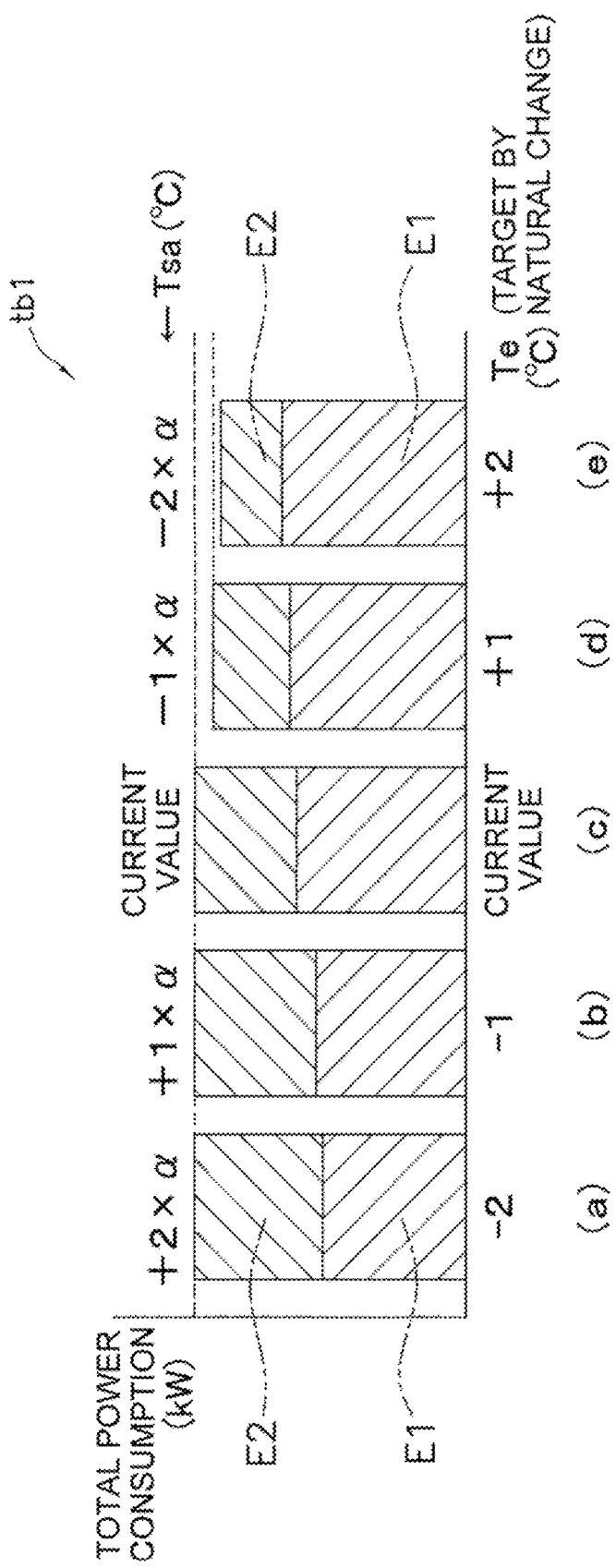
FIG. 18 is a schematic diagram illustrating a cooperative load control table used in cooperative load control.

FIG. 18 illustrates a predicted value of the total power consumption (kW) if the target evaporation temperature Te is decreased from the current value by 2° C. (if the target supply-air temperature Tsa is increased by 2×α) in (a). FIG. 18 illustrates a predicted value of the total power consumption if the target evaporation temperature Te is decreased from the current value by 1° C. (if the target supply-air temperature Tsa is increased by 1×α) in (b). FIG. 18 illustrates the total power consumption if the target evaporation temperature Te is equal to the current value (if the target supply-air temperature Tsa is equal to the current value) in (c). FIG. 18 illustrates a predicted value of the total power consumption if the target evaporation temperature Te is increased from the current value by 1° C. (if the target supply-air temperature Tsa is decreased by −1×α) in (d). FIG. 18 illustrates a predicted value of the total power consumption if the target evaporation temperature Te is increased from the current value by 2° C. (if the target supply-air temperature Tsa is decreased by −2×α) in (e). In addition, in FIG. 18, from (a) to (e), hatching E1 represents the power consumption (predicted value) of the outdoor-air conditioner 10, and hatching E2 represents the power consumption (predicted value) of the indoor-air conditioner 50.

FIG. 18 illustrates that, as the target evaporation temperature Te is increased (the target supply-air temperature Tsa is decreased), the power consumption of the outdoor-air conditioner 10 is increased while the power consumption of the indoor-air conditioner 50 is decreased. In other words, FIG. 18 illustrates that, as the target evaporation temperature Te is decreased (the target supply-air temperature Tsa is increased), the power consumption of the outdoor-air conditioner 10 is decreased while the power consumption of the indoor-air conditioner 50 is increased.

FIG. 18 illustrates that the total power consumption is the lowest in (e) (the case where the target evaporation temperature Te is increased from the current value by 2° C.). In a case where the situation illustrated in FIG. 18 is assumed in the cooperative load control, the combination illustrated in (e) is selected as the combination of the target evaporation temperature Te and the target supply-air temperature Tsa that leads to the lowest total power consumption, and the target evaporation temperature Te and/or the target supply-air temperature Tsa is set such that the target evaporation temperature Te is decreased from the current value by 2° C. and the target supply-air temperature Tsa is decreased by −2×α.

In a case where the cooperative load control is performed by using the cooperative load control table tb1 illustrated in FIG. 18, the table is defined in advance and according to each status (the status of the outdoor-air OA, the status of the indoor-air IA, the operation status of the outdoor-air conditioner 10, and/or the operation status of the indoor-air conditioner 50) and is stored in the storage unit 91.

Note that if the cooperative load control is performed in the above manner, the cooperative load control is performed (the combination of the target evaporation temperature Te and the target supply-air temperature Tsa is selected) such that the value calculated according to the following formula F1 becomes positive, the value being with respect to the difference between the current total power consumption and the total power consumption after execution of the cooperative load control.

(current power consumption of the indoor-air conditioner 50−predicted power consumption of the indoor-air conditioner 50 after execution of the cooperative load control)+(current power consumption of the outdoor-air conditioner 10−predicted power consumption of the outdoor-air conditioner 10 after execution of the cooperative load control)    F1

The term "current power consumption of the indoor-air conditioner 50" is the current measured value of the power consumption of the indoor-air conditioner 50, or a model value or a table value calculated from the status of the outdoor-air OA, the status of the indoor-air IA, the operation status of the indoor-air conditioner 50, and the like.

The term "current power consumption of the outdoor-air conditioner 10" is the current measured value of the power consumption of the outdoor-air conditioner 10, or a model value or a table value calculated from the status of the outdoor-air OA, the operation status of the outdoor-air conditioner 10, and the like.

The term "predicted power consumption of the indoor-air conditioner 50 after execution of the cooperative load control" is a model value or a table value calculated from the status of the outdoor-air OA, the status of the indoor-air IA, the operation status of the indoor-air conditioner 50, and the like, or a value obtained by correcting the current measured value of the power consumption of the indoor-air conditioner 50 by using a model value or a table value calculated from the status of the outdoor-air OA, the status of the indoor-air IA, the operation status of the indoor-air conditioner 50, and the like.

The term "predicted power consumption of the outdoor-air conditioner 10 after execution of the cooperative load control" is a model value or a table value calculated from the status of the outdoor-air OA and the operation status of the outdoor-air conditioner 10, or a value obtained by correcting the current power consumption of the outdoor-air conditioner 10 by using a model value or a table value calculated from the status of the outdoor-air OA, the status of the indoor-air IA, the operation status of the indoor-air conditioner 50, and the like.

That is, in a case where the value calculated according to the above formula F1 is negative, the total power consumption is high, and thus, the current combination of the target evaporation temperature Te and the target supply-air temperature Tsa is maintained.

More specifically, the cooperative load control is performed (the combination of the target evaporation temperature Te and the target supply-air temperature Tsa is selected) such that the value calculated according to the following formula F2 becomes positive.

(current power consumption of the indoor-air conditioner 50−predicted power consumption of the indoor-air conditioner 50 after execution of the cooperative load control)−(current processed heat amount in the indoor-air conditioner 50−predicted processed heat amount in the indoor-air conditioner 50 after execution of the cooperative load control)/predicted COP of the outdoor-air conditioner 10 after execution of the cooperative load control    F2

(Note that it is assumed that the term "predicted COP of the outdoor-air conditioner 10 after execution of the cooperative load control" in formula F2 does not change for the power of the heat transfer medium pump Pa)

Note that in a case where there is no change between the current COP of the outdoor-air conditioner 10 and the COP of the outdoor-air conditioner 10 after execution of the cooperative load control, current power consumption of the outdoor-air conditioner 10=current processed heat amount of the outdoor-air conditioner 10/current COP of the outdoor-air conditioner 10 is satisfied, and power consumption of the outdoor-air conditioner 10 after execution of the cooperative load control=processed heat amount of the outdoor-air conditioner 10 after execution of the cooperative load control/COP of the outdoor-air conditioner 10 after execution of the cooperative load control is satisfied. If the load allocation to the outdoor-air conditioner 10 and the indoor-air conditioner 50 is changed by the cooperative load control, the processed heat amount of the indoor-air conditioner 50 is changed. In addition, in response to this change, the processed heat amount of the outdoor-air conditioner 10 is changed, and thus, the formula F2 is obtained from the formula F1.

The term "current processed heat amount in the indoor-air conditioner 50" is the current measured value of the processed heat amount of the indoor-air conditioner 50, or a model value or a table value calculated from the status of the outdoor-air, the status of the indoor-air, the operation status of the indoor-air conditioner 50, and the like.

The term "predicted processed heat amount in the indoor-air conditioner 50 after the cooperative load control" is a model value or a table value calculated from the status of the outdoor-air OA, the status of the indoor-air IA, the operation status of the indoor-air conditioner 50, and the like, or a value obtained by correcting the current measured value of the processed heat amount of the indoor-air conditioner 50 by using a model value or a table value calculated from the status of the outdoor-air OA, the status of the indoor-air IA, the operation status of the indoor-air conditioner 50, and the like.

The term "predicted COP of the outdoor-air conditioner 10 after execution of the cooperative load control" is the current measured value of the processed heat amount of the indoor-air conditioner 50, a model value or a table value calculated from the status of the outdoor-air OA, the status of the indoor-air IA, the operation status of the indoor-air conditioner 50, and the like or a value obtained by correcting the current measured value of the processed heat amount of the indoor-air conditioner 50 by using a model value or a table value calculated from the status of the outdoor-air OA, the status of the indoor-air IA, the operation status of the indoor-air conditioner 50, and the like.

Note that if the current COP of the indoor-air conditioner 50 is higher than the current COP of the outdoor-air conditioner 10, it is obvious that the current COP of the indoor-air conditioner 50 becomes higher than the current value as the target evaporation temperature Te is increased. Thus, it is not necessary to take the above formula F2 into account.

By the above cooperative load control (control in which the target evaporation temperature Te and the target supply-air temperature Tsa are in negative correlation), energy conservation is increased. The following description refers to FIG. 19 and FIG. 20.

Figure 19:
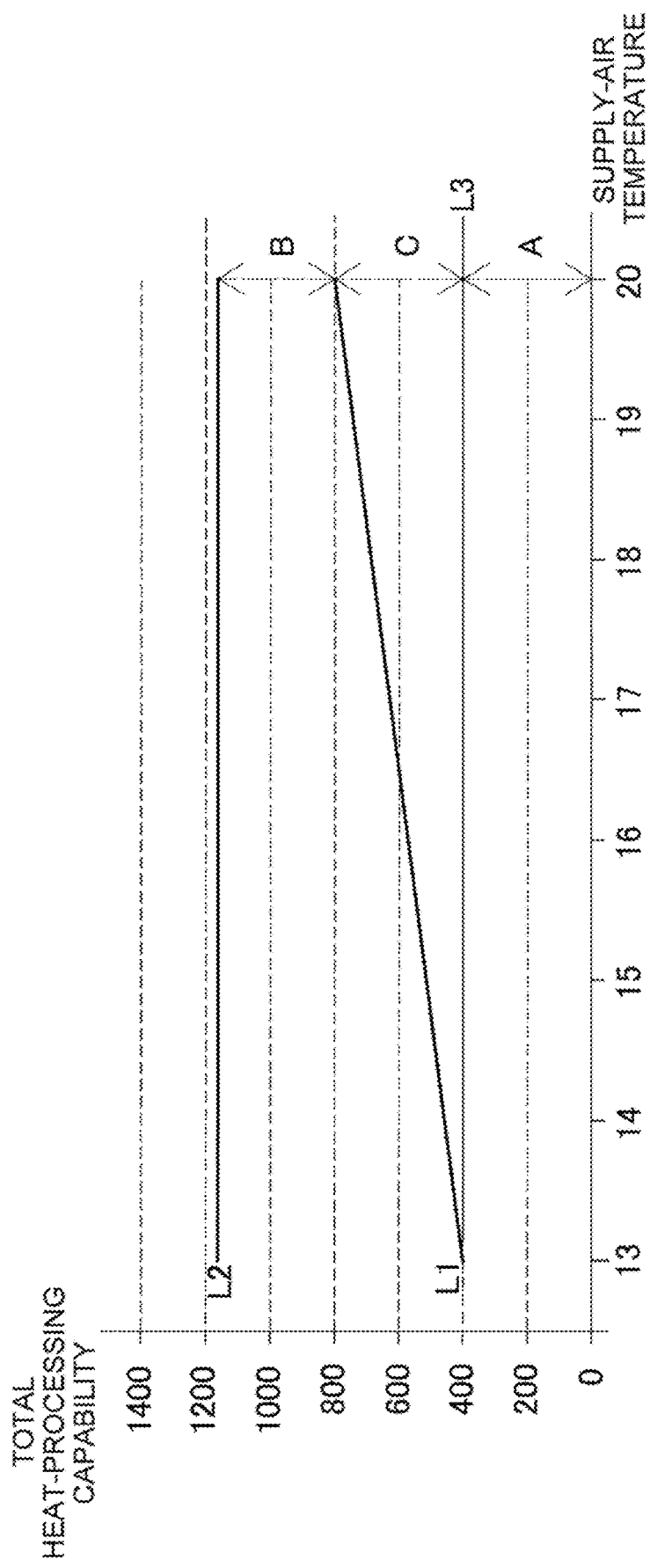
FIG. 19 is a schematic diagram illustrating changes of a total heat-processing capability of the outdoor-air conditioner and a total heat-processing capability of the indoor-air conditioner in a case where the target supply-air temperature is changed.

FIG. 19 is a schematic diagram illustrating changes of a total heat-processing capability of the outdoor-air conditioner 10 and a total heat-processing capability of the indoor-air conditioner 50 in a case where the target supply-air temperature Tsa is changed from 13° C. to 20° C. FIG. 19 illustrates the total heat-processing capability of the indoor-air conditioner 50 in an area specified by A+C (region lower than a line L1). In addition, FIG. 19 illustrates the total heat-processing capability of the outdoor-air conditioner 10 in an area specified by B (region higher than the line L1 and lower than a line L2). Furthermore, FIG. 19 illustrates an increase or a decrease in the total heat-processing capabilities of the outdoor-air conditioner 10 and the indoor-air conditioner 50 (i.e., ratio of total heat-processing capability distributed between the outdoor-air conditioner 10 and the indoor-air conditioner 50) in an area specified by C (region higher than a line L3 and lower than the line L1).

FIG. 19 illustrates that the total heat-processing capability of the indoor-air conditioner 50 and the total heat-processing capability of the outdoor-air conditioner 10 increase or decrease in accordance with an increase or a decrease in the area specified by the region C. Specifically, FIG. 19 illustrates, in a case where the target supply-air temperature Tsa is the lowest (where the target supply-air temperature Tsa is set to 13° C. in this example, that is, where the target evaporation temperature Te is high), how the total heat-processing capability of the indoor-air conditioner 50 becomes the lowest and the total heat-processing capability of the outdoor-air conditioner 10 becomes the highest. In addition, the area specified by the region C (i.e., the total heat-processing capability of the indoor-air conditioner 50) is increased as the target supply-air temperature Tsa is increased (i.e., part of the load processing amount of the outdoor-air conditioner 10 shifts to the load processing amount of the indoor-air conditioner 50). FIG. 19 illustrates, in a case where the target supply-air temperature Tsa is the highest (where the target supply-air temperature Tsa is set to 20° C. in this example, that is, where the target evaporation temperature Te is low), how the total heat-processing capability of the indoor-air conditioner 50 becomes the highest and the total heat-processing capability of the outdoor-air conditioner 10 becomes the lowest. In FIG. 19, for example, energy conservation is realized if the reduction of the power of the indoor-air conditioner 50 in the area specified by A+C is larger than an increase in the power of the outdoor-air conditioner 10 in the area specified by B.

Figure 20:
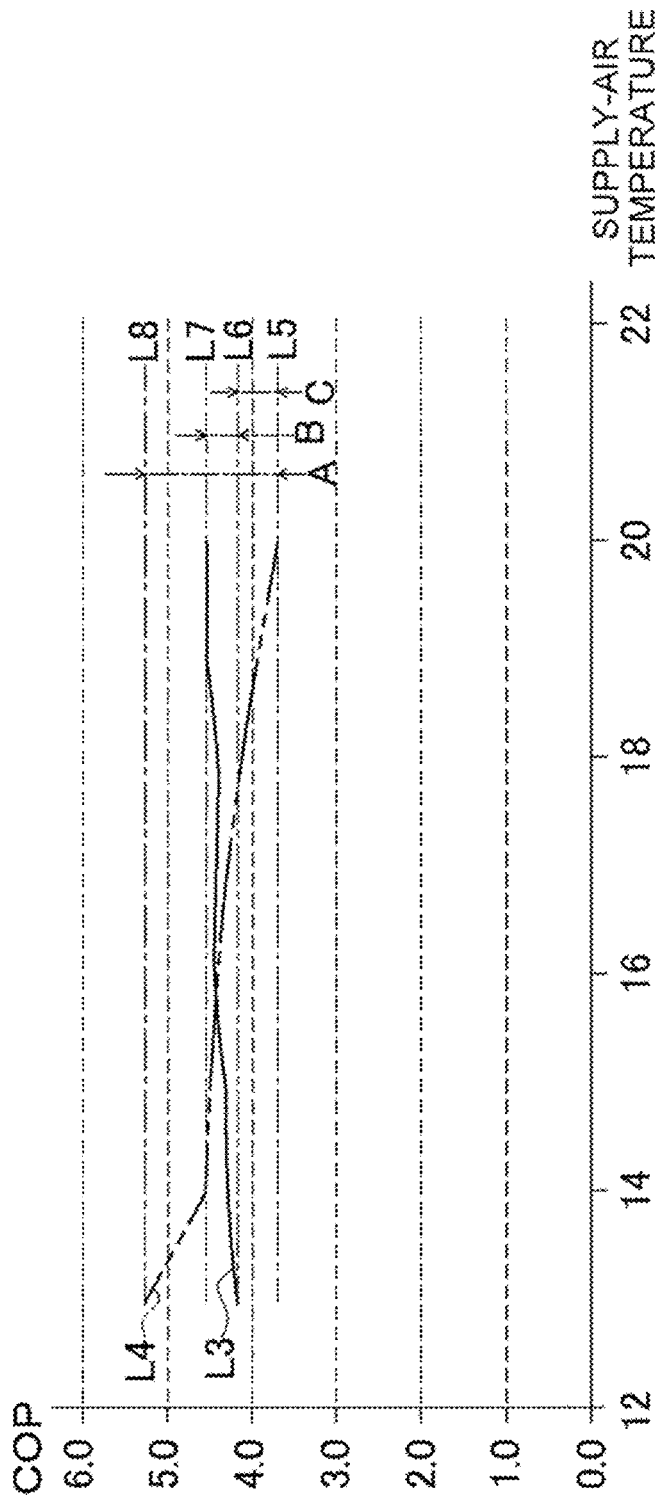
FIG. 20 is a schematic diagram illustrating changes of a COP of the outdoor-air conditioner and a COP of the indoor-air conditioner in a case where the target supply-air temperature is changed.

FIG. 20 is a schematic diagram illustrating changes of the COP of the outdoor-air conditioner 10 and the COP of the indoor-air conditioner 50 in a case where the target supply-air temperature Tsa is changed from 13° C. to 20° C. In FIG. 20, a solid line L3 represents the COP of the outdoor-air conditioner 10, and a two-dot chain line L4 represents the COP of the indoor-air conditioner 50. In FIG. 20, the area between chain lines L5 and L8 corresponds to the area specified by A in FIG. 19. In addition, the area between chain lines L6 and L7 corresponds to the area specified by B in FIG. 19. Furthermore, the area between the chain lines L5 and L6 corresponds to the area specified by C in FIG. 19.

FIG. 20 illustrates, in a case where the target supply-air temperature Tsa is the lowest (where the target supply-air temperature Tsa is set to 13° C. in this example, that is, the target evaporation temperature Te is high), how the COP of the outdoor-air conditioner 10 becomes the lowest and the COP of the indoor-air conditioner 50 becomes the highest, and also, in a case where the target supply-air temperature Tsa is the highest (where the target supply-air temperature Tsa is set to 20° C. in this example, that is, the target evaporation temperature Te is low), how the COP of the outdoor-air conditioner 10 becomes the highest and the COP of the indoor-air conditioner 50 becomes the lowest.

4-10

The combination of the target evaporation temperature Te and the target supply-air temperature Tsa in the cooperative load control is determined by using any of the models illustrated in FIG. 21 to FIG. 24, for example. Each of FIG. 21 to FIG. 24 is a schematic diagram illustrating a model when the combination of the target evaporation temperature Te and the target supply-air temperature Tsa is selected in the cooperative load control.

Figure 21:
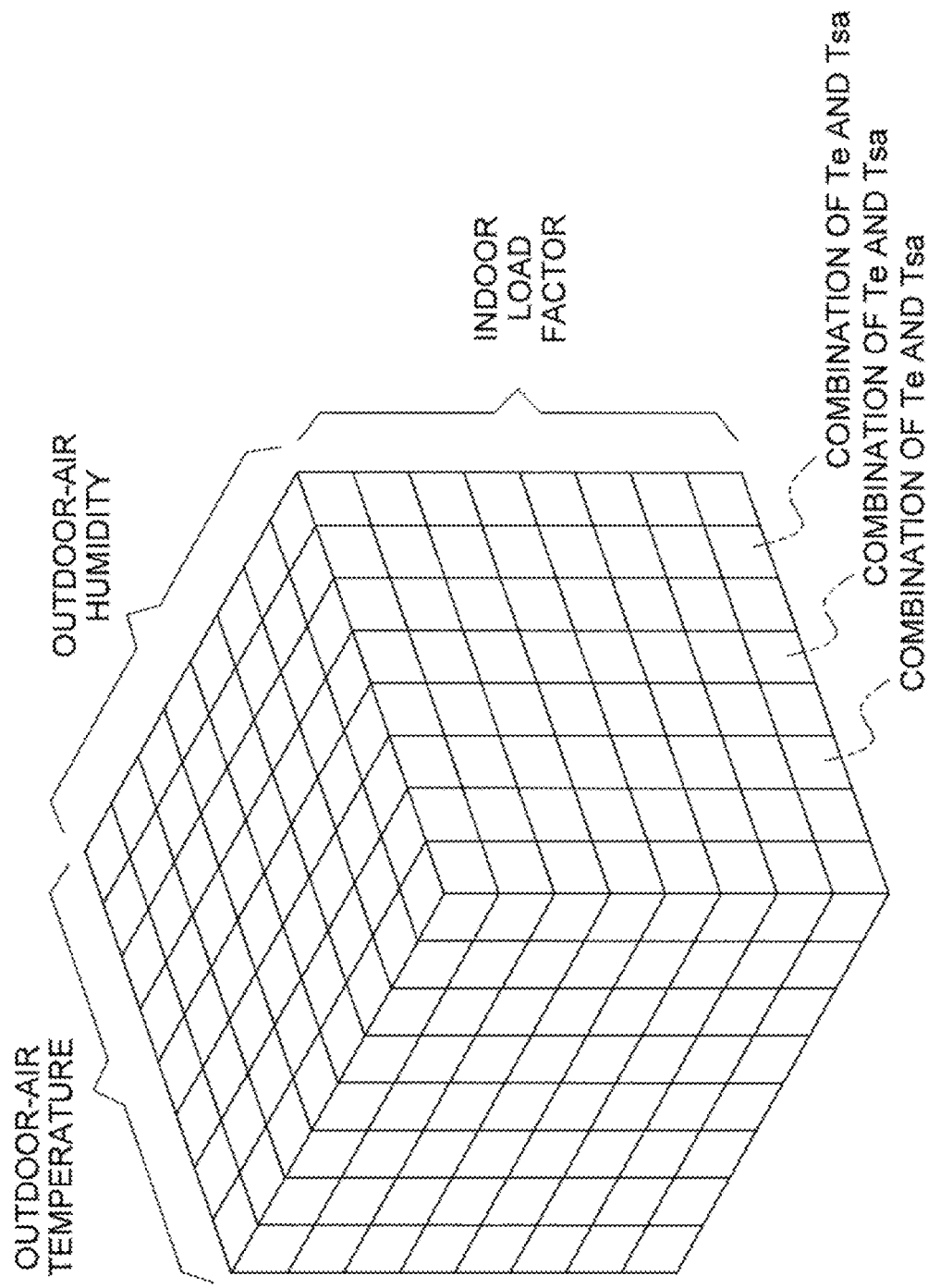
FIG. 21 is a schematic diagram illustrating an example of a model when the combination of the target evaporation temperature and the target supply-air temperature is selected in the cooperative load control.
Figure 22:
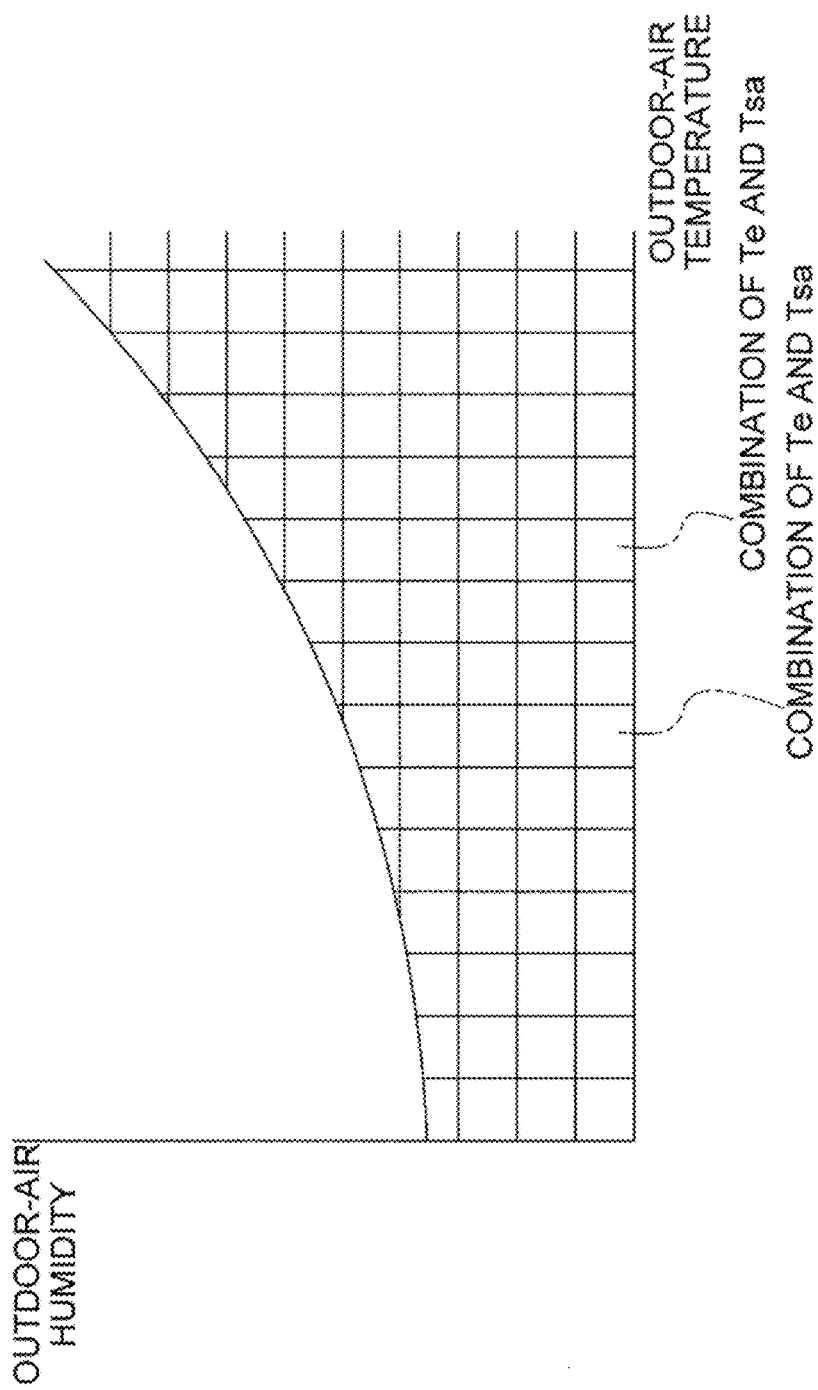
FIG. 22 is a schematic diagram illustrating another example of a model when the combination of the target evaporation temperature and the target supply-air temperature is selected in the cooperative load control.
Figure 23:
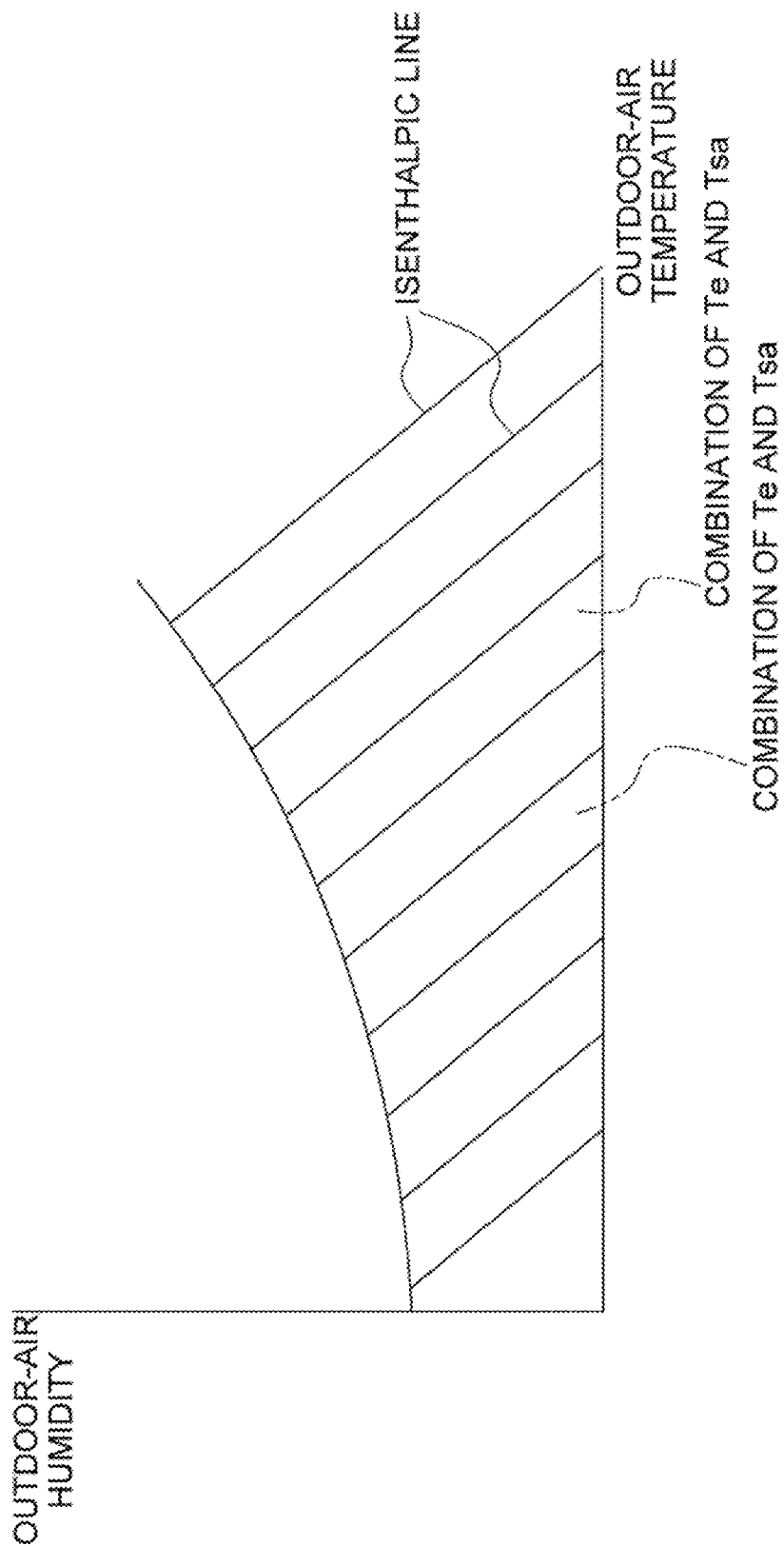
FIG. 23 is a schematic diagram illustrating another example of a model when the combination of the target evaporation temperature and the target supply-air temperature is selected in the cooperative load control.
Figure 24:
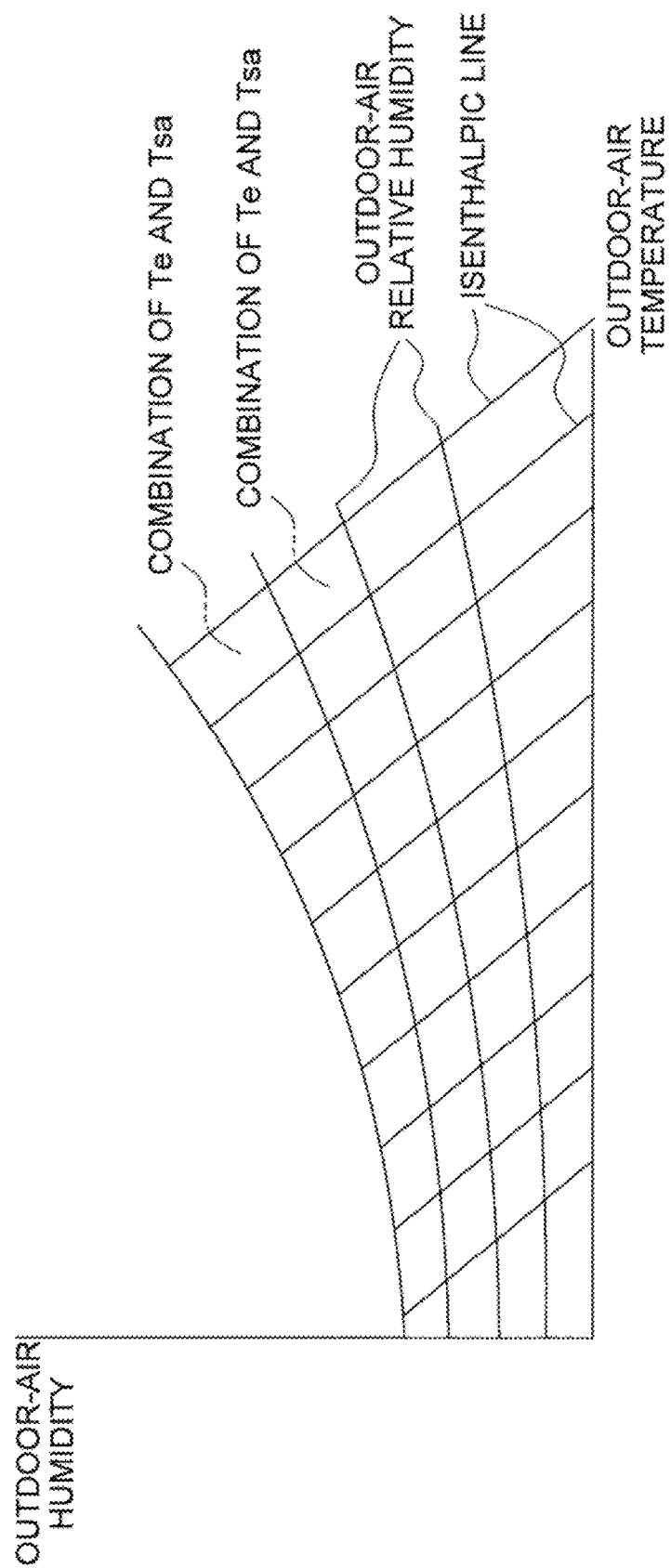
FIG. 24 is a schematic diagram illustrating another example of a model when the combination of the target evaporation temperature and the target supply-air temperature is selected in the cooperative load control.

FIG. 21 illustrates a model for determining the combination of the target evaporation temperature Te and the target supply-air temperature Tsa based on the outdoor-air temperature, the outdoor-air humidity, and the indoor load factor. FIG. 22 illustrates a model for determining the combination of the target evaporation temperature Te and the target supply-air temperature Tsa based on the outdoor-air temperature and the outdoor-air humidity. FIG. 23 illustrates a model for determining the combination of the target evaporation temperature Te and the target supply-air temperature Tsa based on the outdoor-air temperature, the outdoor-air humidity, and an enthalpy. FIG. 24 illustrates a model for determining the combination of the target evaporation temperature Te and the target supply-air temperature Tsa based on outdoor-air temperature, the outdoor-air humidity, an outdoor-air relative humidity, and the enthalpy.

Note that a manner of the combination of the target evaporation temperature Te and the target supply-air temperature Tsa in the cooperative load control is not necessarily limited to the one which is determined by using the model after the target evaporation temperature Te is determined in real time according to the formula F1 or the formula F2. For example, instead of determining the target evaporation temperature Te in real time according to the formula F1 or the formula F2, the combination of the target evaporation temperature Te and the target supply-air temperature Tsa may be determined in advance based on the outdoor-air temperature, the outdoor-air humidity, the indoor load factor, and the like, and the target evaporation temperature Te and the target supply-air temperature Tsa may be directly determined by using any of the models in FIG. 21 to FIG. 24 in accordance with statuses of the outdoor-air temperature, the outdoor-air humidity, the indoor load factor, and the like.

4-11

In the cooperative load control, if the load of the indoor-air conditioner 50 is high, by increasing the load allocated amount of the outdoor-air conditioner 10, the target evaporation temperature Te of the indoor-air conditioner 50 is increased, and the operating capacity ratio of them may be optimized. In addition, if the load of the indoor-air conditioner 50 is low, the target supply-air temperature Tsa may be increased so as to narrow the capability of the outdoor-air conditioner 10, and the target evaporation temperature Te may be increased so as to save energy (to reduce power consumption) of the indoor-air conditioner 50.

4-12

In the cooperative load control, the outdoor-air conditioner 10 processes the load of the target space SP, so that the evaporation temperature in the indoor heat exchanger 72 during cooling operation is prompted to reach the target evaporation temperature Te. That is, it is assumed that the target supply-air temperature Tsa is set such that the evaporation temperature in the indoor heat exchanger 72 during cooling operation approaches the target evaporation temperature Te.

4-13

In the cooperative load control, in a case where the air handling unit 30 performs heating operation for heating the outdoor-air OA and the indoor units 70 perform cooling operation for cooling the indoor-air IA, if the number of indoor units 70 that are in operation is increased or decreased, the target supply-air temperature Tsa is changed. For example, if the number of indoor units 70 that are in operation is increased, the target supply-air temperature Tsa is decreased. In addition, for example, if the number of indoor units 70 that are in operation is decreased, the target supply-air temperature Tsa is increased. Thus, in relation to an increase or a decrease in the number of indoor units 70 that are in operation, the target value of the temperature of the supply air is set and the operating capacity of the outdoor-air conditioner 10 is controlled.

(5) Features 5-1

In the air conditioning system 100 according to the above embodiment, in accordance with the status of the outdoor-air OA, the status of the indoor-air IA, the operation status of the outdoor-air conditioner 10, and/or the operation status of the indoor-air conditioner 50, the general control unit 90 performs cooperative load control (controls the operating capacity of the outdoor-air conditioner 10 and the operating capacity of the indoor-air conditioner 50 in cooperation). In the cooperative load control, the general control unit 90 controls at least one of a parameter of the outdoor-air conditioner 10 and a parameter of the indoor-air conditioner 50 such that the temperature or humidity of the indoor-air IA approaches the set value and also the total amount of the power consumption of the outdoor-air conditioner 10 and the power consumption of the indoor-air conditioner 50 is reduced.

Thus, in accordance with a status, at least one of a parameter of the outdoor-air conditioner 10 and a parameter of the indoor-air conditioner 50 is controlled such that the temperature or humidity of the indoor-air IA approaches the set value and also the total of the power consumption of the indoor-air conditioner 50 and the power consumption of the indoor-air conditioner 50 is reduced, and the operating capacity of the outdoor-air conditioner 10 and the operating capacity of the indoor-air conditioner 50 are controlled in cooperation. As a result, while the temperature or humidity in the target space SP is maintained to be appropriate, each of the outdoor-air conditioner 10 and the indoor-air conditioner 50 can operate with a suitable operating capacity based on energy conservation. In particular, in a case where actuators of the outdoor-air conditioner 10 and the indoor-air conditioner 50 are inverter-controlled to control the operating capacities, the operation efficiency is higher during partial load operation than during rated operation. For this feature, control of the outdoor-air conditioner 10 and the indoor-air conditioner 50 in cooperation in accordance with a status makes it possible to perform the partial load operation that leads to a high operation efficiency of each of the outdoor-air conditioner 10 and the indoor-air conditioner 50. Accordingly, an increase in energy conservation is prompted while comfortableness is achieved.

5-2

In the air conditioning system 100 according to the above embodiment, the parameter of the indoor-air conditioner 50 in the cooperative load control is the evaporation temperature (the target evaporation temperature Te) of the refrigerant in the indoor heat exchanger 72.

5-3

In the air conditioning system 100 according to the above embodiment, the parameter of the outdoor-air conditioner 10 in the cooperative load control is the temperature of the supply air SA.

5-4

In the air conditioning system 100 according to the above embodiment, the general control unit 90 performs the cooperative load control such that the evaporation temperature (the target evaporation temperature Te) of the refrigerant in the indoor heat exchanger 72 and the temperature of the supply air (the target supply-air temperature Tsa) are in negative correlation. Accordingly, while the temperature or humidity in the target space SP is maintained to be appropriate, each of the outdoor-air conditioner 10 and the indoor-air conditioner 50 can operate with a suitable operating capacity based on energy conservation.

5-5

In the air conditioning system 100 according to the above embodiment, in the cooperative load control, it is assumed that the general control unit 90 sets the target evaporation temperature Te (the target value of the evaporation temperature) of the refrigerant in the indoor heat exchanger 72 so as to control the operating capacity of the indoor-air conditioner 50. This enables easy control of the operating capacity of the indoor-air conditioner 50.

5-6

In the air conditioning system 100 according to the above embodiment, in the cooperative load control, it is assumed that the general control unit 90 increases the target evaporation temperature Te if the evaporation temperature of the refrigerant is higher than the predetermined reference value. Accordingly, if the latent-heat processing amount in the indoor heat exchanger 72 is assumed to be small, the target evaporation temperature Te is increased, and the operating capacity of the indoor unit 70 including the indoor heat exchanger 72 is reduced. In relation to this, the energy consumption of the indoor-air conditioner 50 is suppressed.

5-7

In the air conditioning system 100 according to the above embodiment, in the cooperative load control, it is assumed that the general control unit 90 sets the target supply-air temperature Tsa (the target value of the temperature of the supply air SA) so as to control the operating capacity of the outdoor-air conditioner 10. This enables easy control of the operating capacity of the outdoor-air conditioner 10.

5-8

In the air conditioning system 100 according to the above embodiment, in the cooperative load control, it is assumed that the general control unit 90 sets the target supply-air temperature Tsa such that the evaporation temperature of the refrigerant in the indoor heat exchanger 72 approaches the target evaporation temperature Te. Accordingly, the target supply-air temperature Tsa is set and the operating capacity of the outdoor-air conditioner 10 is controlled in relation to the evaporation temperature in the indoor heat exchanger 72. As a result, while the temperature or humidity in the target space SP is maintained to be appropriate, each of the outdoor-air conditioner 10 and the indoor-air conditioner 50 can accurately operate with a suitable operating capacity based on energy conservation.

5-9

In the air conditioning system 100 according to the above embodiment, in the cooperative load control, it is assumed that, in a case where the air handling unit 30 performs heating operation for heating the outdoor-air OA and the indoor units 70 perform cooling operation for cooling the indoor-air IA, if the number of indoor units 70 in operation is increased or decreased, the general control unit 90 changes the target supply-air temperature Tsa. Accordingly, the target supply-air temperature Tsa is set and the operating capacity of the outdoor-air conditioner 10 is controlled in relation to an increase or a decrease in the number of indoor units 70 in operation. As a result, while the temperature or humidity in the target space SP is maintained to be appropriate, each of the outdoor-air conditioner 10 and the indoor-air conditioner 50 can accurately operate with a suitable operating capacity based on energy conservation.

5-10

In the air conditioning system 100 according to the above embodiment, the heat transfer medium of the outdoor-air conditioner 10 is water, and heat exchange related to a sensible heat of the heat transfer medium is performed in the outdoor-air heat exchanger 33. That is, in the outdoor-air heat exchanger 33, heat exchange using the sensible heat capacity (temperature difference at the port for the heat transfer medium) is performed. That is, in a case where the outdoor-air conditioner 10 is of a central system, while the temperature or humidity in the target space SP is maintained to be appropriate, each of the outdoor-air conditioner 10 and the indoor-air conditioner 50 can operate with a suitable operating capacity based on energy conservation.

5-11

In the air conditioning system 100 according to the above embodiment, the general control unit 90 performs the cooperative load control such that the value calculated according to the following formula F1 becomes positive.

(current power consumption of the indoor-air conditioner 50−predicted power consumption of the indoor-air conditioner 50 after execution of the cooperative load control)+(current power consumption of the outdoor-air conditioner 10−predicted power consumption of the outdoor-air conditioner 10 after execution of the cooperative load control)   F1

This reliably increases energy conservation in the cooperative load control.

5-12

In the air conditioning system 100 according to the above embodiment, the general control unit 90 performs the cooperative load control such that the value calculated according to the following formula F2 becomes positive.

(current power consumption of the indoor-air conditioner 50−predicted power consumption of the indoor-air conditioner 50 after execution of the cooperative load control)−(current processed heat amount in the indoor-air conditioner 50−predicted processed heat amount in the indoor-air conditioner 50 after execution of the cooperative load control)/predicted COP of the outdoor-air conditioner 10 after execution of the cooperative load control   F2

This reliably increases energy conservation in the cooperative load control.

(6) Modifications

The above embodiment can be modified as appropriate as illustrated in the following modifications. Note that each of the modifications may be combined with another modification as long as no contradiction occurs.

(6-1) First Modification

In the outdoor-air conditioner 10 in the above embodiment, the humidifier 35 may be omitted as appropriate. That is, the outdoor-air conditioner 10 may be configured to not perform humidifying operation.

(6-2) Second Modification

The above embodiment has described a case where the air conditioning system 100 is applied to the building BL in which the three target spaces SP are formed. However, the installed environment of the air conditioning system 100 is not limited. For example, the air conditioning system 100 may be applied to a building in which four or more target spaces SP are formed. In addition, for example, the air conditioning system 100 may be applied to a building in which two or less (including one) target spaces SP are formed. In such a case, the number of indoor units 70 may be changed as appropriate in accordance with the number of target spaces SP. In addition, a plurality of indoor units 70 may be provided in one target space SP.

(6-3) Third Modification

In the above embodiment, the outdoor-air conditioner 10 includes the single chiller unit 20 and the single air handling unit 30. However, the number of chiller units 20 and the number of air handling units 30 included in the outdoor-air conditioner 10 are not necessarily limited to one and may be changed as appropriate in accordance with the installed environment or design specification. That is, the outdoor-air conditioner 10 may include a plurality of chiller units 20 and/or a plurality of air handling units 30. Note that the number of chiller units 20 and the number of air handling units 30 are not necessarily the same number.

In addition, in the above embodiment, the indoor-air conditioner 50 includes the single outdoor unit 60 and the three indoor units 70. However, the number of outdoor units 60 and the number of indoor units 70 included in the indoor-air conditioner 50 may be changed as appropriate in accordance with the installed environment or design specification. That is, the indoor-air conditioner 50 may include a plurality of outdoor units 60 and four or more or two or less indoor units 70.

(6-4) Fourth Modification

The above embodiment has described a case where each of the indoor units 70 is provided in the ceiling of the target space SP. However, the model of the indoor unit 70 and the manner of providing the indoor unit 70 are not limited. For example, the indoor unit 70 may be of a so-called ceiling-hung type, a wall-hung type, a floor-standing type, or the like.

(6-5) Fifth Modification

The configuration of the refrigerant circuit (C2, RC) formed in the chiller unit 20 and/or the indoor-air conditioner 50 may be changed as appropriate in accordance with the installed environment or design specification. In addition, the configuration of the heat transfer medium circuit C1 formed in the air handling unit 30 may also be changed as appropriate in accordance with the installed environment or design specification.

(6-6) Sixth Modification

The refrigerant that circulates in the refrigerant circuit (C2, RC) in the above embodiment is not necessarily the HFC refrigerant such as R32 or R410A, and may be another refrigerant (e.g., HFO-1234yf, HFO-1234ze(E), $CO_2$, or ammonia). In addition, the heat transfer medium that circulates in the heat transfer medium circuit C1 is not necessarily water, and another fluid may be employed.

(6-7) Seventh Modification

The positions where the various sensors included in the air conditioning system 100 are provided are not necessarily limited to the ones in the above embodiment and may be changed as appropriate. For example, the outdoor-air temperature sensor 301, the outdoor-air humidity sensor 302, and/or the supply-air temperature sensor 303 are not necessarily provided in the air handling unit 30 and may be provided in another unit or may be provided independently. In addition, for example, the indoor temperature sensor 701, the indoor humidity sensor 702, and/or the carbon dioxide concentration sensor 703 are not necessarily provided in the indoor unit 70 and may be provided in another unit or may be provided independently.

(6-8) Eighth Modification

Although the above embodiment has not particularly described the manner of providing the general control unit 90, the manner of providing the general control unit 90 can be selected as appropriate. For example, the general control unit 90 may be provided in an administration office of the building BL or a remote place that is connected via a WAN or a LAN so that communication can be performed.

In addition, the configuration of the general control unit 90 may also be changed as appropriate. For example, the functional units (91 to 95) illustrated in FIG. 6 are not necessarily provided in an integrated manner, and the general control unit 90 may be configured by connecting the functional units that are provided in a dispersed manner via a communication network. In addition, the general control unit 90 may also be configured by connecting a plurality of devices (PC, smartphone, and the like). Furthermore, the general control unit 90 may also be configured by being connected to the outdoor-air conditioner control unit 49 and/or the indoor-air conditioner control unit 79.

(6-9) Ninth Modification

The above embodiment has described a case where the outdoor-air conditioner 10 supplies only the outdoor-air OA as the supply air SA. However, a return-air passage may be formed in the outdoor-air conditioner 10 and the outdoor-air OA and the indoor-air IA may be mixed to be supplied as the supply air SA. In such a case, the mixing ratio of the outdoor-air OA and the indoor-air IA may be changed as appropriate in accordance with the installed environment or design specification.

(6-10) Tenth Modification

The details of control related to the cooperative load control are not necessarily limited to the ones described in the above embodiment, and may be changed as appropriate in accordance with the design specification or installed environment as long as the operating capacity of the outdoor-air conditioner 10 and the operating capacity of the indoor-air conditioner 50 are controlled in cooperation such that the temperature or humidity of the indoor-air IA approaches the set value and also the total of the power consumption of the outdoor-air conditioner 10 and the power consumption of the indoor-air conditioner 50 is reduced. For example, any of the details described in "(4) Regarding Cooperative Load Control" above may be changed or omitted as appropriate for further optimization. In addition, the variables used may also be changed as appropriate.

For example, the parameter of the outdoor-air conditioner 10 controlled in the cooperative load control is not necessarily limited to the target supply-air temperature Tsa and may be the air volume of the air supply fan 38 or the temperature of the heat transfer medium flowing into the outdoor-air heat exchanger 33. In addition, if the heat transfer medium is a refrigerant, the parameter of the outdoor-air conditioner 10 controlled in the cooperative load control may be the evaporation temperature or an enthalpy of the heat transfer medium in the outdoor-air heat exchanger 33.

In addition, for example, the parameter of the indoor-air conditioner 50 controlled in the cooperative load control is not necessarily limited to the target evaporation temperature Te. For example, the parameter of the indoor-air conditioner 50 controlled in the cooperative load control may be the pressure or enthalpy of the refrigerant in the indoor heat exchanger 72, the state of the refrigerant in the outdoor heat exchanger 63, the capacity of the compressor 61, the air volume of the outdoor fan 68, the air volume of the indoor fan 75, or the like.

(6-11) Eleventh Modification

The above embodiment has described a case where the operating-capacity control unit 95 calculates each of the power consumption of the outdoor-air conditioner 10 and the power consumption of the outdoor-air conditioner 10 in accordance with a status and performs the cooperative load control on the basis of the calculated power consumption. However, the power consumption of the outdoor-air conditioner 10 and/or the power consumption of the outdoor-air conditioner 10 may be acquired on the basis of a table that is defined in advance according to status. In addition, the power consumption of the outdoor-air conditioner 10 and/or the power consumption of the outdoor-air conditioner 10 does not necessarily calculated in real time, and the power consumption of the outdoor-air conditioner 10 or the power consumption of the outdoor-air conditioner 10 may be acquired by using a power measurement instrument that directly measures the power consumption of the outdoor-air conditioner 10 or the power consumption of the indoor-air conditioner 50.

(6-12) Twelfth Modification

The above embodiment has described a case where the combination of the target evaporation temperature Te and the target supply-air temperature Tsa is determined by selecting a condition under which the total power consumption becomes the lowest as a result of comparison between the total power consumption predicted in a case where a predetermined parameter (e.g., the target evaporation temperature Te or the target supply-air temperature Tsa) is increased or decreased from the current value within a predetermined range with respect to the sum (total power consumption) of the power consumption of the outdoor-air conditioner 10 and the power consumption of the indoor-air conditioner 50 by using the table (the cooperative load control table tb1) illustrated in FIG. 18 in the cooperative load control. Then, in the cooperative load control table tb1 (FIG. 18), the five cases (a) to (e) (cases where the target evaporation temperature Te is the current value, decreased from the current value by 1° C., decreased by 2° C., increased by 1° C., and increased by 2° C.) are set for the total power consumption to be compared.

However, the manner of generating the cooperative load control table tb1 is not necessarily limited to this and may be changed as appropriate. For example, in the cooperative load control table tb1 in FIG. 18, a case where the target evaporation temperature Te is the current value, decreased from the current value by 3° C., decreased by 4° C., increased by 3° C., or increased by 4° C. may be set. In addition, for example, in the cooperative load control table tb1, six or more cases or four or less cases may be set for the total power consumption to be compared.

(6-13) Thirteenth Modification

The above embodiment has described a case where water is used as the heat transfer medium in the outdoor-air conditioner 10. However, the heat transfer medium used in the outdoor-air conditioner 10 is not necessarily limited to water and may be another fluid. For example, in the outdoor-air conditioner 10, a refrigerant may be used as the heat transfer medium. In such a case, the outdoor-air conditioner 10 may be configured as in an outdoor-air conditioner 10*a* of a direct-expansion type illustrated in FIG. 25.

Figure 25:
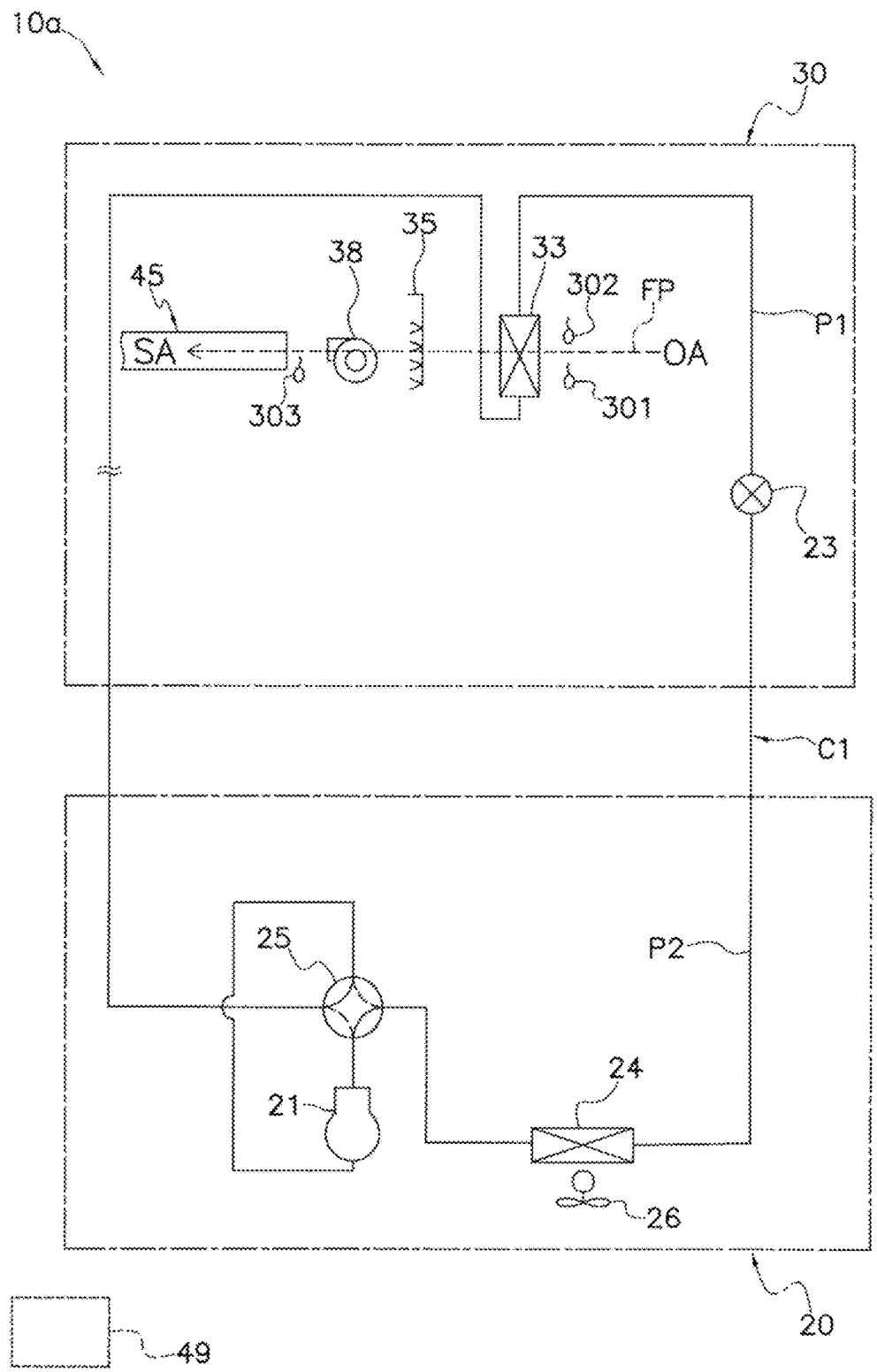
FIG. 25 is a schematic diagram illustrating the configuration of the outdoor-air conditioner according to a thirteenth modification.

FIG. 25 schematically illustrates the configuration of the outdoor-air conditioner 10*a*. In the outdoor-air conditioner 10*a*, as illustrated in FIG. 25, the heat transfer medium circuit C1 and the outdoor-air conditioner refrigerant circuit C2 in the outdoor-air conditioner 10 are connected and form a single circuit. In relation to this, in the outdoor-air conditioner 10*a*, the heat transfer medium heat exchanger 22 and the heat transfer medium pump Pa are omitted. In addition, in the outdoor-air conditioner 10*a*, the refrigerant expansion valve 23 located between the outdoor-air heat exchanger 33 and the refrigerant heat exchanger 24 is provided in the air handling unit 30.

During the operation of the outdoor-air conditioner 10*a*, the refrigerant (heat transfer medium) is compressed in the refrigerant compressor 21 and discharged as a high-pressure refrigerant. The high-pressure refrigerant discharged from the refrigerant compressor 21 is subjected to heat exchange with an air flow generated by the chiller fan 26 in the refrigerant heat exchanger 24 during normal cycle operation or is subjected to heat exchange with an air flow generated by the air supply fan 38 in the outdoor-air heat exchanger 33 during reverse cycle operation to be condensed or to radiate heat. Note that heat exchange related to the latent heat of the heat transfer medium is performed in the outdoor-air heat exchanger 33. That is, heat exchange using the latent heat capacity, which is a change of the latent heat of the heat transfer medium, is performed in the outdoor-air heat exchanger 33.

The refrigerant that is condensed or that has radiated heat in one of the refrigerant heat exchanger 24 and the outdoor-air heat exchanger 33 is decompressed in the refrigerant expansion valve 23 to be a low-pressure refrigerant. Then, the refrigerant flows into the other heat exchanger and is subjected to heat exchange with the air flow to be evaporated. Then, the refrigerant is sucked into the refrigerant compressor 21 again.

Note that in the above case, the parameter of the outdoor-air conditioner 10 controlled in the cooperative load control may be the evaporation temperature or enthalpy of the heat transfer medium in the outdoor-air heat exchanger 33.

(6-14) Fourteenth Modification

In the above embodiment, the air handling unit 30 is provided in the ceiling CL that forms the target space SP. However, the manner of providing the air handling unit 30 is not necessarily limited to this and may be changed as appropriate. For example, the air handling unit 30 may be provided under the floor or on a wall that forms the target space SP.

(6-15) Fifteenth Modification

The above embodiment has described the air conditioning system 100 including the outdoor-air conditioner 10 of a single duct system. However, the air conditioning system 100 may be configured in a different manner. For example, the air conditioning system 100 may be configured as in an air conditioning system 100a illustrated in FIG. 26.

Figure 26:
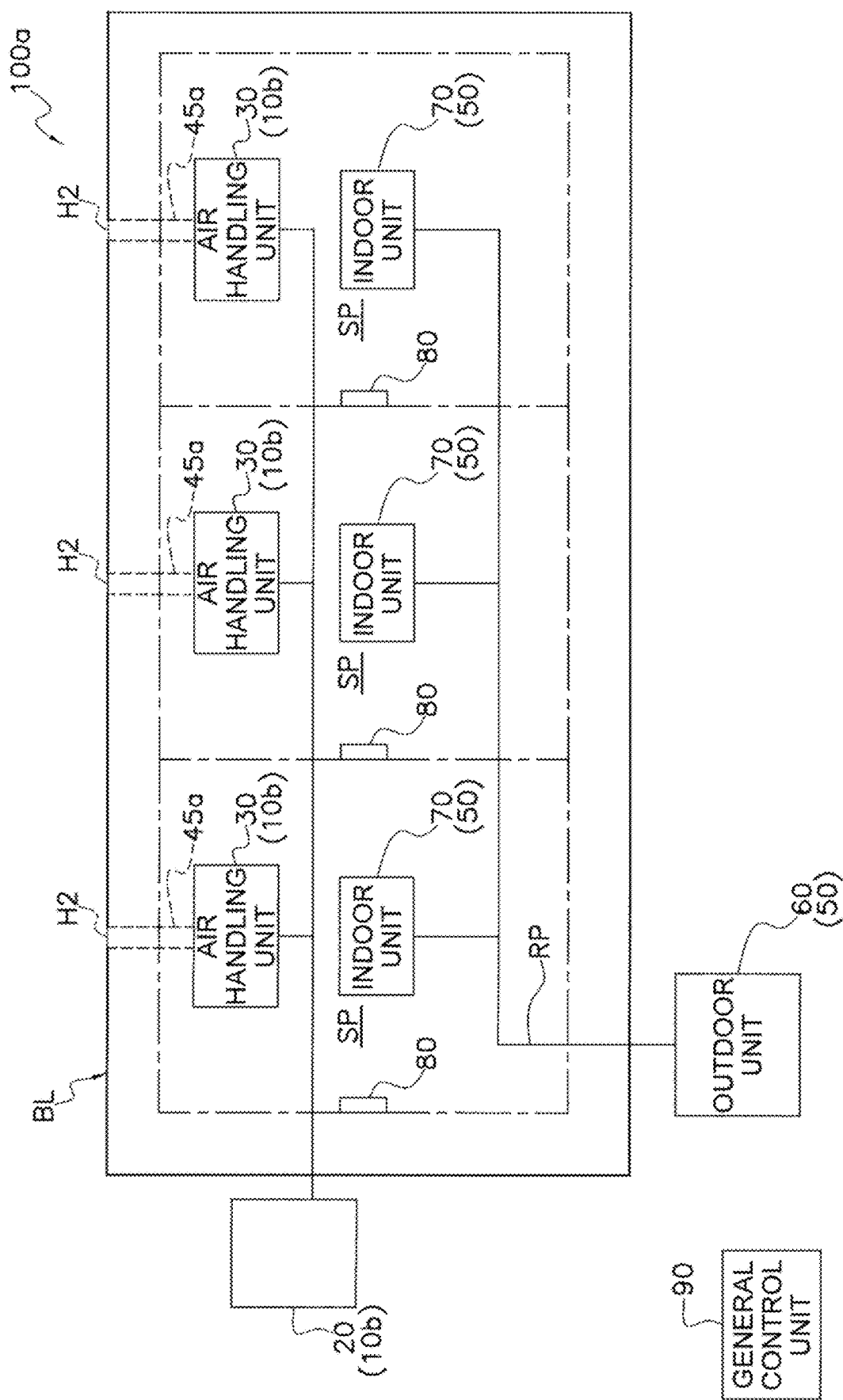
FIG. 26 is a schematic diagram illustrating the air conditioning system according to a fifteenth modification.

FIG. 26 is a schematic diagram illustrating the air conditioning system 100a. The air conditioning system 100a includes, in place of the outdoor-air conditioner 10 of a central system, an outdoor-air conditioner 10b of a so-called unit system.

Figure 27:
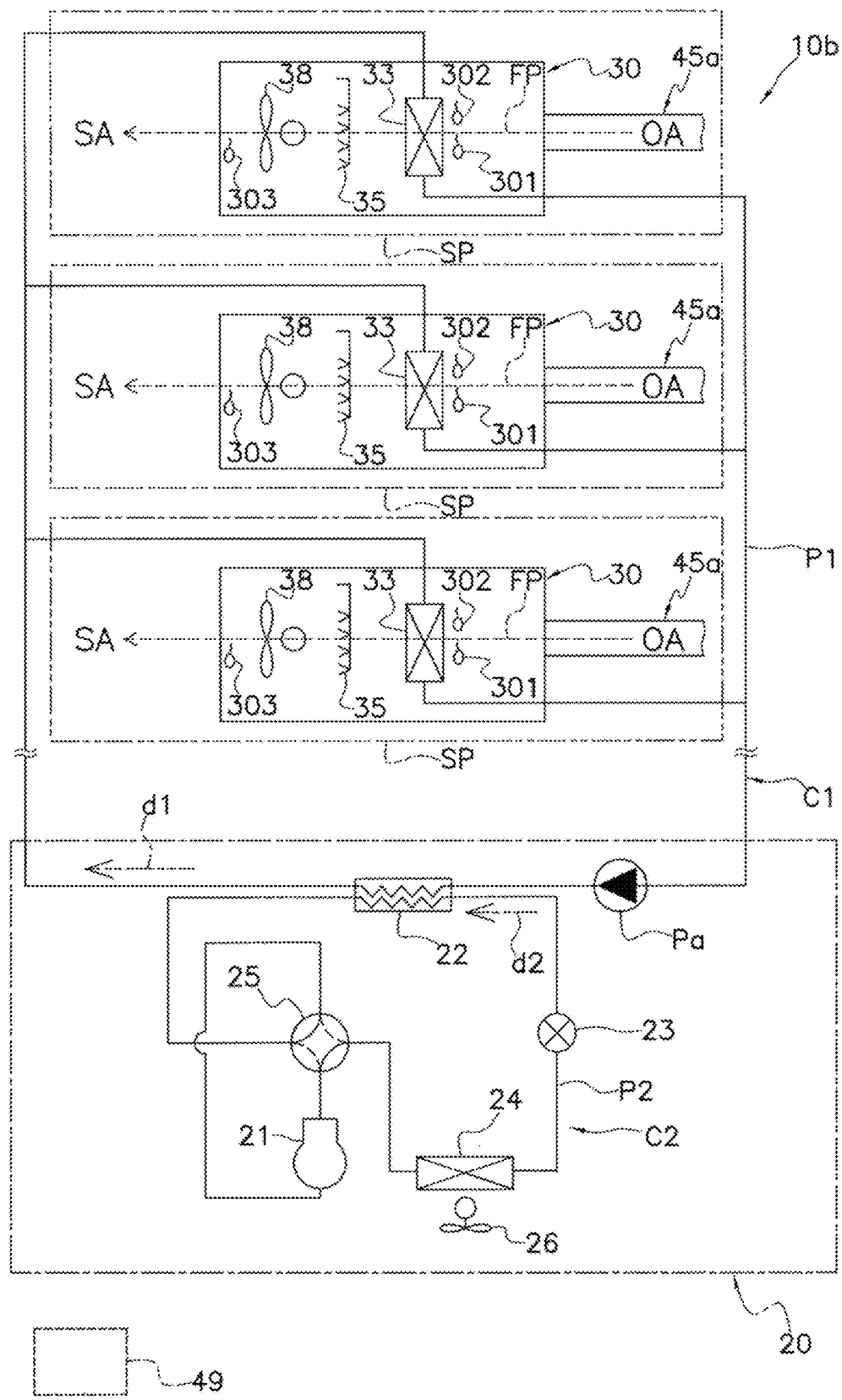
FIG. 27 is a schematic diagram illustrating the configuration of the outdoor-air conditioner according to the fifteenth modification.

FIG. 27 is a schematic diagram illustrating the configuration of the outdoor-air conditioner 10b. The outdoor-air conditioner 10b includes a plurality of air handling units 30 that are provided in parallel to each other. In the outdoor-air conditioner 10b, each of the air handling units 30 is provided in a corresponding one of the target spaces SP. In the outdoor-air heat exchanger 33 of each of the air handling units 30, heat exchange related to the sensible heat of the heat transfer medium is performed. That is, in the outdoor-air heat exchanger 33, heat exchange using the sensible heat capacity (temperature difference at the port for the heat transfer medium) is performed. In addition, the outdoor-air conditioner 10b includes a plurality of air supply ducts 45a in place of the air supply duct 45. The air supply ducts 45a correspond to the air handling units 30 in a one-to-one relationship. An end of each of the air supply ducts 45a is connected to an intake hole H2 formed in the building BL, and the other end thereof is connected to an upstream-side end of the outdoor-air passage FP of the corresponding air handling unit 30.

Figure 28:
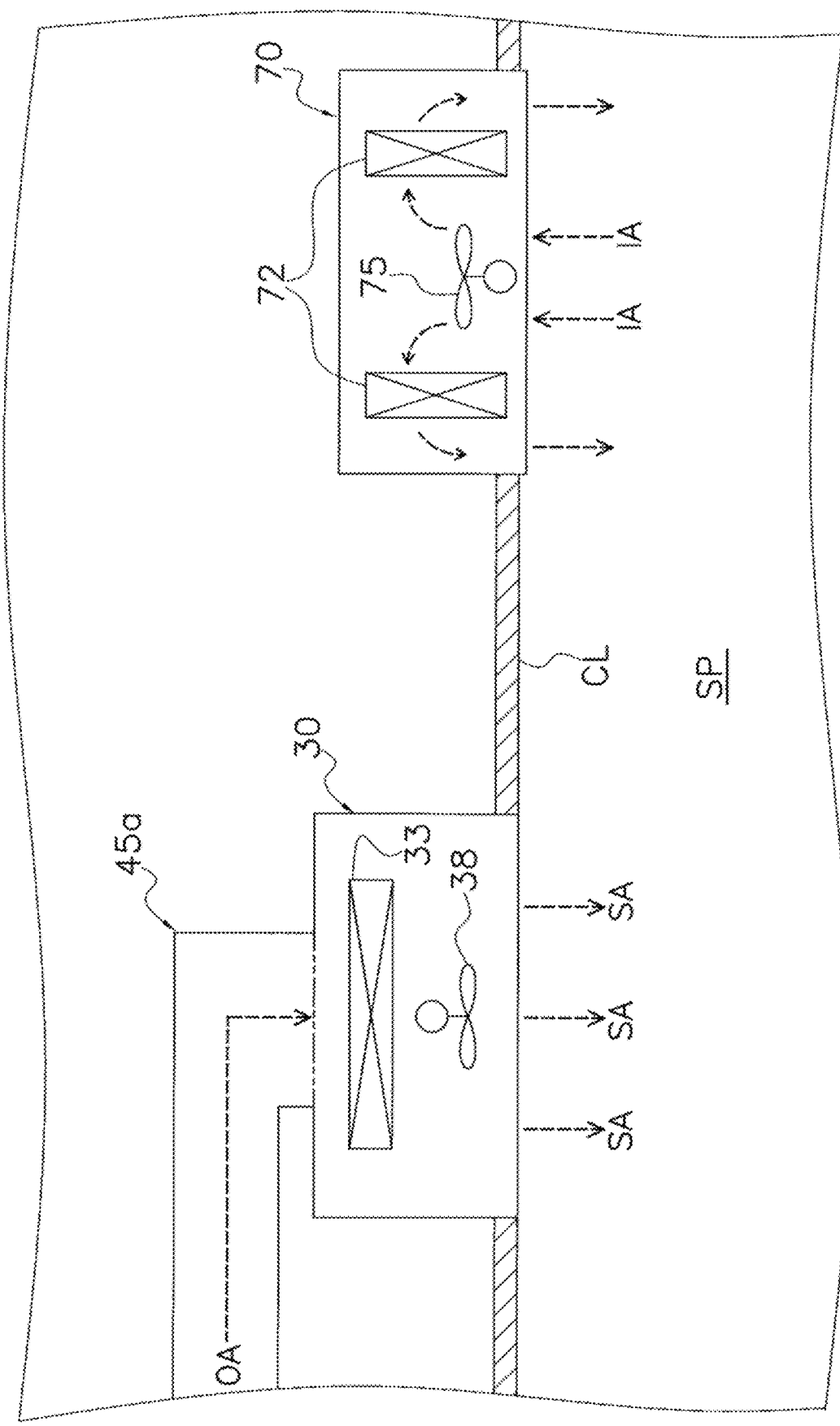
FIG. 28 is a schematic diagram illustrating the manner of providing an air handling unit and an indoor unit in the target space.

FIG. 28 is a schematic diagram illustrating the manner of providing each of the air handling units 30 and each of the indoor units 70 in the target space SP. In the outdoor-air conditioner 10b, the air handling unit 30 is provided in the ceiling CL that forms the corresponding target space SP. In addition, in the outdoor-air conditioner 10b, a discharge hole (omitted from illustration) is formed in each of the air handling units 30, the discharge hole being connected to a downstream end of the outdoor-air passage FP, and the supply air SA is sent to the target space SP through the discharge hole.

The thought regarding the cooperative load control in the above embodiment is also applicable to the air conditioning system 100a above.

Note that in a case where a refrigerant is used as the heat transfer medium in the air conditioning system 100a, the outdoor-air conditioner 10a may also be provided in place of the outdoor-air conditioner 10b. In such a case, each of the heat transfer medium circuits C1 and the outdoor-air conditioner refrigerant circuit C2 in the outdoor-air conditioner 10 may be connected to form one circuit. In addition, heat exchange related to the latent heat of the heat transfer medium is performed in the outdoor-air heat exchanger 33 of each of the air handling units 30. That is, heat exchange using the latent heat capacity, which is a change of the latent heat of the heat transfer medium, is performed in the outdoor-air heat exchanger 33.

(6-16) Sixteenth Modification

Figure 29:
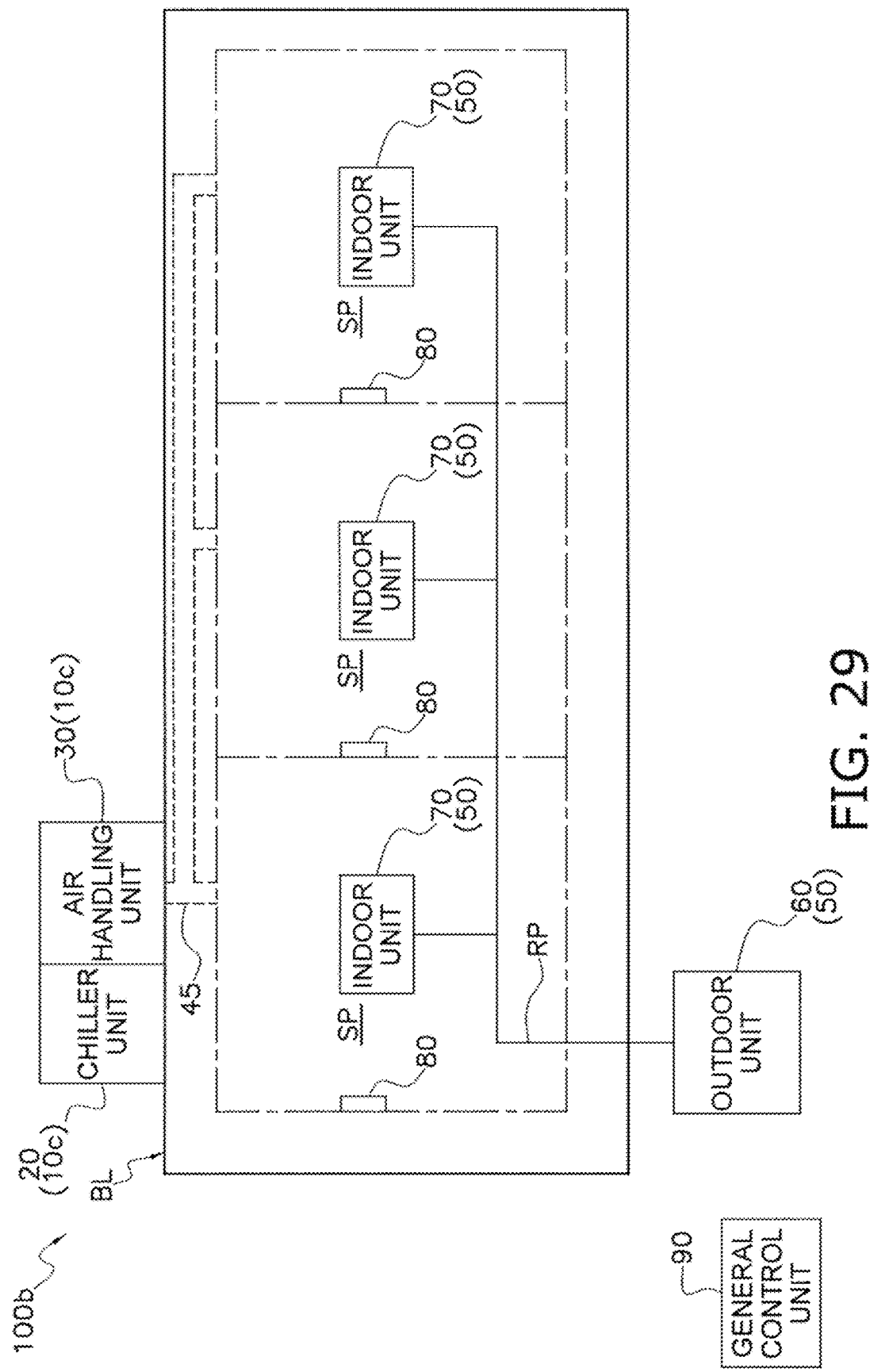
FIG. 29 is a schematic diagram illustrating the configuration of the air conditioning system according to a sixteenth modification.

In addition, for example, the air conditioning system 100 may also be configured as in an air conditioning system 100b illustrated in FIG. 29.

The air conditioning system 100b includes an outdoor-air conditioner 10c of a roof-top type. In the outdoor-air conditioner 10c, the chiller unit 20 and the air handling unit 30 are formed in an integrated manner. In the outdoor-air conditioner 10c, the outdoor-air conditioner 10c is provided on the roof or rooftop of the building BL.

Figure 30:
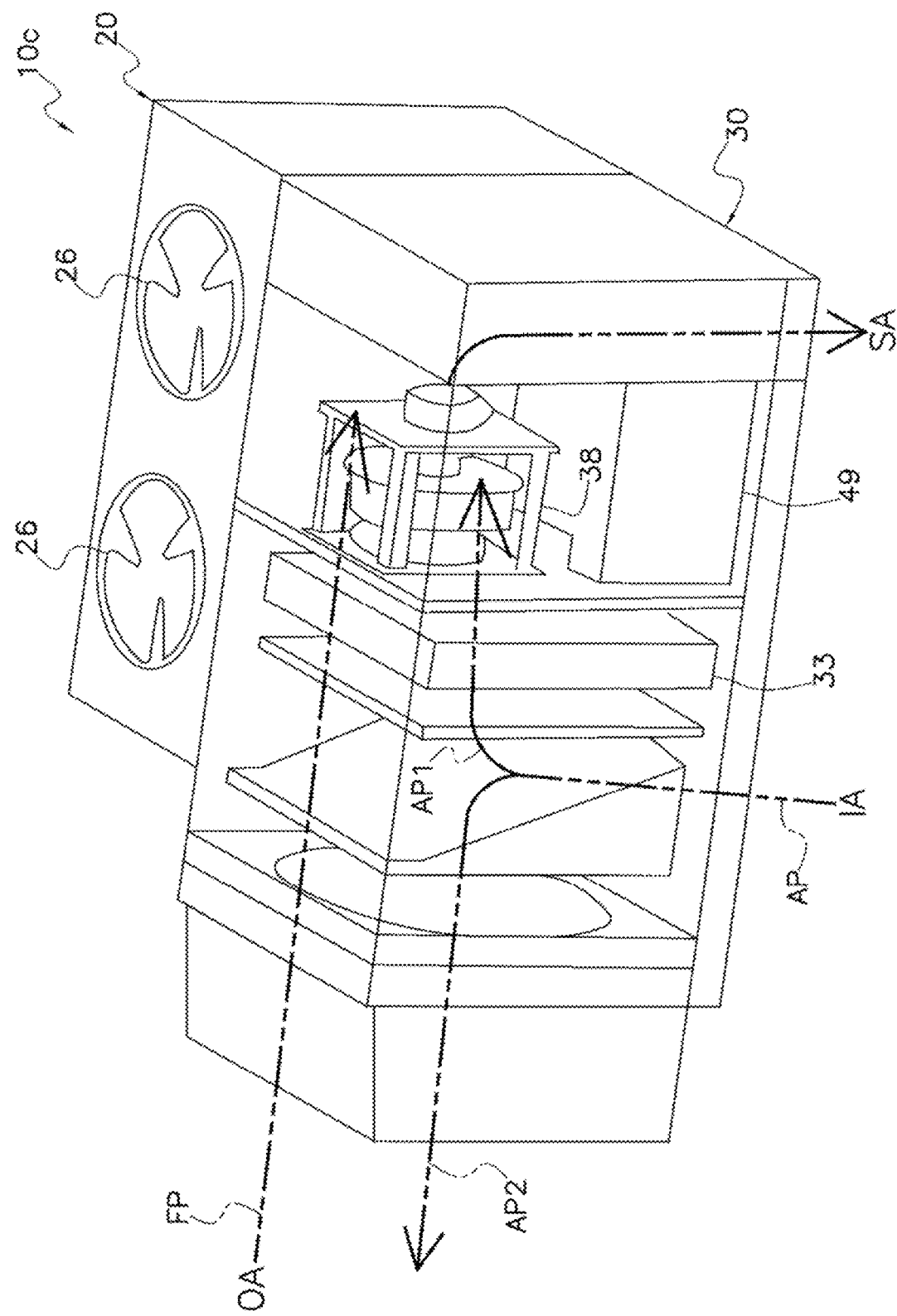
FIG. 30 is a schematic diagram illustrating the configuration of the outdoor-air conditioner according to the sixteenth modification.

The outdoor-air conditioner 10c is configured as illustrated in FIG. 30, for example. In the outdoor-air conditioner 10c, the chiller unit 20 and the air handling unit 30 are joined and integrated. In FIG. 30, in the outdoor-air conditioner 10c, in addition to the outdoor-air passage FP, a ventilation passage AP is formed. An upstream-side end of the ventilation passage AP communicates to the target space SP. A downstream-side end of a return-air passage AP1 is split into two branches, including the return-air passage AP1 and a discharge passage AP2. A downstream-side end of the return-air passage AP1 communicates to the outdoor-air passage FP. A downstream-side end of the discharge passage AP2 communicates to an outdoor space outside and is a passage for discharging the indoor-air IA to the outdoor space.

Since the ventilation passage AP is formed in the outdoor-air conditioner 10c, the outdoor-air OA and the indoor-air IA are mixed to be supplied as the supply air SA. In the outdoor-air conditioner 10c, the outdoor-air OA and the indoor-air IA are mixed in, for example, 7:3. The mixing ratio of the outdoor-air OA and the indoor-air IA may be changed as appropriate in accordance with the installed environment or design specification.

Note that one of the return-air passage AP1 and the discharge passage AP2 of the ventilation passage AP may be omitted in the outdoor-air conditioner 10c. In addition, the ventilation passage AP may be omitted in the outdoor-air conditioner 10c. That is, the outdoor-air conditioner 10c does not have to mix the outdoor-air OA and the indoor-air IA and may be configured to supply only the outdoor-air OA as the supply air SA.

The outdoor-air conditioner 10c is not necessarily provided on the roof or rooftop of the building BL and may be provided in the outdoor space in a different manner.

(7) Technical Thoughts That Above Embodiment Encompasses/can Encompass

The above embodiment encompasses (or can encompass) each of the following technical thoughts.

7-1

A controller that transmits both an operation-stopped signal and an operation parameter (e.g., the temperature of cooling water for heating source and the outdoor-air conditioner and the supply-air temperature, the pressure of water to be sent by a variable-water-volume pump, or the evaporation temperature of the indoor-air conditioner) signal of each device in accordance with a load status by using internal information (e.g., the operation stop state of the indoor-air conditioner, the evaporation temperature, the indoor temperature and/or indoor humidity, the operation state of the outdoor-air conditioner, the outdoor-air temperature, the outdoor-air humidity and/or the air volume, or the like) of a heating source, the outdoor-air conditioner, and the indoor-air conditioner (e.g., direct-expansion multi-split-type indoor-air conditioner).

7-2

Switching between single operation of the outdoor-air conditioner, single operation (ventilation) of the outdoor-air conditioner, cooperative operation (outdoor-air cooling) of the outdoor-air conditioner, single operation of the indoor-air conditioner, cooperative load operation, all stop, single operation (outdoor-air cooling) of the outdoor-air conditioner, and/or single (precooling operation) of the indoor-air conditioner in accordance with the load and indoor state during cooling operation.

7-3

Operation with an optimal target supply-air temperature of the outdoor-air conditioner and an optimal target evaporation temperature of the indoor-air conditioner for achieving both the indoor environment in accordance with the load and energy saving in cooperative load control during cooling operation.

7-4

Setting of the target supply-air temperature of the outdoor-air conditioner and the target evaporation temperature of the indoor-air conditioner by using the above controller.

7-5

Determination of the target supply-air temperature and the target evaporation temperature in accordance with the load condition (e.g., the outdoor-air temperature/humidity, the indoor temperature/humidity, the air volume of the outdoor-air conditioner, the number of indoor units in operation, and the like)

7-6

Change of the supply-air temperature of the outdoor-air conditioner such that the evaporation temperature of the indoor-air conditioner (internal information of the indoor-air conditioner) approaches the target evaporation temperature.

7-7

Forcibly setting the evaporation temperature to a much higher value as a result of determination that the latent-heat processing amount of the indoor-air conditioner is especially small if the measured value of the evaporation temperature is higher than or equal to a certain value.

7-8

Using the detection values of various sensors in the indoor units when using indoor temperature/humidity data.

7-9

Using the detection value of the indoor-temperature sensor in the indoor unit in controlling the air volume for outdoor-air cooling by the cooperative operation (outdoor-air cooling) of the outdoor-air conditioner or the single operation (outdoor-air cooling) of the outdoor-air conditioner during cooling operation.

7-10

Switching between single operation of the outdoor-air conditioner, single operation (ventilation) of the outdoor-air conditioner, single operation of the indoor-air conditioner, cooperative load operation, all stop, cooling/heating mixed operation, and/or preheating operation of the indoor-air conditioner in accordance with the load and indoor state during heating operation.

7-11

Changing the target supply-air temperature in accordance with an increase or a decrease in the number of indoor units to perform cooling operation when some of the indoor units perform cooling operation in a case where the outdoor-air conditioner performs heating operation.

7-12

If the indoor-air conditioner is forcibly controlled to be in a stopped state (in order to increase the efficiency of the system), being able to cancel the control by using the remote controller (manually).

7-13

Even if the indoor units are in a stopped state, changing the target values (e.g., the target supply-air temperature and the target indoor temperature) related to the operation of the outdoor-air conditioner by using the remote controller.

7-14

Adjusting the temperature of the heat transfer medium (water) in accordance with the state of the outdoor-air and the supply-air temperature.

7-15

Changing the control of the number of revolutions of the heat transfer medium pump (sending water pressure variable control) in accordance with the operation state of the indoor units.

8

Although the embodiment has been described above, it is to be understood that various modifications can be made to the manner and details without departing from the spirit and scope of the claims.

INDUSTRIAL APPLICABILITY

The present disclosure is applicable to an air conditioning system.

REFERENCE SIGNS LIST 10, 10a, 10b, 10c: outdoor-air conditioner
20: chiller unit (heat transfer medium adjusting unit)
21: refrigerant compressor
22: heat transfer medium heat exchanger
23: refrigerant expansion valve
24: refrigerant heat exchanger
25: flow-passage switching valve
26: chiller fan
30: air handling unit (outdoor-air conditioning unit)
33: outdoor-air heat exchanger (outdoor-air conditioner heat exchanger)
35: humidifier
38: air supply fan (first fan)
45, 45a: air supply duct (duct)

49: outdoor-air conditioner control unit
50: indoor-air conditioner
60: outdoor unit (refrigerant adjusting unit)
61: compressor
62: four-way switching valve
63: outdoor heat exchanger
68: outdoor fan
70: indoor unit
71: expansion valve
72: indoor heat exchanger (indoor-air conditioner heat exchanger)
75: indoor fan (second fan)
79: indoor-air conditioner control unit
80: remote controller
90: general control unit (control unit)
91: storage unit
92: first communication unit
93: second communication unit
94: acquisition unit
95: operating-capacity control unit
100, 100a, 100b: air conditioning system
301: outdoor-air temperature sensor
302: outdoor-air humidity sensor
303: supply-air temperature sensor
701: indoor temperature sensor
702: indoor humidity sensor
703: carbon dioxide concentration sensor
704: refrigerant temperature sensor
BL: building
C1: heat transfer medium circuit
C2: outdoor-air conditioner refrigerant circuit
CL: ceiling
FP: outdoor-air passage
GP1: gas-side refrigerant connection pipe
H1: intake hole
IA: indoor-air
LP1: liquid-side refrigerant connection pipe
OA: outdoor-air
P1-P3: first pipe-third pipe
Pa: heat transfer medium pump (heat transfer medium adjusting unit)
RC: refrigerant circuit
RP: refrigerant pipe
RP1-RP7: first refrigerant pipe-seventh refrigerant pipe
SA: supply air
SP: target space

CITATION LIST

Patent Literature

<PTL 1> Japanese Unexamined Patent Application Publication No. 2016-57038

The invention claimed is:

1. An air conditioning system comprising:
an outdoor-air conditioner including an outdoor-air conditioning unit and a heat transfer medium adjusting unit that adjusts a state of a heat transfer medium flowing in the outdoor-air conditioning unit, the outdoor-air conditioner sucking outdoor-air and supplying the outdoor-air as supply air from the outdoor-air conditioning unit to perform air conditioning of a target space;
an indoor-air conditioner including a plurality of indoor units and a refrigerant adjusting unit that adjusts a state of a refrigerant flowing in the indoor units, the indoor-air conditioner cooling or heating indoor-air that is air inside the target space by using the indoor units and supplying the air to the target space to perform air conditioning of the target space; and
a control unit that controls operations of the outdoor-air conditioner and the indoor-air conditioner,
wherein the outdoor-air conditioning unit includes a first fan and an outdoor-air conditioner heat exchanger, the first fan operating to suck the outdoor-air and to send the supply air to the target space, the outdoor-air conditioner heat exchanger causing heat exchange between the outdoor-air sucked by the first fan and the heat transfer medium,
wherein each of the indoor units includes a second fan and an indoor-air conditioner heat exchanger, the second fan operating to suck the indoor-air and to send the air to the target space, the indoor-air conditioner heat exchanger causing heat exchange between the indoor-air sucked by the second fan and the refrigerant,
wherein the control unit performs cooperative load control in which an operating capacity of the outdoor-air conditioner and an operating capacity of the indoor-air conditioner are controlled in cooperation in accordance with a status of the outdoor-air, a status of the indoor-air, an operation status of the outdoor-air conditioner, and/or an operation status of the indoor-air conditioner and controls, in the cooperative load control, at least one of a parameter of the outdoor-air conditioner and a parameter of the indoor-air conditioner such that a temperature or humidity of the indoor-air approaches a set value and also a total amount of power consumption of the outdoor-air conditioner and power consumption of the indoor-air conditioner is reduced, and
the control unit performs the cooperative load control such that a target evaporation temperature of the refrigerant in the indoor-air conditioner heat exchanger and a target supply air temperature are in negative correlation.

2. An air conditioning system comprising:
an outdoor-air conditioner including an outdoor-air conditioning unit and a heat transfer medium adjusting unit that adjusts a state of a heat transfer medium flowing in the outdoor-air conditioning unit, the outdoor-air conditioner sucking outdoor-air and supplying the outdoor-air as supply air from the outdoor-air conditioning unit to perform air conditioning of a target space;
an indoor-air conditioner including a plurality of indoor units and a refrigerant adjusting unit that adjusts a state of a refrigerant flowing in the indoor units, the indoor-air conditioner cooling or heating indoor-air that is air inside the target space by using the indoor units and supplying the air to the target space to perform air conditioning of the target space; and
a control unit that controls operations of the outdoor-air conditioner and the indoor-air conditioner,
wherein the outdoor-air conditioning unit includes a first fan and an outdoor-air conditioner heat exchanger, the first fan operating to suck the outdoor-air and to send the supply air to the target space, the outdoor-air conditioner heat exchanger causing heat exchange between the outdoor-air sucked by the first fan and the heat transfer medium,
wherein each of the indoor units includes a second fan and an indoor-air conditioner heat exchanger, the second fan operating to suck the indoor-air and to send the air to the target space, the indoor-air conditioner heat exchanger causing heat exchange between the indoor-air sucked by the second fan and the refrigerant, wherein the control unit performs cooperative load control in which an operating capacity of the outdoor-air conditioner and an operating capacity of the indoor-air conditioner are controlled in cooperation in accordance with a status of the outdoor-air, a status of the indoor-air, an operation status of the outdoor-air conditioner, and/or an operation status of the indoor-air conditioner and controls, in the cooperative load control, at least one of a parameter of the outdoor-air conditioner and a parameter of the indoor-air conditioner such that a temperature or humidity of the indoor-air approaches a set value and also a total amount of power consumption of the outdoor-air conditioner and power consumption of the indoor-air conditioner is reduced, wherein the control unit controls, in the cooperative load control, the operating capacity of the indoor-air conditioner by setting a target value of the evaporation temperature of the refrigerant in the indoor-air conditioner heat exchanger, and wherein the control unit increases, in the cooperative load control, the target value of the evaporation temperature of the refrigerant if the evaporation temperature of the refrigerant is higher than or equal to a predetermined reference value.

3. An air conditioning system comprising:

an outdoor-air conditioner including an outdoor-air conditioning unit and a heat transfer medium adjusting unit that adjusts a state of a heat transfer medium flowing in the outdoor-air conditioning unit, the outdoor-air conditioner sucking outdoor-air and supplying the outdoor-air as supply air from the outdoor-air conditioning unit to perform air conditioning of a target space;

an indoor-air conditioner including a plurality of indoor units and a refrigerant adjusting unit that adjusts a state of a refrigerant flowing in the indoor units, the indoor-air conditioner cooling or heating indoor-air that is air inside the target space by using the indoor units and supplying the air to the target space to perform air conditioning of the target space; and a control unit that controls operations of the outdoor-air conditioner and the indoor-air conditioner, wherein the outdoor-air conditioning unit includes a first fan and an outdoor-air conditioner heat exchanger, the first fan operating to suck the outdoor-air and to send the supply air to the target space, the outdoor-air conditioner heat exchanger causing heat exchange between the outdoor-air sucked by the first fan and the heat transfer medium, wherein each of the indoor units includes a second fan and an indoor-air conditioner heat exchanger, the second fan operating to suck the indoor-air and to send the air to the target space, the indoor-air conditioner heat exchanger causing heat exchange between the indoor-air sucked by the second fan and the refrigerant, wherein the control unit performs cooperative load control in which an operating capacity of the outdoor-air conditioner and an operating capacity of the indoor-air conditioner are controlled in cooperation in accordance with a status of the outdoor-air, a status of the indoor-air, an operation status of the outdoor-air conditioner, and/or an operation status of the indoor-air conditioner and controls, in the cooperative load control, at least one of a parameter of the outdoor-air conditioner and a parameter of the indoor-air conditioner such that a temperature or humidity of the indoor-air approaches a set value and also a total amount of power consumption of the outdoor-air conditioner and power consumption of the indoor-air conditioner is reduced, wherein the control unit controls, in the cooperative load control, the operating capacity of the outdoor-air conditioner by setting a target value of the temperature of the supply air, and wherein the control unit sets, in the cooperative load control, the target value of the temperature of the supply air such that the evaporation temperature of the refrigerant in the indoor-air conditioner heat exchanger approaches the target value.

4. An air conditioning system comprising:

an outdoor-air conditioner including an outdoor-air conditioning unit and a heat transfer medium adjusting unit that adjusts a state of a heat transfer medium flowing in the outdoor-air conditioning unit, the outdoor-air conditioner sucking outdoor-air and supplying the outdoor-air as supply air from the outdoor-air conditioning unit to perform air conditioning of a target space;

an indoor-air conditioner including a plurality of indoor units and a refrigerant adjusting unit that adjusts a state of a refrigerant flowing in the indoor units, the indoor-air conditioner cooling or heating indoor-air that is air inside the target space by using the indoor units and supplying the air to the target space to perform air conditioning of the target space; and a control unit that controls operations of the outdoor-air conditioner and the indoor-air conditioner, wherein the outdoor-air conditioning unit includes a first fan and an outdoor-air conditioner heat exchanger, the first fan operating to suck the outdoor-air and to send the supply air to the target space, the outdoor-air conditioner heat exchanger causing heat exchange between the outdoor-air sucked by the first fan and the heat transfer medium, wherein each of the indoor units includes a second fan and an indoor-air conditioner heat exchanger, the second fan operating to suck the indoor-air and to send the air to the target space, the indoor-air conditioner heat exchanger causing heat exchange between the indoor-air sucked by the second fan and the refrigerant, wherein the control unit performs cooperative load control in which an operating capacity of the outdoor-air conditioner and an operating capacity of the indoor-air conditioner are controlled in cooperation in accordance with a status of the outdoor-air, a status of the indoor-air, an operation status of the outdoor-air conditioner, and/or an operation status of the indoor-air conditioner and controls, in the cooperative load control, at least one of a parameter of the outdoor-air conditioner and a parameter of the indoor-air conditioner such that a temperature or humidity of the indoor-air approaches a set value and also a total amount of power consumption of the outdoor-air conditioner and power consumption of the indoor-air conditioner is reduced, wherein the control unit controls, in the cooperative load control, the operating capacity of the outdoor-air conditioner by setting a target value of the temperature of the supply air, and wherein the control unit changes, in the cooperative load control, the target value of the temperature of the supply air, in a case where the outdoor-air conditioning unit performs heating operation for heating the outdoor-air and the indoor units perform cooling operation for cooling the indoor-air, if the number of indoor units that are in operation increases or decreases.

5. An air conditioning system comprising:
an outdoor-air conditioner including an outdoor-air conditioning unit and a heat transfer medium adjusting unit that adjusts a state of a heat transfer medium flowing in the outdoor-air conditioning unit, the outdoor-air conditioner sucking outdoor-air and supplying the outdoor-air as supply air from the outdoor-air conditioning unit to perform air conditioning of a target space;
an indoor-air conditioner including a plurality of indoor units and a refrigerant adjusting unit that adjusts a state of a refrigerant flowing in the indoor units, the indoor-air conditioner cooling or heating indoor-air that is air inside the target space by using the indoor units and supplying the air to the target space to perform air conditioning of the target space; and
a control unit that controls operations of the outdoor-air conditioner and the indoor-air conditioner,
wherein the outdoor-air conditioning unit includes a first fan and an outdoor-air conditioner heat exchanger, the first fan operating to suck the outdoor-air and to send the supply air to the target space, the outdoor-air conditioner heat exchanger causing heat exchange between the outdoor-air sucked by the first fan and the heat transfer medium,
wherein each of the indoor units includes a second fan and an indoor-air conditioner heat exchanger, the second fan operating to suck the indoor-air and to send the air to the target space, the indoor-air conditioner heat exchanger causing heat exchange between the indoor-air sucked by the second fan and the refrigerant,
wherein the control unit performs cooperative load control in which an operating capacity of the outdoor-air conditioner and an operating capacity of the indoor-air conditioner are controlled in cooperation in accordance with a status of the outdoor-air, a status of the indoor-air, an operation status of the outdoor-air conditioner, and/or an operation status of the indoor-air conditioner and controls, in the cooperative load control, at least one of a parameter of the outdoor-air conditioner and a parameter of the indoor-air conditioner such that a temperature or humidity of the indoor-air approaches a set value and also a total amount of power consumption of the outdoor-air conditioner and power consumption of the indoor-air conditioner is reduced, and
wherein the control unit performs the cooperative load control such that a value calculated according to the following Formula 2 becomes positive:

(current power consumption of the indoor-air conditioner−predicted power consumption of the indoor-air conditioner after execution of the cooperative load control)−(current processed heat amount in the indoor-air conditioner−predicted processed heat amount in the indoor-air conditioner after execution of the cooperative load control)/predicted coefficient of performance of the outdoor-air conditioner after execution of the cooperative load control. <Formula 2>

* * * * *